United States Patent
Bhattad et al.

(10) Patent No.: US 11,974,136 B2
(45) Date of Patent: Apr. 30, 2024

(54) PHYSICAL UPLINK CONTROL CHANNEL (PUCCH) AND REFERENCE SIGNAL DESIGN FOR NEW RADIO-UNLICENSED (NR-U)

(71) Applicant: QUALCOMM INCORPORATED, San Diego, CA (US)

(72) Inventors: Kapil Bhattad, Bangalore (IN); Tanumay Datta, Bangalore (IN); Ananta Narayanan Thyagarajan, Bangalore (IN); Brahim Saadi, Nuremberg (DE); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/927,883

(22) Filed: Jul. 13, 2020

(65) Prior Publication Data
US 2021/0044981 A1    Feb. 11, 2021

Related U.S. Application Data

(60) Provisional application No. 62/931,459, filed on Nov. 6, 2019, provisional application No. 62/882,857, filed on Aug. 5, 2019.

(51) Int. Cl.
*H04W 72/12* (2023.01)
*H04L 27/26* (2006.01)
(Continued)

(52) U.S. Cl.
CPC ......... *H04W 16/14* (2013.01); *H04L 27/2607* (2013.01); *H04L 27/2613* (2013.01);
(Continued)

(58) Field of Classification Search
CPC .. H04J 13/0003; H04J 13/18; H04J 2013/165; H04L 27/2602; H04L 27/2607;
(Continued)

(56) References Cited

U.S. PATENT DOCUMENTS 9,065,649 B2 * 6/2015 Kim .................. H04L 5/0048
11,316,641 B2    4/2022 Tiirola et al.
(Continued)

FOREIGN PATENT DOCUMENTS

CN           102035780 A      4/2011
FR    WO2018029526 A1 *  2/2018 ............... H04L 5/00
(Continued)

OTHER PUBLICATIONS

Partial International Search Report—PCT/US2020/041931—ISA/EPO—dated Oct. 7, 2020.
(Continued)

*Primary Examiner* — Mansour Oveissi
(74) *Attorney, Agent, or Firm* — QUALCOMM Incorporated

(57) ABSTRACT

Wireless communications systems and methods related to uplink control channel transmissions with user multiplexing and reference signal transmissions are provided. A first wireless communication device obtains an uplink control channel multiplex configuration. The first wireless communication device communicates, with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration. The first wireless communication device communicates, with the second wireless communication device, a first uplink control channel signal in one or
(Continued)

more of the plurality of resource blocks based on the uplink control channel multiplex configuration.

34 Claims, 30 Drawing Sheets

(51) Int. Cl.
  *H04W 16/14* (2009.01)
  *H04W 72/121* (2023.01)
  *H04W 72/21* (2023.01)
  *H04W 72/23* (2023.01)

(52) U.S. Cl.
  CPC ....... *H04L 27/2628* (2013.01); *H04W 72/121* (2013.01); *H04W 72/21* (2023.01); *H04W 72/23* (2023.01)

(58) Field of Classification Search
  CPC ............. H04L 27/2613; H04L 27/2628; H04L 27/2636; H04L 5/003; H04L 5/0094; H04W 16/14; H04W 72/0413; H04W 72/044; H04W 72/121; H04W 72/1278; H04W 72/14
  See application file for complete search history.

(56) References Cited

U.S. PATENT DOCUMENTS

| | | | |
|---|---|---|---|
| 2016/0095120 A1* | 3/2016 | Gaal | H04W 72/0453 370/329 |
| 2019/0159193 A1 | 5/2019 | Zhang et al. | |
| 2019/0166581 A1 | 5/2019 | Lien et al. | |
| 2020/0169368 A1* | 5/2020 | Tiirola | H04L 5/0053 |
| 2020/0389204 A1* | 12/2020 | Matsumura | H04L 5/0044 |
| 2021/0344404 A1* | 11/2021 | Matsumura | H04B 7/088 |

FOREIGN PATENT DOCUMENTS

| | | | | |
|---|---|---|---|---|
| WO | 2019095834 A1 | 5/2019 | | |
| WO | WO2020205741 A1 * | 8/2020 | ............ | H04W 16/14 |

OTHER PUBLICATIONS

International Search Report and Written Opinion—PCT/US2020/041931—ISA/EPO—dated Nov. 30, 2020.

* cited by examiner

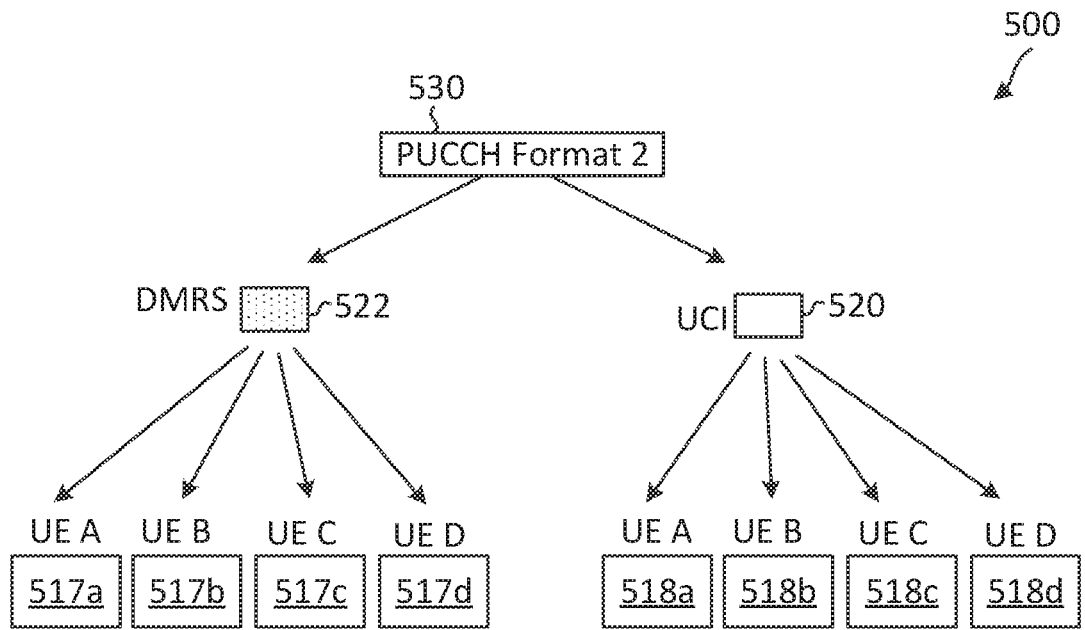
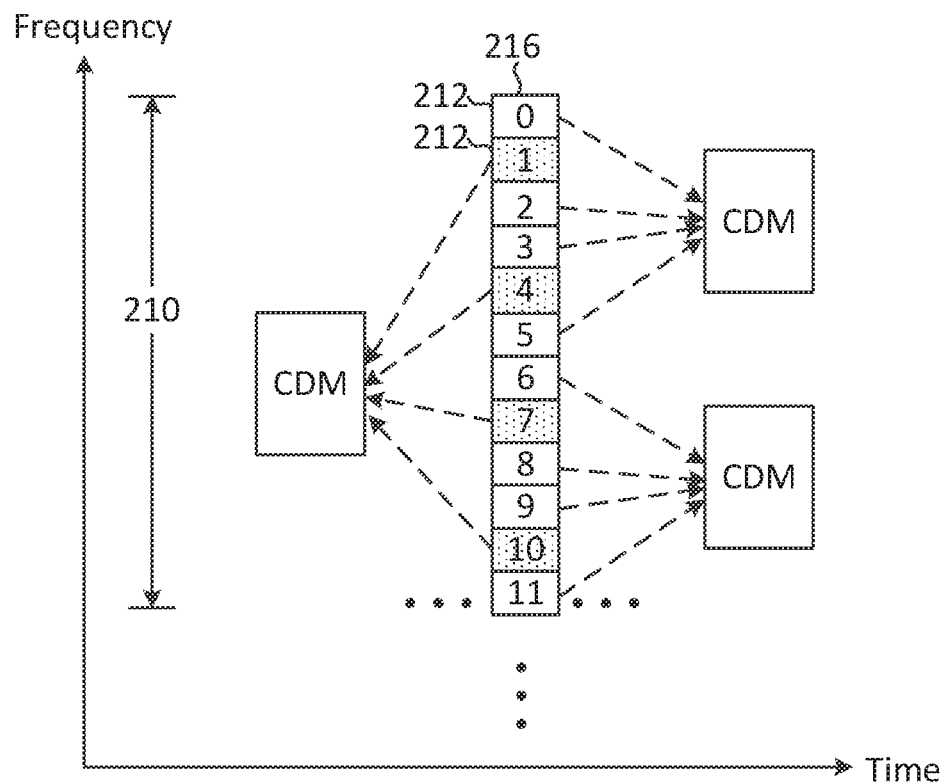
FIG. 5B

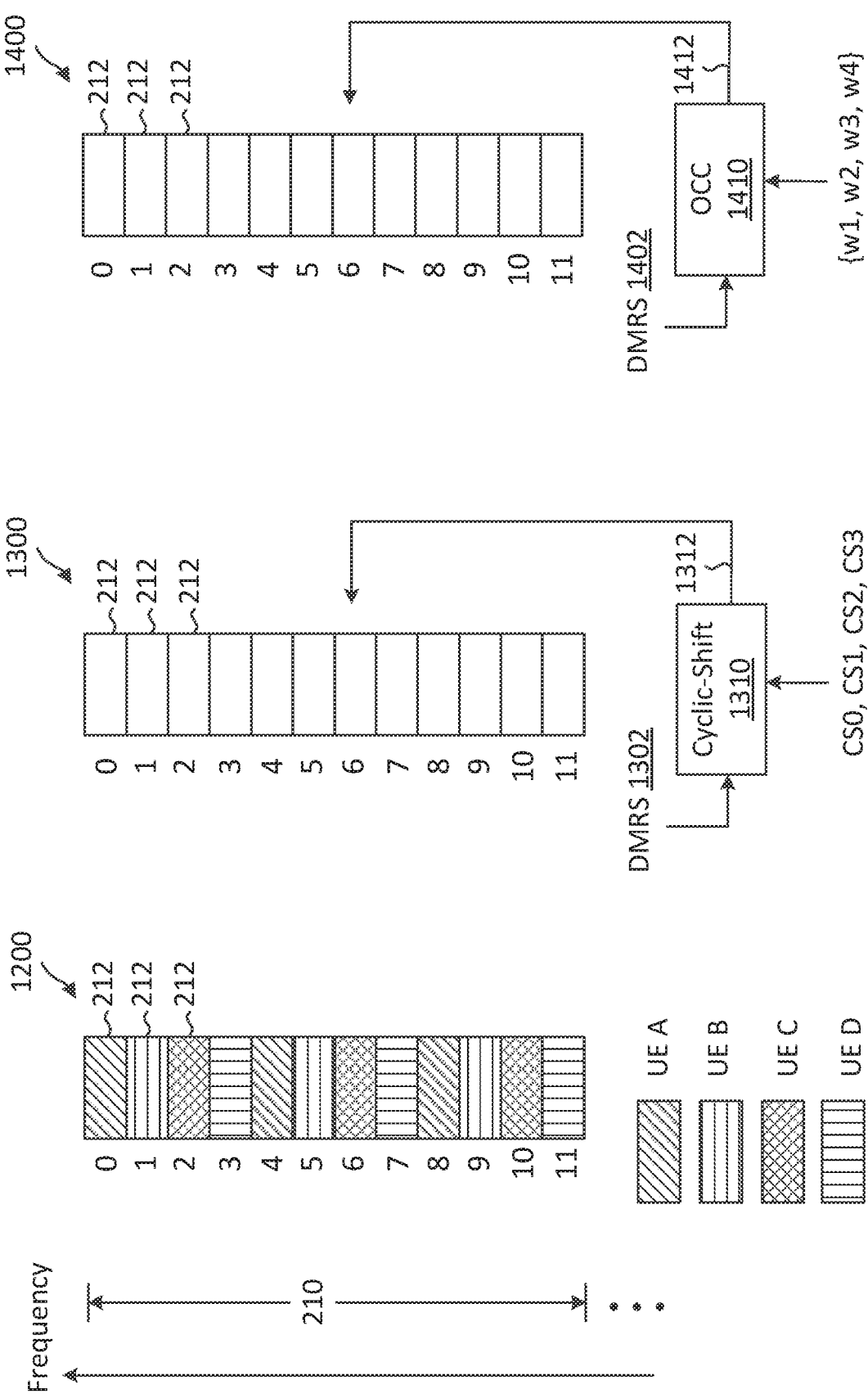

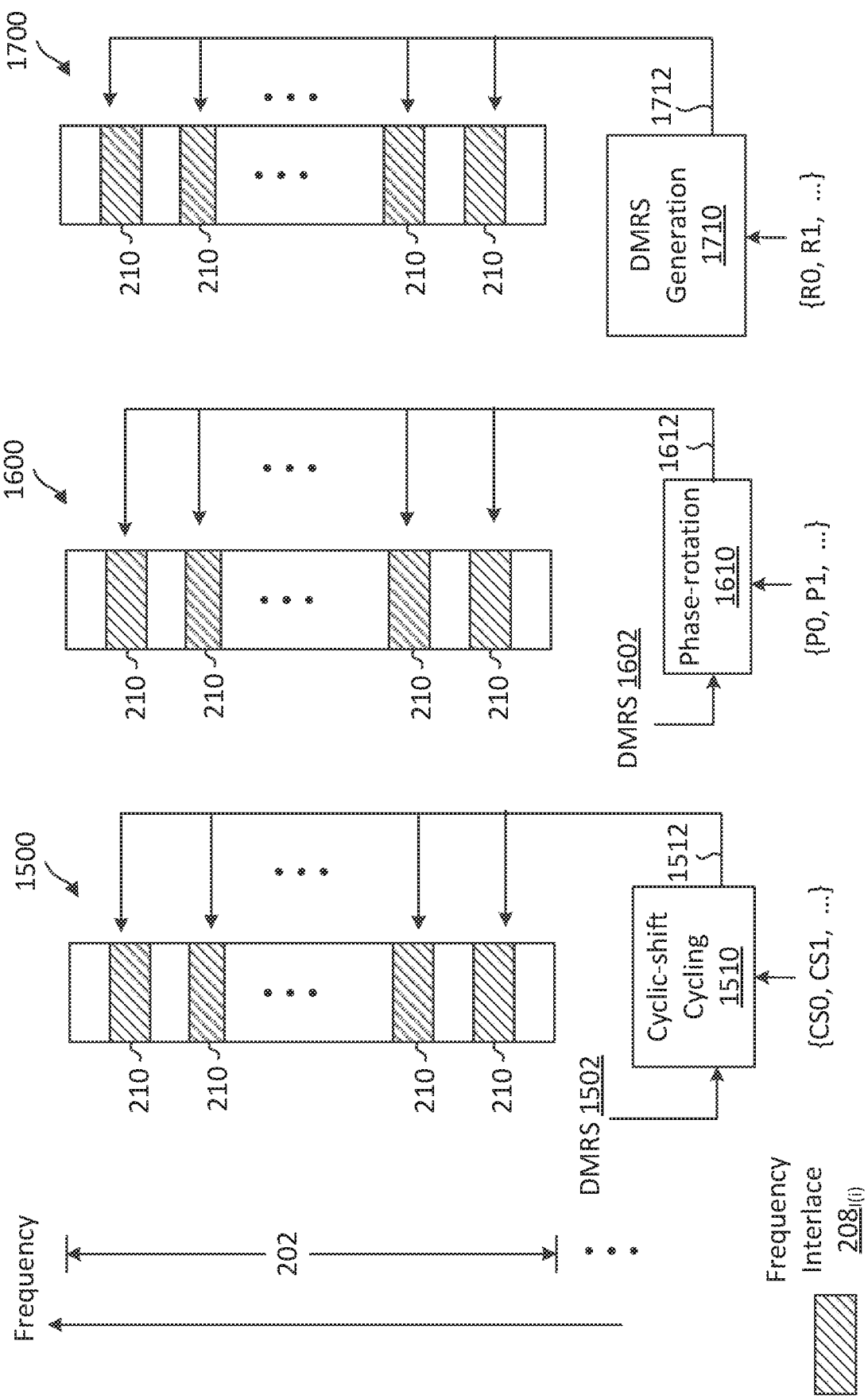

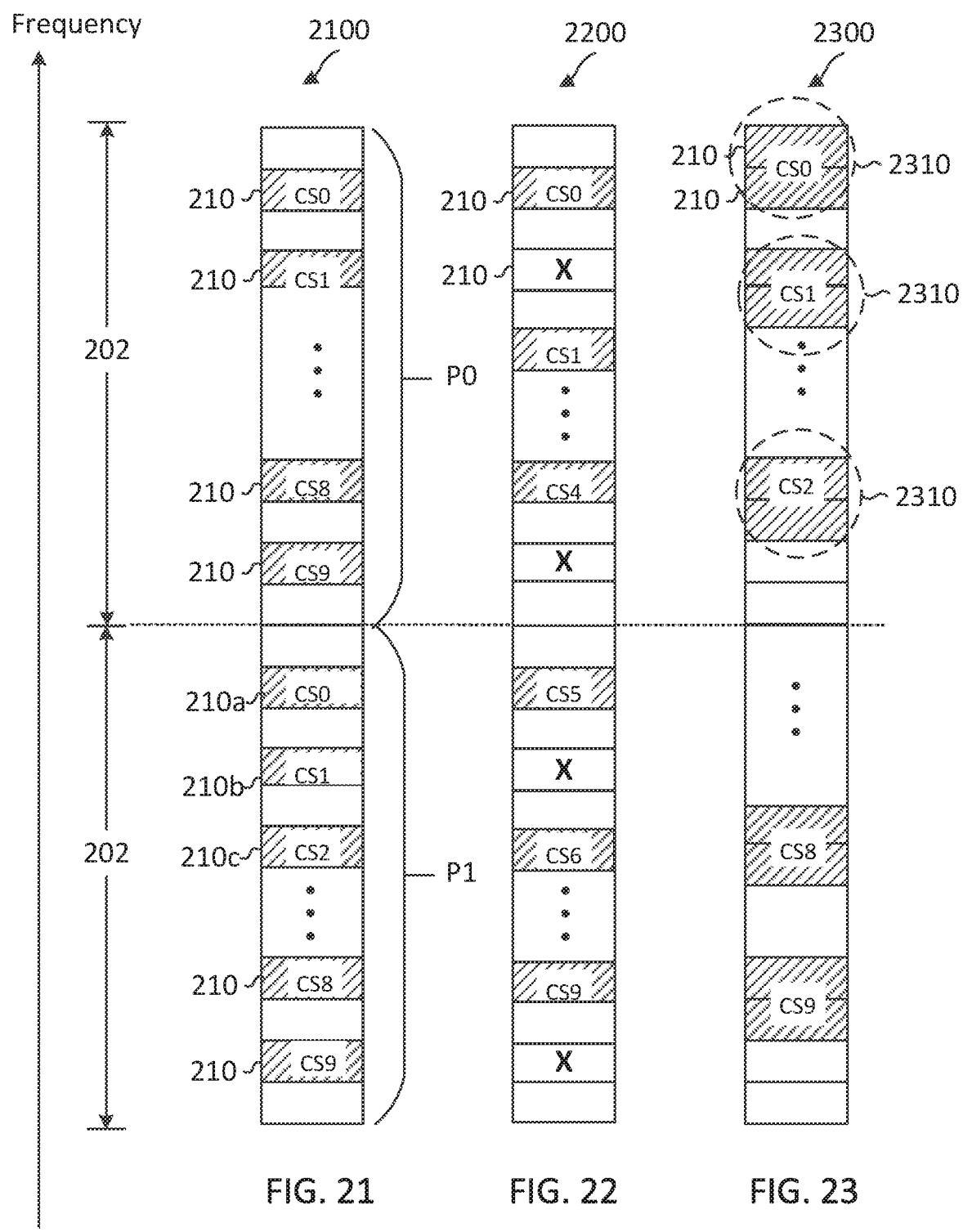

PHYSICAL UPLINK CONTROL CHANNEL (PUCCH) AND REFERENCE SIGNAL DESIGN FOR NEW RADIO-UNLICENSED (NR-U)

CROSS REFERENCE TO RELATED APPLICATIONS

The present application claims priority to and the benefit of U.S. Provisional Patent Application No. 62/882,857, filed Aug. 5, 2019 and U.S. Provisional Patent Application No. 62/931,459, filed Nov. 6, 2019, each of which is hereby incorporated by reference in its entirety as if fully set forth below and for all applicable purposes.

TECHNICAL FIELD

This application relates to wireless communication systems, and more particularly to uplink (UL) control channel transmissions with user multiplexing and reference signal transmissions in a radio frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands.

NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR—U. In NR—U, a BS may schedule a UE for an UL transmission in an unlicensed frequency band. The UE may perform an LBT procedure prior to the scheduled time. When the LBT is a success, the UE may proceed to transmit UL data according to the schedule. When the LBT fails, the UE may refrain from transmitting. Additionally, transmissions may be required to meet certain bandwidth occupancy criteria irrespective of transmission data size due to regulations in unlicensed spectrum.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes obtaining, by a first wireless communication device, an uplink control channel multiplex configuration; communicating, by the first wireless communication device with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration; and communicating, by the first wireless communication device with the second wireless communication device, a first uplink control channel signal in one or more of the plurality of resource blocks based on the uplink control channel multiplex configuration.

In an additional aspect of the disclosure, a method of wireless communication, includes communicating, by a first wireless communication device with a second wireless communication device, a grant indicating a resource allocation in a shared radio frequency band and a modulation format, the resource allocation including a frequency pattern; communicating, by the first wireless communication device with the second wireless communication device, a reference signal configuration that is based on at least one of the frequency pattern or the modulation format; and communicating, by the first wireless communication device with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

In an additional aspect of the disclosure, a method of wireless communication, includes communicating, by a first wireless communication device with a second wireless communication device, an allocation indicating a first frequency interlace of a set of frequency interlaces and a second frequency interlace of the set of frequency interlaces, where the second frequency interlace is offset from the first frequency interlace based on a set of one or more offsets; and communicating, by the first wireless communication device with the second wireless communication device, an uplink control channel signal using the first frequency interlace and the second frequency interlace.

In an additional aspect of the disclosure, a method of wireless communication, includes communicating, by a first wireless communication device with a second wireless communication device, an uplink control channel multiplex configuration indicating a first cyclic shift value; and communicating, by the first wireless communication device with the second wireless communication device, a first uplink control channel signal including a first reference signal using one or more frequency interlaces, the first reference signal being based on the first cyclic shift value.

In an additional aspect of the disclosure, an apparatus includes a processor configured to obtain an uplink control channel multiplex configuration; and a transceiver configured to communicate, with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration; and communicate, with the second wireless communication device, a first uplink control channel signal in one or more of the plurality of resource blocks based on the uplink control channel multiplex configuration.

In an additional aspect of the disclosure, an apparatus includes a transceiver configured to communicate, with a second wireless communication device, a grant indicating a resource allocation in a shared radio frequency band and a modulation format, the resource allocation including a frequency pattern; communicate, with the second wireless communication device, a reference signal configuration that is based on at least one of the frequency pattern or the modulation format; and communicate, with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

In an additional aspect of the disclosure, an apparatus includes a transceiver configured to communicate, with a second wireless communication device, an allocation indicating a first frequency interlace of a set of frequency interlaces and a second frequency interlace of the set of frequency interlaces, where the second frequency interlace is offset from the first frequency interlace based on a set of one or more offsets; and communicate, with the second wireless communication device, an uplink control channel signal using the first frequency interlace and the second frequency interlace.

In an additional aspect of the disclosure, an apparatus includes a transceiver configured to communicate, with a second wireless communication device, an uplink control channel multiplex configuration indicating a first cyclic shift value; and communicate, with the second wireless communication device, a first uplink control channel signal including a first reference signal using one or more frequency interlaces, the first reference signal being based on the first cyclic shift value.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5B illustrates an UL control channel multiplexing scheme according to some embodiments of the present disclosure.

FIG. 12 illustrates an UL reference signal multiplexing scheme according to some embodiments of the present disclosure.

FIG. 13 illustrates an UL reference signal multiplexing scheme according to some embodiments of the present disclosure.

FIG. 14 illustrates an UL reference signal multiplexing scheme according to some embodiments of the present disclosure.

FIG. 15 illustrates an UL reference signal multiplexing scheme according to some embodiments of the present disclosure.

FIG. 16 illustrates an UL reference signal multiplexing scheme according to some embodiments of the present disclosure.

FIG. 17 illustrates an UL reference signal multiplexing scheme according to some embodiments of the present disclosure.

FIG. 21 illustrates a wide-band reference signal transmission scheme according to some embodiments of the present disclosure.

FIG. 22 illustrates a wide-band reference signal transmission scheme according to some embodiments of the present disclosure.

FIG. 23 illustrates a wide-band reference signal transmission scheme according to some embodiments of the present disclosure.

DETAILED DESCRIPTION

Figure 1:
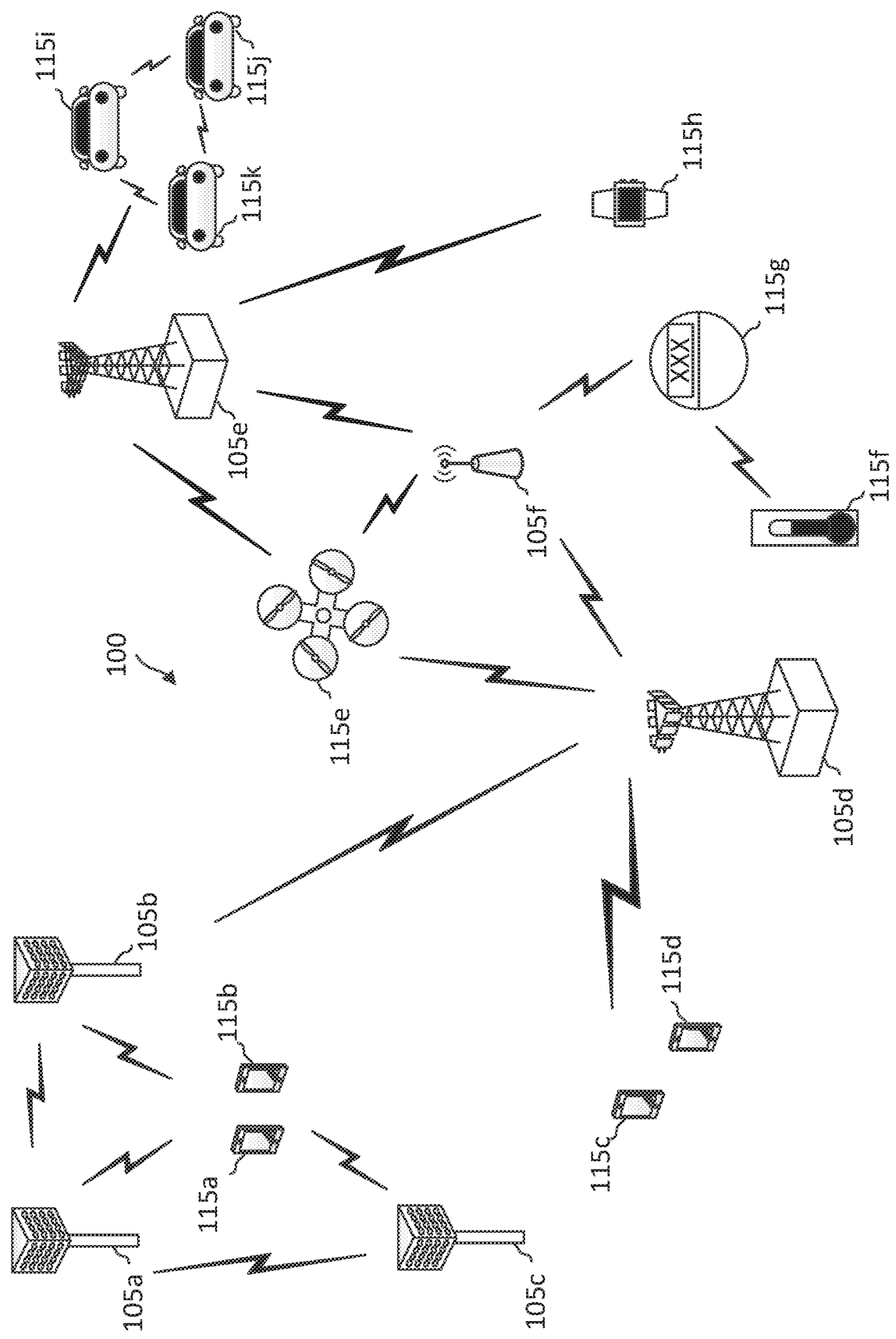
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for uplink (UL) control channel transmissions with user multiplexing and reference signal transmissions in a radio frequency band shared by multiple network operating entities. A BS may schedule multiple UEs to transmit UL control channel signals over the same frequency interlace in a shared radio frequency band via frequency-division multiplexing (FUM) and/or code-division multiplexing (CDM). In an example, the UL control channel signals are physical uplink control channel (PUCCH) format 2 signals. In another example, the UL control channel signals are PUCCH format 3 signals. Each uplink control channel signal can include uplink control information (UCI) and a reference signal (e.g., a demodulation reference signal (DMRS)). In an embodiment, different multiplexing mechanisms can be applied for multiplexing UCI and DMRSs from multiple UEs. For example, the BS may configure a UE with a frequency spreading code (e.g., a frequency-domain orthogonal cover code (OCC), a time spreading code (e.g., time-domain OCC), a post-frequency spreading scrambling code, and/or a pre-discrete Fourier transform (pre-DFT) OCC for multiplexing uplink control information (UCI) with another UE. The BS may configure the UE with a frequency spreading code, cyclic-shifts, phase-rotations, and/or root indices for multiplexing a reference signal for transmission. In an embodiment, a BS may configure a UE with a DMRS pattern based on a frequency pattern of an allocation and/or a modulation format assigned for data transmission in the allocation. The DMRS pattern may include a sequence length and a frequency density. The BS can determine an UL control channel multiplex configuration and/or a DMRS pattern such that the transmission may have a low peak-to-average-power-ratio (PAPR) (e.g., between about 1.5 decibels (dB) to about 2 dB).

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*k* are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as in a vehicle-to-vehicle (V2V)

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. AN UL-centric subframe may include a longer duration for UL communication than for UL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, an UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit an UL communication signal to the BS 105 via a PUSCH and/or PUCCH according to an UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-unlicensed (NR—U) network. In such an embodiment, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel.

In an embodiment, the network 100 may operate over various frequency bands, for example, in frequency ranges between about 2 GHz to above 60 GHz. Certain frequency bands may have certain BW occupancy requirements. In an example, UL transmissions are required to meet a BW occupancy of about 80 percent (%). To meet the BW occupancy requirements, a BS 105 may schedule a UE 115 for UL transmission using frequency interlaces with RBs spaced apart from each other across a frequency band. When an UL data transmission (e.g., PUCCH format 2 data and/or PUCCH format 3 data) has a small payload, the BS 105 may configure the UE 115 to transmit the UL data with repetitions in a frequency interlace. In some examples, the BS 105 may schedule multiple UEs 115 to transmit UL control information (UCI) (e.g., PUCCH format 2 data and/or PUCCH format 3 data) in the same frequency interlace based on frequency-division multiplexing (FDM), time-division multiplexing (TDM), and/or code-division multiplexing (CDM). Additionally, the BS 105 may configure a UE 115 with different multiplexing schemes for UL control information transmission and UL reference signal transmission. The UL reference signal may facilitate UL channel estimation and UL control information decoding at the BS 105. Further, the BS 105 may configure a UE 115 with various UL demodulation reference signal (DMRS) patterns in an UL allocation based on a frequency pattern of the UL allocation and/or a modulation format assigned for the allocation to reduce PAPR and/or PAPR/cubic metric (CM). Mechanisms for multiplexing multiple UEs 115 for UL control channel transmission and reference signal configurations are described in greater detail herein.

Figure 2:
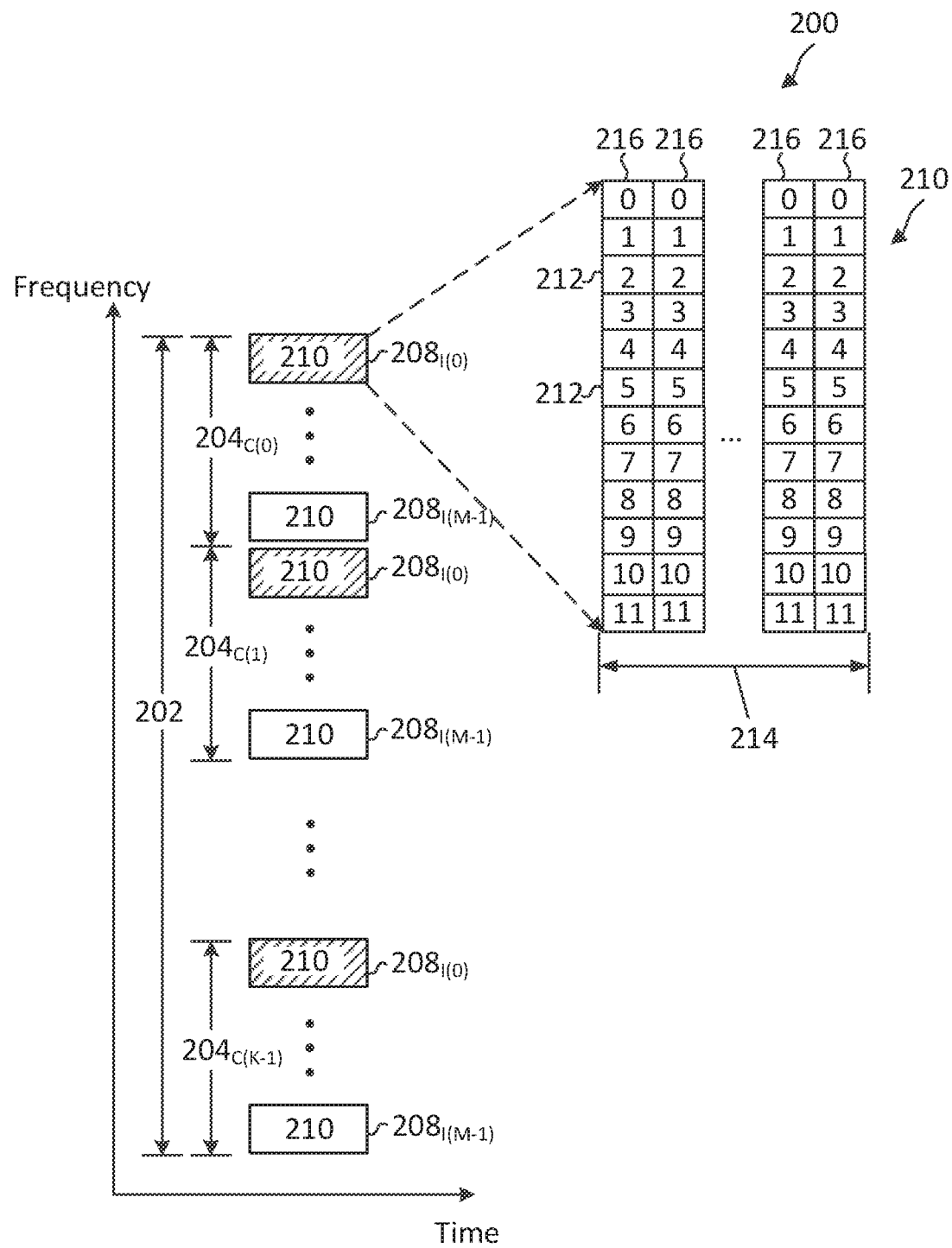
FIG. 2 illustrates a resource configuration scheme with frequency interlaces according to some embodiments of the present disclosure.

FIG. 2 illustrates a resource configuration scheme 200 with frequency interlaces according to some embodiments of the present disclosure. The scheme 200 may be employed by BSs such as the BSs 105 and UEs such as the UEs 115 to communicate over a frequency band 202. The frequency band 202 may have a bandwidth of about 10 megahertz (MHz) or about 20 MHz and a subcarrier spacing (SCS) of about 15 kilohertz (kHz), about 30 kHz, or about 20 kHz. The frequency band 202 may be located at any suitable frequencies. In some embodiments, the frequency band 202 may be located at about 3.5 GHz, 6 GHz, or 60 GHz. The scheme 200 allocates resources in units of frequency interlaces 208.

The frequency interlaces are shown as $208_{I(0)}$ to $208_{(M-1)}$, where M is a positive integer. Each frequency interlace $208_{I(i)}$ may include K plurality of RBs 210 evenly spaced over the frequency band 202, where K is a positive integer and i may vary between 0 to M−1. In other words, the RBs 210 in a particular frequency interlace $208_{I(i)}$ are spaced apart from each other by at least one other RB 210. The frequency interlace $208_{I(0)}$ as shown comprises RBs 210 from clusters $204_{C(0)}$ to $204_{C(K-1)}$. The values of K and M may vary based on several factors, such as the bandwidth, the SCS, and/or the PSD limitation of the frequency band 202, as described in greater detail herein. In an example, a BS (e.g., the BSs 105) may assign the frequency interlace $208_{I(0)}$ to one UE (e.g., the UEs 115) and the frequency interlace $208_{I(1)}$ to another UE. The allocation of the frequency interlace $208_{I(0)}$ are shown as patterned boxes. In some other examples, the BS may assign a UE with multiple frequency interlaces 208 (e.g., frequency interlaces $208_{I(0)}$ and $208_{I(1)}$).

A group of M localized RBs 210 forms a cluster 204. As shown, the frequency interlaces $208_{I(0)}$ to $208_{(M-1)}$ form K clusters $204_{C(0)}$ to $204_{C(K-1)}$. Each RB 210 may span about twelve contiguous subcarriers 212 in frequency and a time period 214. The subcarriers 212 are indexed from 0 to 11. The subcarriers 212 are also referred to as resource elements (REs). The time period 214 may span any suitable number of OFDM symbols 216. In some embodiments, the time period 214 may correspond to one transmission time interval (TTI), which may include about fourteen OFDM symbols 216.

The number of clusters 204 or the value of K may be dependent on the amount of frequency distribution required to maintain a certain BW occupancy. As an example, the scheme 200 may divide the frequency band 202 into about ten clusters 204 (e.g., K=10) and distribute an allocation over the ten clusters 204 to increase a frequency occupancy of the allocation. In an embodiment, the frequency band 202 may have a bandwidth of about 20 MHz and each subcarrier 212 may span about 15 kHz in frequency. In such an embodiment, the frequency band 202 may include about ten frequency interlaces 208 (e.g., M=10). For example, an allocation may include one frequency interlace 208 having ten distributed or equally spaced RBs 210. Compared to an allocation with a single RB or ten localized RBs, the interlaced allocation with the ten distributed RBs 210 allows a UE to transmit with a higher BW occupancy.

In another embodiment, the frequency band 202 may have a bandwidth of about 10 MHz and each subcarrier 212 may span about 15 kHz in frequency. In such an embodiment, the frequency band 202 may include about five frequency interlaces 208 (e.g., M=5). Similarly, an allocation may include one frequency interlace 208 having ten distributed RBs 210. The interlaced allocation with the ten distributed RBs may allow for a wider BW occupancy than an allocation with a single RB or ten localized RBs.

In another embodiment, the frequency band 202 may have a bandwidth of about 20 MHz and each subcarrier 212 may span about 30 kHz in frequency. In such an embodiment, the frequency band 202 may include about five frequency interlaces 208 (e.g., M=5). Similarly, an allocation may include one frequency interlace 208 having ten distributed RBs 210. The interlaced allocation with the ten distributed RBs may allow for a wider BW occupancy than an allocation with a single RB or ten localized RBs.

NR supports five types of physical uplink control channel (PUCCH) formats including PUCCH format 0, PUCCH format 1, PUCCH format 2, PUCCH format 3, and PUCCH format 4. The different PUCCH formats may include different data lengths and may occupy different number of OFDM symbols. For example, PUCCH format 0 data may have a length of two bits or less and may be mapped to about 1-2 OFDM symbols. PUCCH format 1 data may have a length of two bits or less and may be mapped to about 4-14 OFDM symbols. PUCCH format 2 data may have a length greater than two bits and may be mapped to about 1-2 OFDM symbols. PUCCH format 2 data may have a length greater than two bits and may be mapped to about 1-2 OFDM symbols. PUCCH format 3 data may have a length of two bits or less and may be mapped to about 4-14 OFDM symbols. PUCCH format 4 data may have a length greater than two bits and may be mapped to about 4-14 OFDM symbols.

In NR—U, uplink transmissions are required to meet certain bandwidth (BW) occupancy criteria (e.g., 80% BW occupancy). For example, in a 20 megahertz (MHz) channel, an 80% BW occupancy correspond to a transmission signal with a BW of 16 MHz. With a 30 kilohertz (kHz) subcarrier spacing (SCS), 16 MHz may correspond to about 45 resource blocks (RBs), each including about twelve subcarriers. PUCCH formats 2 and 3 are relatively short and may be carried in about one RB to about sixteen RBs. However, in order to meet the BW occupancy requirement, a BS may configure a UE to extend the frequency occupancy of a PUCCH format 2 signal and/or a PUCCH format 3 signal from one RB 210 to K RBs 210 using a frequency interlace 208 and apply repetitions to the PUCCH format 2 data or the PUCCH format 3 data. However, the number of UEs that can be multiplexed over the frequency band 202 for PUCCH signal transmissions may be reduced by a factor of about K. Additionally, interlaced-based transmission can have a higher PAPR than a non-interlaced transmission. Further, as described above, when operating in a shared frequency band or unlicensed frequency band, UEs are required to perform LBTs prior to transmission. Accordingly, the BS is required to schedule a UE with a symbol gap to allow for the LBT. The symbol gap can reduce spectrum utilization efficiency.

Accordingly, the present disclosure provides techniques for a BS to perform UE multiplexing for PUCCH transmissions in frequency interlaces (e.g., the frequency interlaces 208) with an increased multiplexing capacity. Additionally, the BS may schedule multiple UEs to start at the same symbol to reduce spectrum utilization wastage, for example, using FDM and/or CDM mechanisms. Further, the BS may consider PAPR and/or PAPR/CM when multiplexing UEs for PUCCH transmissions and/or configuring DMRSs for DMRS transmissions as described in greater detail herein.

Figure 3:
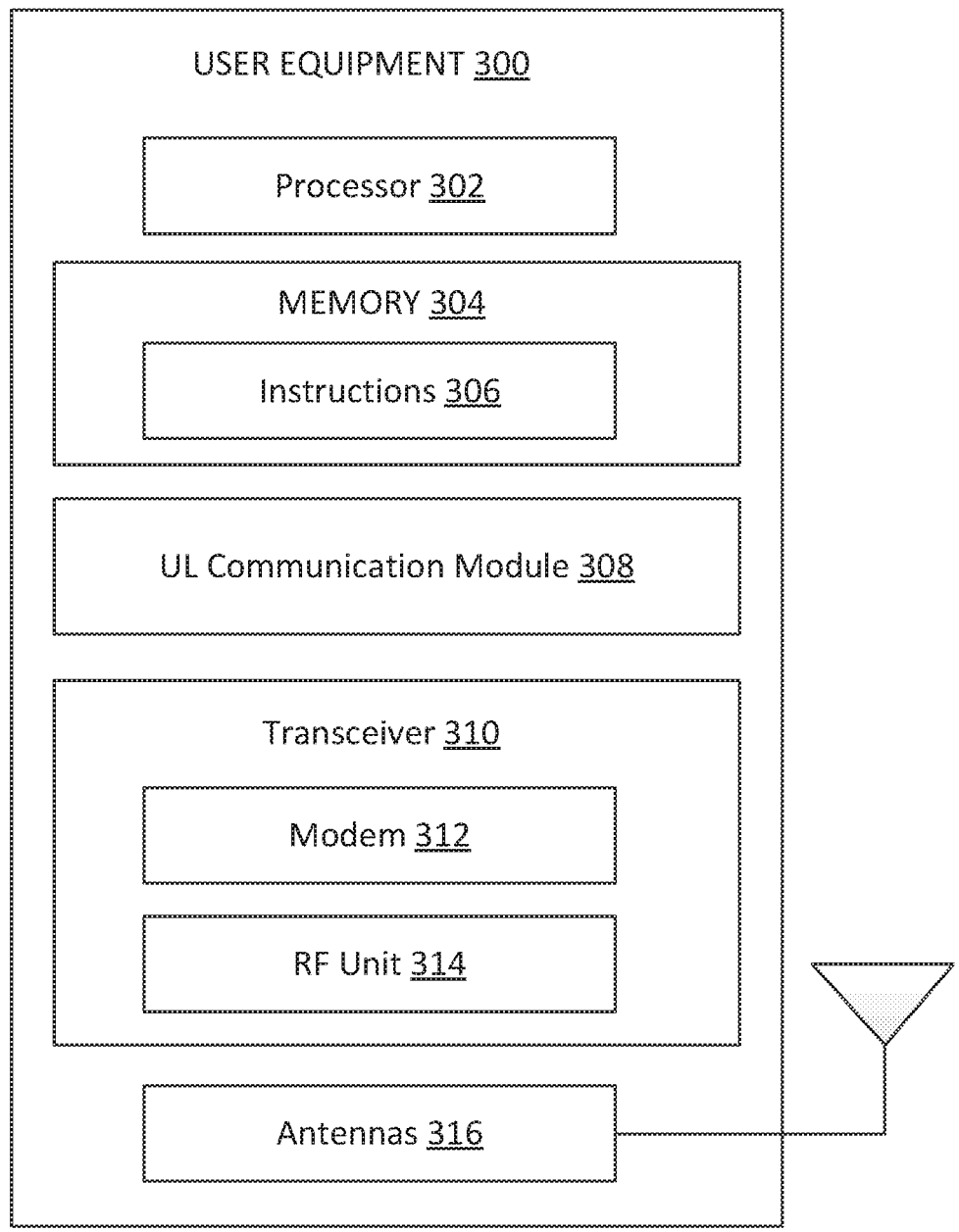
FIG. 3 is a block diagram of a user equipment (UE) according to some embodiments of the present disclosure.

FIG. 3 is a block diagram of an exemplary UE 300 according to some embodiments of the present disclosure. The UE 300 may be a UE 115 discussed above in FIG. 1. As shown, the UE 300 may include a processor 302, a memory 304, an UL communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIGS. 5-34. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UL communication module 308 may be implemented via hardware, software, or combinations thereof. For example, the UL communication module 308 may be implemented as a processor, circuit, and/or instructions 306 stored in the memory 304 and executed by the processor 302. In some examples, the UL communication module 308 can be integrated within the modem subsystem 312. For example, the UL communication module 308 can be implemented by a combination of software components (e.g., executed by a DSP or a general processor) and hardware components (e.g., logic gates and circuitry) within the modem subsystem 312.

The UL communication module 308 may be used for various aspects of the present disclosure, for example, aspects of FIGS. 5-34. The UL communication module 308 is configured to receive an UL control channel multiplex configuration and a grant from a BS (e.g., the BSs 105). The grant may indicate a plurality of RBs (e.g., the RBs 210) spaced apart from each other by at least one other resource block in a shared radio frequency band. The plurality of RBs may be scheduled for multiple UEs (e.g., the UEs 115) including the UE 300. The UL communication module 308 is configured to transmit an UL control channel signal (e.g., a PUCCH signal) to the BS based on the UL control channel multiplex configuration. In an example, the UL control channel multiplex configuration may include a frequency spreading code (e.g., a frequency-domain OCC, a time spreading code (e.g., time-domain OCC), a post-frequency spreading scrambling code, and/or a pre-DFT) OCC for multiplexing UCI with UCI from another UE on the same resources. The UL control channel multiplex configuration may include a frequency spreading code, cyclic-shifts, phase-rotations, and/or root indices for multiplexing a DMRS with a DMRS from another UE on the same resources.

In an embodiment, the UL communication module 308 is configured to receive a grant and a reference signal configuration from the BS. The resource allocation may indicate a resource allocation in a shared radio frequency band and a modulation format. The reference signal configuration may be based on at least one of the frequency pattern or the modulation format. The UL communication module 308 is configured to transmit an UL channel signal including at least one of UL data or UCI and a reference signal to the BS in the allocated resources. The UL data and/or the UCI are transmitted based on the modulation format and the reference signal is transmitted based on the reference signal configuration.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the UL communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., UCI, DMRS, and/or UL data) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., grants, resource allocations, UL control channel multiplex configurations, reference signal configurations) to the UL communication module 308 for processing. The antennas 316 may include multiple antennas of similar or different designs in order to sustain multiple transmission links. The RF unit 314 may configure the antennas 316.

In an example, the transceiver 310 is configured to receive an UL grant (e.g., from a BS 105) for PUCCH and/or PUSCH transmissions, a reference signal configuration, and/or an UL control channel multiplex configuration, for example, by coordinating with the UL communication module 308.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement different RATs.

Figure 4:
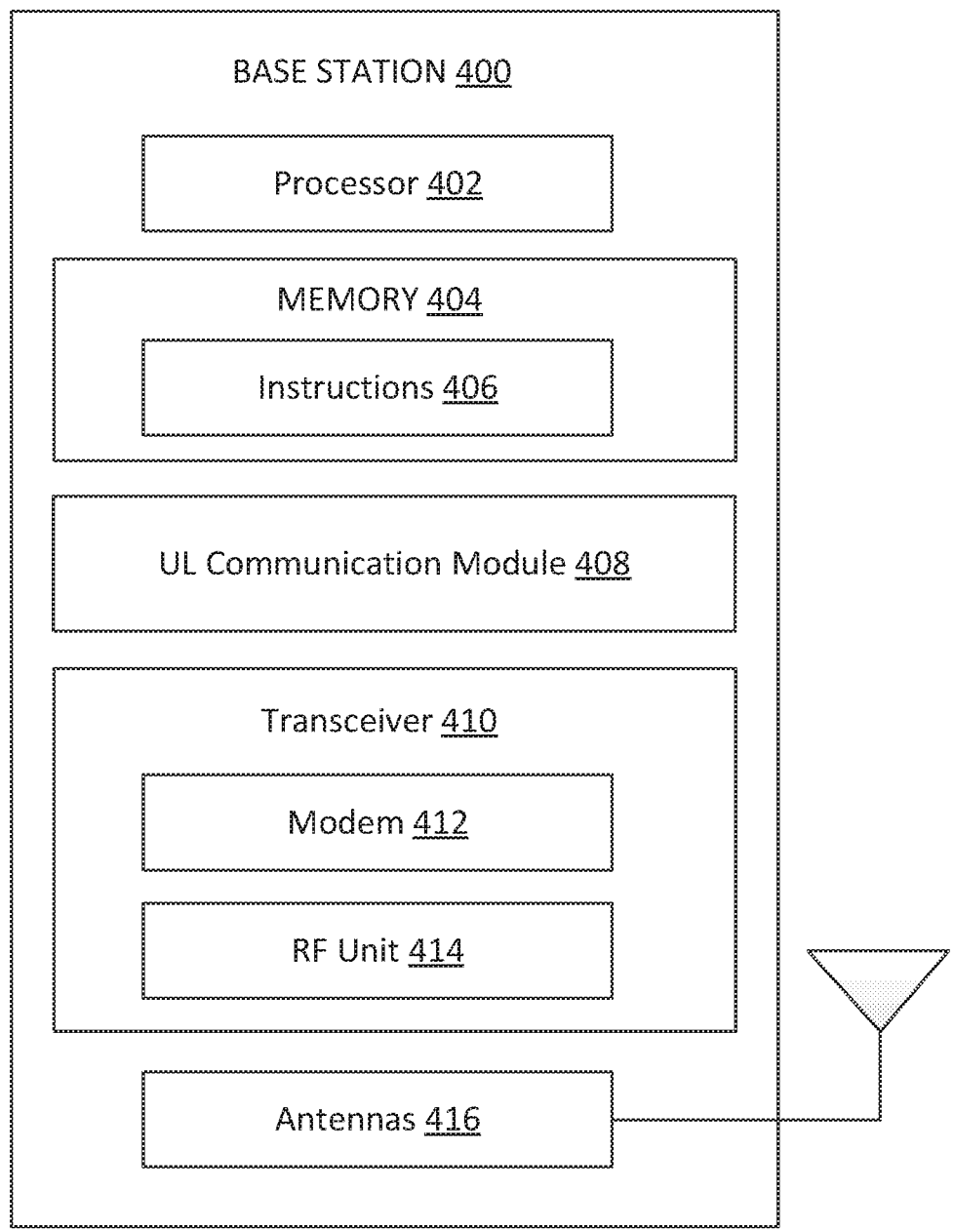
FIG. 4 is a block diagram of an exemplary base station (BS) according to some embodiments of the present disclosure.

FIG. 4 is a block diagram of an exemplary BS 400 according to some embodiments of the present disclosure. The BS 400 may be a BS 105 in the network 100 as discussed above in FIG. 1. A shown, the BS 400 may include a processor 402, a memory 404, an UL communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 5-34. Instructions 406 may also be referred to as code, which may be interpreted broadly to include any type of computer-readable statement(s) as discussed above with respect to FIG. 3.

The UL communication module 408 may be implemented via hardware, software, or combinations thereof. For example, the UL communication module 408 may be implemented as a processor, circuit, and/or instructions 406 stored in the memory 404 and executed by the processor 402. In some examples, the UL communication module 408 can be integrated within the modem subsystem 412. For example, the UL communication module 408 can be implemented by a combination of software components (e.g., executed by a DSP or a general processor) and hardware components (e.g., logic gates and circuitry) within the modem subsystem 412.

The UL communication module 408 may be used for various aspects of the present disclosure, for example, aspects of FIGS. 5-34. The UL communication module 408 is configured to transmit an UL control channel multiplex configuration and a grant to a UE (e.g., the UEs 115 and 300). The grant may indicate a plurality of RBs (e.g., the RBs 210) spaced apart from each other by at least one other resource block in a shared radio frequency band. The plurality of RBs may be scheduled for multiple UEs (e.g., the UEs 115) including the UE 300. The UL communication module 408 is configured to receive an UL control channel signal (e.g., a PUCCH signal) from the UE based on the UL control channel multiplex configuration. In an example, the UL control channel multiplex configuration may include a frequency spreading code (e.g., a frequency-domain OCC, a time spreading code (e.g., time-domain OCC), a post-frequency spreading scrambling code, and/or a pre-DFT) OCC for multiplexing UCI with UCI from another UE on the same resources. The UL control channel multiplex configuration may include a frequency spreading code, cyclic-shifts, phase-rotations, and/or root indices for multiplexing a DMRS with a DMRS from another UE on the same resources.

In an embodiment, the UL communication module 408 is configured to transmit a grant and a reference signal configuration to the UE. The resource allocation may indicate a resource allocation in a shared radio frequency band and a modulation format. The reference signal configuration may be based on at least one of the frequency pattern or the modulation format. The UL communication module 408 is configured to receive an UL channel signal including at least one of UL data or UCI and a reference signal from the in the allocated resources. The UL data and/or the UCI are received based on the modulation format and the reference signal js received based on the reference signal configuration.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., grants, resource allocations, UL control channel multiplex configurations, reference signal configurations) from the modem subsystem 412 (on outbound transmissions) or of transmissions originating from another source such as a UE 115 and/or UE 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 300 according to some embodiments of the present disclosure. The antennas 416 may further receive data messages transmitted from other devices and provide the received data messages for processing and/or demodulation at the transceiver 410. The transceiver 410 may provide the demodulated and decoded data (e.g., UCI, DMRS, and UL data) to the UL communication module 408 for processing. The antennas 416 may include multiple antennas of similar or different designs in order to sustain multiple transmission links.

In an example, the transceiver 410 is configured to receive PUCCH signals from multiple UEs on the same resources or PUSCH signals from multiple UEs on the same according to the UL control channel multiplex configuration, resource allocations, and/or reference signal configuration, for example, by coordinating with the UL communication module 408.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

Figure 8:
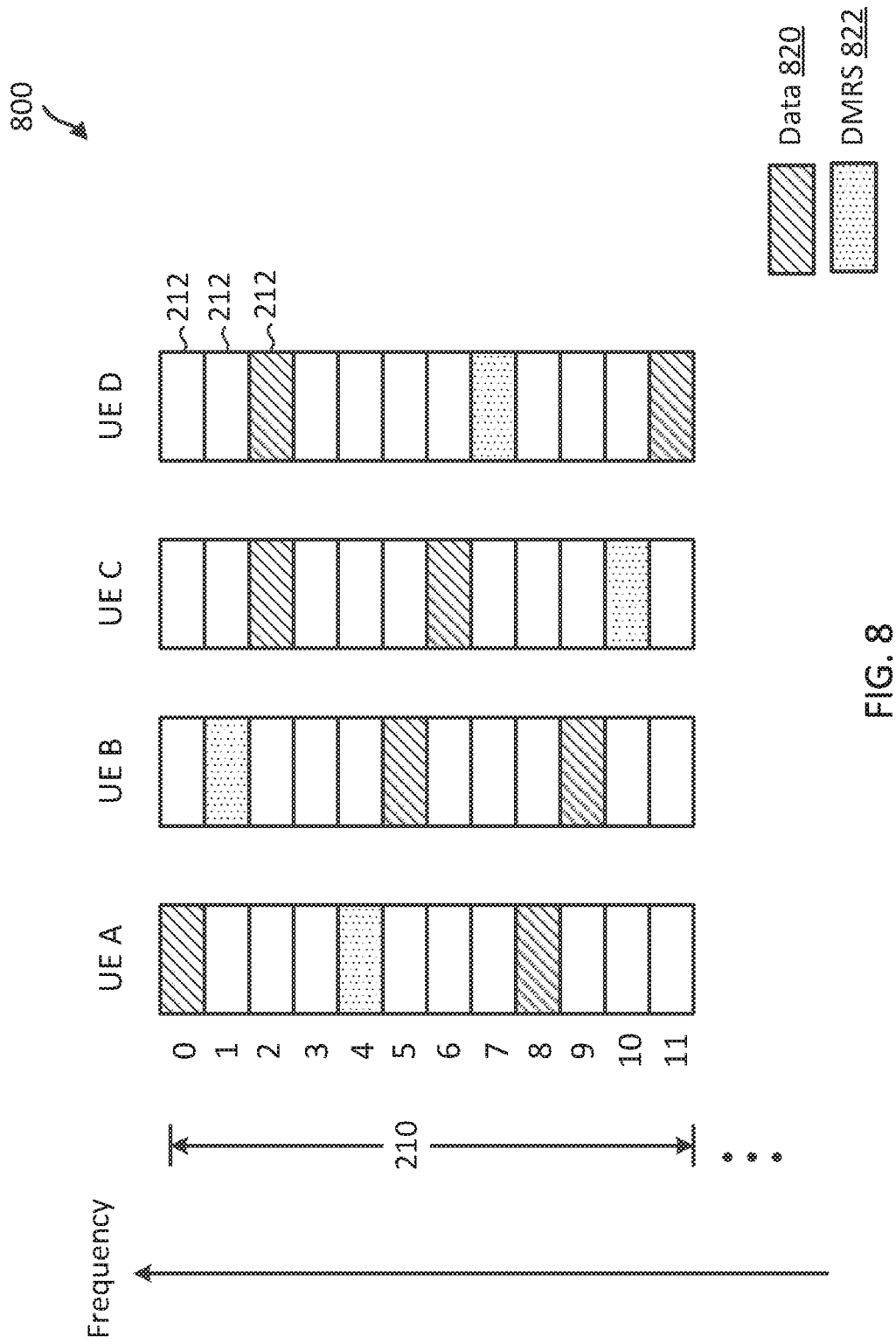
FIG. 8 illustrates an UL control channel multiplexing scheme according to some embodiments of the present disclosure.
Figure 9:
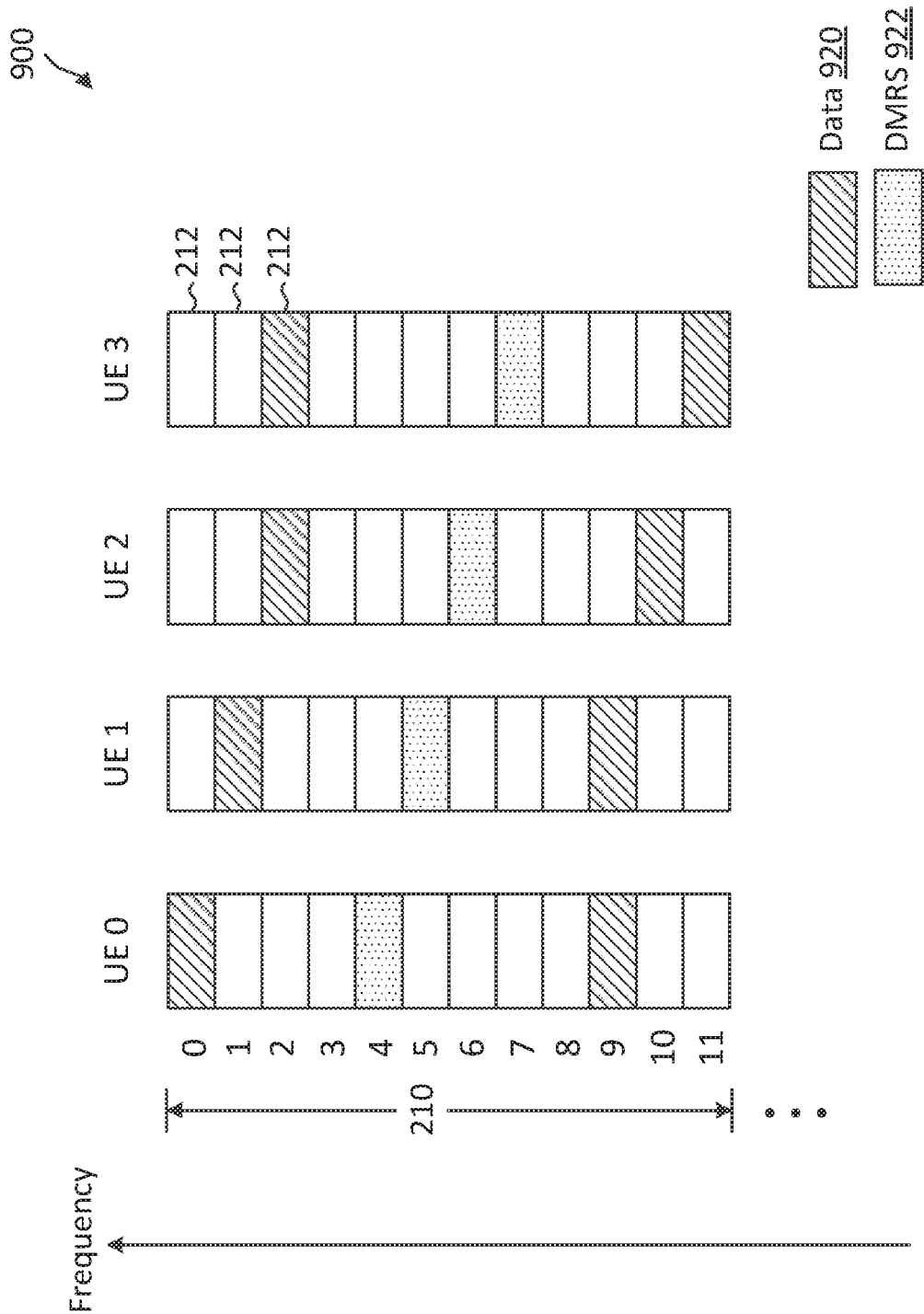
FIG. 9 illustrates an UL control channel multiplexing scheme according to some embodiments of the present disclosure.
Figure 10:
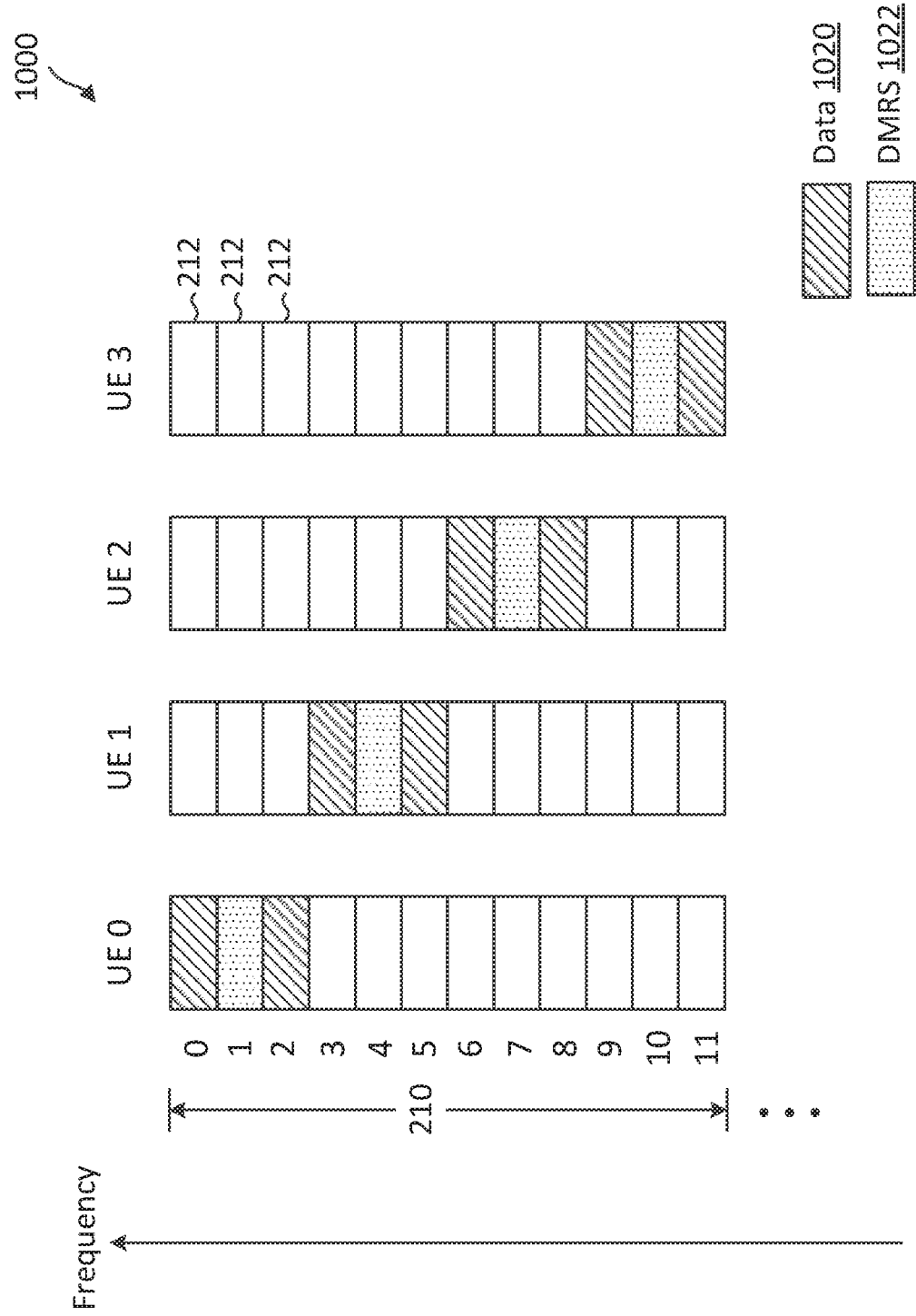
FIG. 10 illustrates an UL control channel multiplexing scheme according to some embodiments of the present disclosure.

FIGS. SA, 5B, 6, 7A, 7B, 8, 9, and 10 illustrate various mechanisms for multiplexing UL control channel signals (e.g., with PUCCH format 2 data) from multiple UEs (e.g., the UEs 115 and the UE 300) in the same frequency interlace (e.g., the frequency interlaces 208) using FDM and/or CDM. UCI data and DMRS from a single UE can be frequency-multiplexed on the same OFDM symbol. In FIGS. 5-10, the schemes 500, 600, 700, 800, 900, and 1000 may be employed by a BS such as the BSs 105 and/or 400 and a UE such as the UEs 115 and/or 300 in a network such as the network 100 operating over a shared frequency band or an unlicensed frequency band. In particular, the BS may schedule multiple UEs to transmit UL control channel signals in the same frequency interlace. For simplicity of discussions, FIGS. SA, 5B, 6, 7A, 7B, 8, 9, and 10 illustrate multiplexing between two UEs (e.g., a UE A and a UE B) or four UEs (e.g., a UE A, a UE B, a UE C, and a UE D) on one RB 210. However, the embodiments of the present disclosure may scale to multiplex any suitable number of UEs (e.g., about 3, 4, 5, 6, or more than 6) on any suitable number of RBs 210s (e.g., between about 2 to about 20) within a frequency interlace 208. Additionally, in FIGS. SA, 5B, 6, and 7B, the x-axes represent time in some arbitrary units and the y-axes represent frequency in some arbitrary units. In FIGS. 8-10, the y-axes represent frequency in some arbitrary units. Further, the schemes 500-1000 are described using the frequency interlace structure shown in FIG. 2, and may use the same reference numerals as in FIG. 2 for simplicity sake.

Figure 5A:
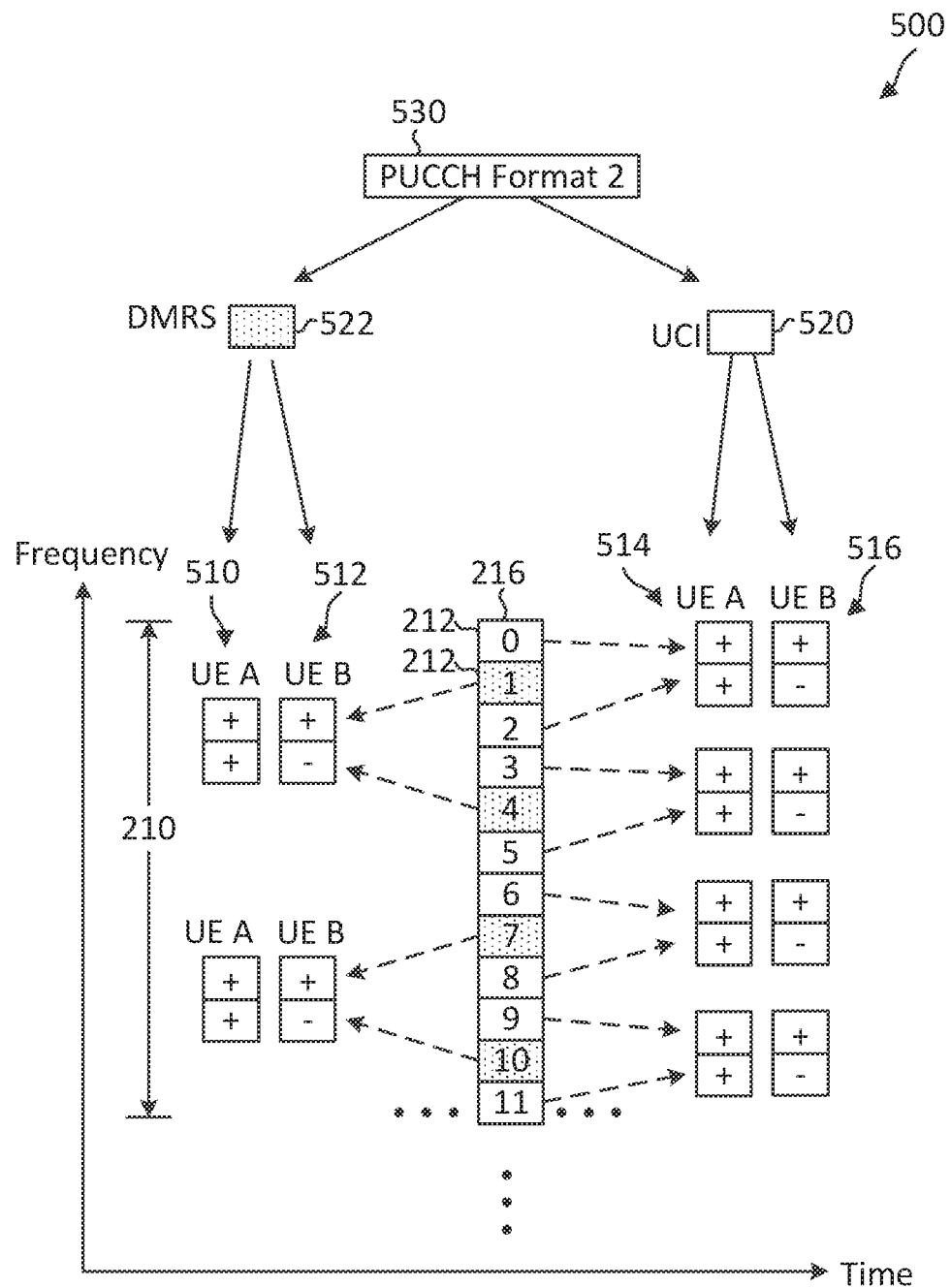
FIG. 5A illustrates an uplink (UL) control channel multiplexing scheme according to some embodiments of the present disclosure.

FIGS. 5A and 5B collectively illustrate an UL control channel multiplexing scheme 500 according to some embodiments of the present disclosure. In the scheme 500, a PUCCH signal 530 may carry PUCCH format 2 UCI 520 and a DMRS 522. The UCI 520 may include a channel quality indicator (CQI), a scheduling request (SR), hybrid automatic repeat request (HARQ) acknowledgement/negative acknowledgement (ACK/NAK), and/or any UL control related information. In an example, a UE (e.g., the UEs 115 and/or 300) may transmit a CQI to provide a BS (e.g., the BSs 105 and/or 400) with channel measurement and/or quality information. In an example, the UE may transmit an HARQ ACK/NAK to provide a BS with a reception status for a DL data block received from the BS. In an example, the UCI 520 may have a data length greater than two bits. The DMRS 522 may include a predetermined sequence, such as a Zadoff Chu (ZC) sequence, a pseudo-random noise (PN) sequence, a computer-generated sequence (CGS), or any suitable sequence. The DMRS 522 may be referred to as pilot symbols.

The DMRS 522 and the UCI 520 from a single UE (e.g., the UEs 115) may be multiplexed in a FDM manner over one OFDM symbol 216, where the DMRS 522 and the UCI 520 are mapped on to different subcarriers 212 with coherent modulation. In an example, the UCI 520 is encoded and scrambled by a PN sequence generator initialized based on a scrambling identifier (ID) assigned for a PUSCH of the UE. In an example, the UCI 520 can be modulated using quadrature-phase shift keying (QPSK). The UE may compute a number RBs 210 for carrying the UCI 520 based on a total number of bits in the UCI 520, a modulation format, and/or a code-rate upper bounded by the number of allocated or configured RBs 210. In an example, the DMRS 522 may be carried in four REs or subcarriers 212 (shown by the patterned boxes). For example, the DMRS REs are evenly distributed within a RB 210 in subcarriers 212 indexed 1, 4, 7 and 10, which may be similar to a NR PUCCH configuration. The remaining subcarriers 212 indexed 0, 2, 3, 5, 6, 8, 9, and 11 are data REs for carrying the UCI 520. Accordingly, the DMRS overhead is about ⅓.

The scheme 500 multiplexes PUCCH signals 530 with a duration of one symbol 216 from different UEs on the same resource (e.g., the frequency interlace 208) by applying frequency-domain CDM separately for the UCI 520 and for the DMRSs 522. FIG. 5A illustrates the multiplexing of two UEs (e.g., a UE A and a UE B) on the same resource (e.g., the frequency interlace 208), where frequency domain CDM is applied across two subcarriers 212. FIG. 5B illustrates the multiplexing of four UEs (e.g., a UE A, UE B, UE C, and UE D) on the same resource (e.g., the frequency interlace 208), where frequency domain CDM is applied across four subcarriers 212.

Referring to FIG. 5A, the BS schedules a UE A and a UE B to transmit on the same RB 210. The BS may assign the UE A with a frequency spreading code 510 for applying to a DMRS 522 and a frequency spreading code 514 for applying to UCI 520. The BS may assign the UE B with a frequency spreading code 512 orthogonal to the frequency spreading code 510 for applying to a DMRS 522 and a frequency spreading code 516 orthogonal to the frequency spreading code 514 for applying to UCI 520. The frequency spreading codes 510, 512, 514 and 516 may be referred to as orthogonal cover codes (OCCs).

In an example, the frequency spreading codes 510, 512, 514 and 516 may be defined based on Walsh codes. The frequency spreading code 510 may include a first code, denoted as {+}, and a second code, denoted as {+}. The frequency spreading code 512 may include a first code, denoted as {+}, and a second code, denoted as {-}. The frequency spreading code 514 may include a first code, denoted as {+}, and a second code, denoted as {+}. The frequency spreading code 516 may include a first code, denoted as {+}, and a second code, denoted as {-}. The frequency spreading codes 510 and 514 may be the same as shown or different from each other. Similarly, the frequency spreading codes 512 and 516 may be the same as shown or different from each other. The orthogonal frequency spreading codes 510 and 512 enable a BS to distinguish DMRS transmissions of the UE A from DMRS transmissions of the UE B. Similarly, the orthogonal frequency spreading codes 514 and 516 enable a BS to distinguish UCI transmissions of the UE A from UCI transmissions of the UE B.

When the UE A transmits a PUCCH signal 530 on the RB 210, the UE A applies the frequency spreading codes 510 and 514 to the DMRS 522 and the UCI 520, respectively. Each pilot symbol in the DMRS 522 is repeated with a repetition of 2 and mapped to the set of DMRS REs indexed {1, 4, 7 10} in RBs 210 within an allocated interlace. Similarly, each modulation symbol in the UCI 520 is repeated with a repetition of 2 and mapped to the set of data REs indexed {0, 2, 3 5, 6, 8, 9, 11} in the RBs 210 of the allocated interlace. The frequency spreading code 510 is separately applied to a pair of subcarriers 212 indexed 1 and 4 and a pair of subcarriers 212 indexed 7 and 10. The frequency spreading code 514 is separately applied to a pair of subcarriers 212 indexed 0 and 2, a pair of subcarriers 212 indexed 3 and 5, a pair of subcarriers 212 indexed 6 and 8, and a pair of subcarriers 212 indexed 9 and 11.

When the UE B transmits a PUCCH signal 530 on the RB 210, the UE B applies the frequency spreading codes 512 and 516 to the DMRS 522 and the UCI 520, respectively. As shown, the frequency spreading code 512 is separately applied to a pair of subcarriers 212 indexed 1 and 4 and a pair of subcarriers 212 indexed 5 and 10. The frequency spreading code 516 is separately applied to a pair of subcarriers 212 indexed 0 and 2, a pair of subcarriers 212 indexed 3 and 5, a pair of subcarriers 212 indexed 6 and 8, and a pair of subcarriers 212 indexed 9 and 11.

Referring to FIG. 5B, the BS schedules a UE A, a UE B, a UE C, and a UE D to transmit on the same RB 210. The BS may assign each of the UE A, the UE B, the UE C, and the UE D with a frequency spreading code 517a, 517b, 517c, and 517d, respectively, for applying to the DMRS 522 for CDM. The BS may assign each of the UE A, the UE B, the UE C, and the UE D with a frequency spreading code 518a, 518b, 518c, and 518d, respectively, for applying to UCI 520 for CDM. The frequency spreading codes 517a, 517b, 517c, and 517d are OCCs with a length of 4. Similarly, the frequency spreading codes 518a, 518b, 518c, and 518d are OCCs with a length of 4. As an example, the UE A applies the frequency spreading code 517a and 518a to the DMRS 522 and the UCI 520, respectively. Each pilot symbol in the DMRS 522 is repeated with a repetition of 4 and mapped to the set of DMRS REs indexed {1, 4, 7 10} in RBs 210 of an allocated interlace. Similarly, each modulation symbol in the UCI 520 is repeated with a repetition of 4 and mapped to the set of data REs indexed {0, 2, 3 5} or {6, 8, 9, 11} in the RBs 210 of the allocated interlace. The frequency spreading code 517a is applied to the DMRS REs indexed {1, 4, 7 10}. The frequency spreading code 518a is applied to the data REs indexed {0, 2, 3 5} or {6, 8, 9, 11}. The UE B, the UE C, and the UE D may apply substantially similar frequency spreading mechanisms as the UE A for CDM.

Figure 6:
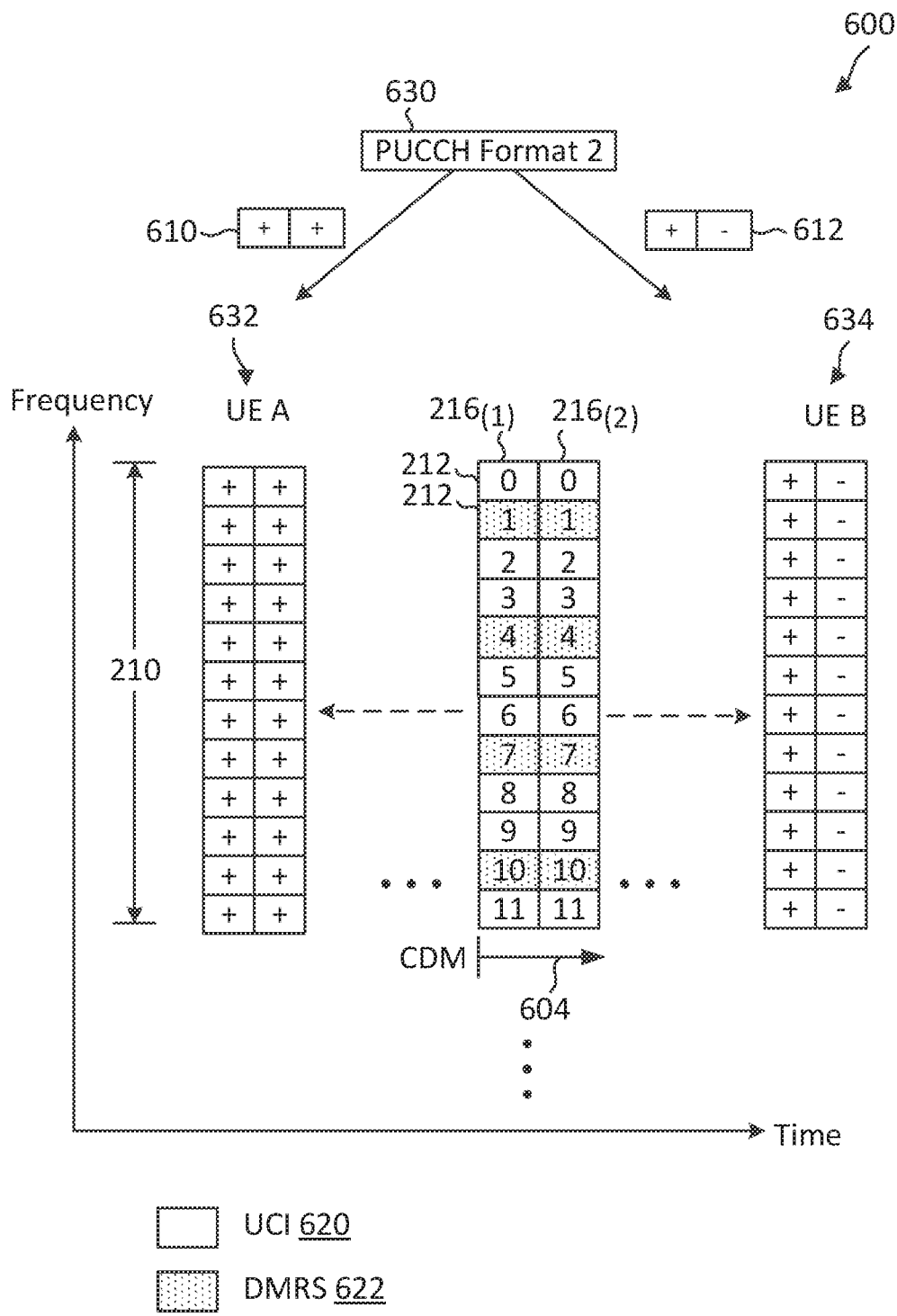
FIG. 6 illustrates an UL control channel multiplexing scheme according to some embodiments of the present disclosure.

FIG. 6 illustrates an UL control channel multiplexing scheme 600 according to some embodiments of the present disclosure. In the scheme 600, a PUCCH signal 630 may carry PUCCH format 2 UCI 620 and a DMRS 622. The UCI 620 and the DMRS 622 may be substantially similar to the UCI 520 and the DMRS 522, respectively. However, the PUCCH signal 630 is transmitted over two symbols 216. The scheme 600 multiplexes PUCCH signals 630 with a duration of two symbols 216 (shown as $216_{(1)}$ and $216_{(2)}$) from different UEs (e.g., UE A and UE B) on the same resource (e.g., the frequency interlace 208) by applying time-domain CDM across symbols 216 as shown by the arrow 604. Similar to the scheme 500, the DMRS REs (shown by the patterned boxes) are evenly distributed within a RB 210 in subcarriers 212 indexed 1, 4, 7 and 10 in each of the symbols $216_{(1)}$ and $216_{(2)}$.

For example, a BS may schedule the UE A and the UE B to transmit on the same RB 210. The BS may assign the UE A with a time spreading code 610 and may assign the UE B with a time spreading code 612 orthogonal to the time spreading code 610. The time spreading codes 610 and 612 may be defined based on Walsh codes. In an embodiment, the time spreading code 610 may include a first code, denoted as {+}, and a second code, denoted as {+}, and the time spreading code 612 may include a first code, denoted as {+}, and a second code, denoted as {−}. The orthogonal time spreading codes 610 and 612 enable a BS to distinguish PUCCH format 0 transmissions of the UE A from PUCCH format 0 transmissions of the UE B.

When the UE A transmits a PUCCH signal 630 on the RB 210, the UE A applies the time spreading code 610 to the PUCCH signal 630 as shown by the signal 632 and transmits the signal 632 on the RB 210. For example, the UE A may multiply the first symbol $216_{(1)}$ with the first code {+} of the time spreading code 610 and multiply the second symbol $216_{(2)}$ with the second code {+} of the time spreading code 610. The UE A may apply the time spreading code 610 to the DMRS 622 and the UCI 620 of the UE A.

When the UE B transmits a PUCCH signal 630 on the RB 210, the UE B may apply the time spreading code 612 to the PUCCH signal 630 as shown by the signal 634 and transmits the signal 634 on the RB 210. For example, the UE B may multiply the first symbol 216 with the first code {+} of the time spreading code 612 and multiply the second symbol 216 with the second code {−} of the time spreading code 612. The UE B may apply the time spreading code 612 to the DMRS 622 and the UCI 620 of the UE B.

In some embodiments, a BS (e.g., the BSs 105 and/or 400) may apply a combination of the schemes 500 and 600 to multiplex PUCCH signals from multiple UEs (e.g., the UEs 115 and/or 300). When applying the schemes 500 and/or 600, some UEs (e.g., the UE A) may be configured with a spreading code of {+, +, +, +} for UCI transmissions. In other words, a data symbol carrying UCI can be repeated four times. The repetitions can create a high PAPR/CM.

Figure 7A:
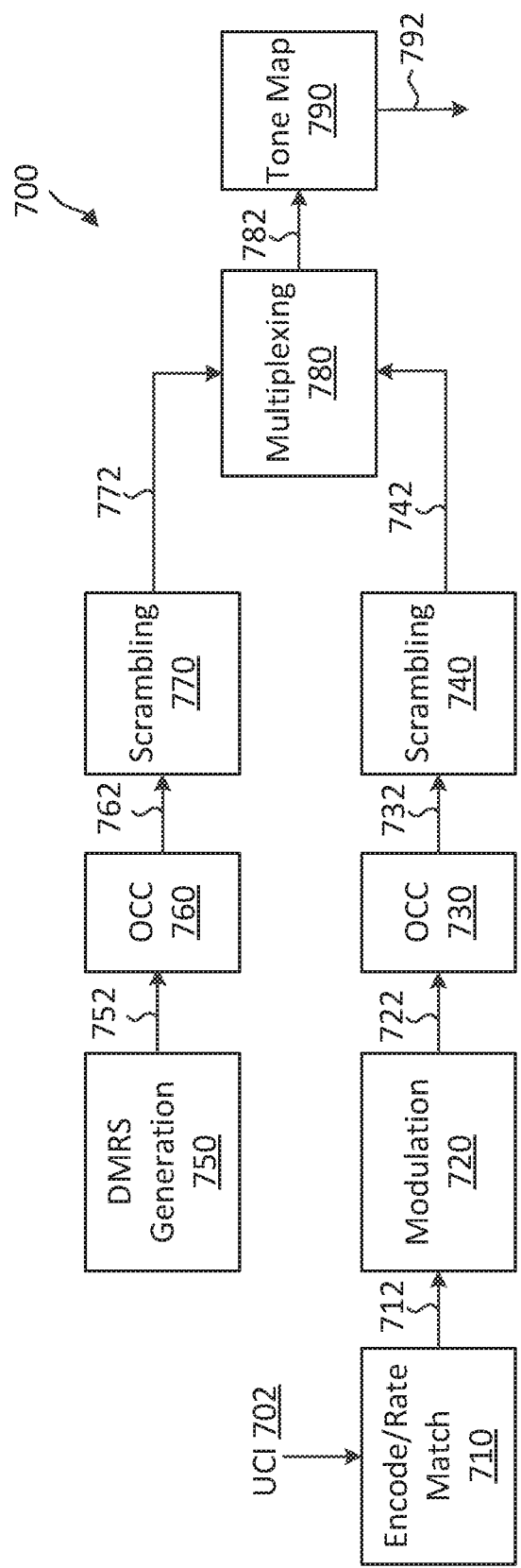
FIG. 7A illustrates an UL control channel multiplexing scheme according to some embodiments of the present disclosure.
Figure 7B:
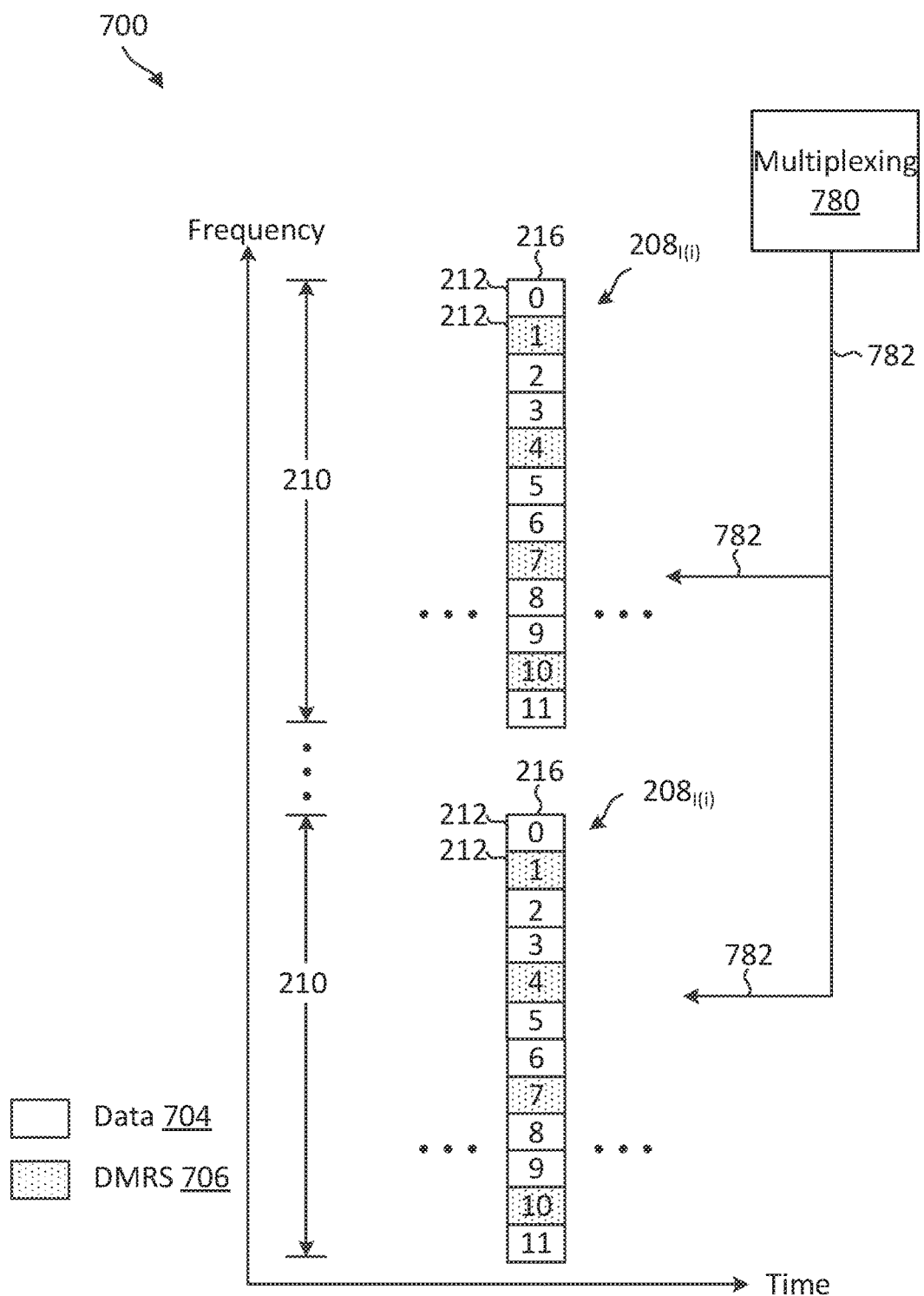
FIG. 7B illustrates an UL control channel multiplexing scheme according to some embodiments of the present disclosure.

FIGS. 7A and 7B collectively illustrate an UL control channel multiplexing scheme 700 according to some embodiments of the present disclosure. The scheme 700 applies a scrambling code or sequence after the application of OCC to provide a lower PAPR/CM when spreading codes or OCCs are applied for multiplexing.

Referring to FIG. 7A, the scheme 700 includes an encode/rate-match component 710, a modulation component 720, an OCC component 730, a scrambling component 740, a DMRS generation component 750, an OCC component 760, a scrambling component 770, a multiplexing component 780, and a tone map component 790. The encode/rate-match component 710, the modulation component 720, the OCC component 730, the scrambling component 740, the DMRS generation component 750, the OCC component 760, the scrambling component 770, the multiplexing component 780, and the tone map component 790 can be implemented by hardware and/or software components and can be implemented by a UE (e.g., the UEs 115 and/or 300).

The encode/rate-match component 710 is configured to receive UCI 702 (e.g., the UCIs 520 and 620), encode the UCI 702 and rate match the UCI 702 to a certain number of encoded bits 712. The modulation component 720 is configured to modulate the encoded bits 712 into modulation symbols 722 based on a certain modulation scheme (e.g., QPSK). The OCC component 730 is configured to apply an OCC (e.g., the frequency spreading codes 514 and/or 516) to the modulation symbols 722 to generate frequency spread data symbols 732.

The DMRS generation component 750 is configured to generate a DMRS sequence 752, which may be referred to as pilot symbols. The DMRS sequence 752 may be based on a ZC sequence, a PN sequence, or a CGS. The DMRS sequence 752 may be substantially similar to the DMRSs 522 and/or 622. The OCC component 760 may be substantially similar to the OCC component 730. The OCC component 760 is configured to apply an OCC (e.g., the frequency spreading codes 510 and/or 512) to the DMRS sequence 752 to generate frequency spread pilot symbols 762.

The scrambling component 740 applies a scrambling sequence to the sequence of output symbols 732 to produce scrambled symbols or data points 742. The scrambling component 770 applies a scrambling sequence to the sequence of output symbols 762 to produce scrambled symbols 772. The multiplexing generation component 780 is configured to multiplex the scrambled data symbols 742 and the scrambled pilot symbols 772 into a sequence of output symbols or data points 782. The multiplexing may be based on a certain data/DMRS tone mapping configuration. The tone map component 790 maps the multiplexed data points 782 to a frequency interlace $208_{(i)}$, where i may be a value between 0 and M−1. Since the scrambling is applied after the application of OCC, the scrambling can be referred to as post-OCC scrambling.

As an example, the encode/rate-match component 710 encodes and rate-matches the UCI 702 to eighty encoded bits 712. The modulation component 720 modulates the eighty encoded bits 712 to forty QPSK symbols 722. The OCC component 730 applies an OCC with a length 2 to spread the forty symbols 722 to eighty data symbols 732 for multiplexing two UEs (e.g., the UEs 115). The scrambling component 770 applies a scrambling sequence with a length 80 to scramble the 80 symbols 732 to produce 80 data points 742. The DMRS generation component 750 generates forty pilot symbols 752. The OCC component 760 applies an OCC with a length 2 to spread the twenty symbols 752 to forty pilot symbols 762. The scrambling component 770 applies a scrambling sequence with a length 40 to scramble the 40 symbols 762 to produce 40 data points 772. The multiplexing component 780 multiplexes the eighty data symbols 742 with the forty pilot symbols 772 to produce a sequence of 120 symbols 782. The tone map component 790 maps the 120 data points 782 to 120 subcarriers 212 (e.g., physical subcarriers or tones) based on an allocation (e.g., a frequency interlace $208_{(i)}$) given by a BS (e.g., the BSs 105 and/or 400) to produce an output signal 792.

Referring to FIG. 7B, for example, the frequency interlace 208(i) includes ten RBs 210 and each RB 210 includes eight data tones or subcarriers 704 (shown by the empty-filled boxes) and four DMRS tones or subcarriers 706 (shown by the patterned filled boxes). FIG. 7B illustrates tone mapping operations perform by the tone map component 790. As shown, the tone map component 790 maps the 120 data points 772 (output by the scrambling component 770) sequentially to the subcarriers 212 in the frequency interlace allocation. For example, the multiplexing component 780 may apply a data/tone DMRS mapping configuration that maps data symbols 732 to the data subcarriers 704 and maps pilot symbols 752 to the DMRS carriers 706 as shown in FIG. 7B.

FIG. 8 illustrates an UL control channel multiplexing scheme 800 according to some embodiments of the present disclosure. The scheme 800 multiplexes multiple UEs' PUCCH transmissions using tone interlacing or interlace frequency-division multiplex access (IFDMA). As an example, the multiplex is shown for four UEs, UE A, UE B, UE C, and UE D, which any be similar to the UEs 115 and 300. The scheme 800 uses different DMRS patterns for different users, where subcarriers 212 indexed 1, 4, 7, 10 are configured as DMRS tones 822 similar to a NR PUCCH DMRS configuration.

For example, the scheme 800 configures the UE A with the subcarriers 212 indexed 0, 4, 8, where subcarriers 212 indexed 0 and 8 are data tones 820 for transmitting UCI (e.g., the UCIs 520, 620, and/or 702) and the subcarrier 212 indexed 4 is a DMRS tone 822 for transmitting a DMRS (e.g., the DMRSs 522 and 622). The scheme 800 configures the UE B with the subcarriers 212 indexed 1, 5, 9, where subcarriers 212 indexed 5 and 9 are data tones 820 for transmitting UCI and the subcarrier 212 indexed 1 is a DMRS tone 822 for transmitting a DMRS. The scheme 800 configures the UE C with the subcarriers 212 indexed 2, 6, 10, where subcarriers 212 indexed 2 and 6 are data tones 820 for transmitting UCI and the subcarrier 212 indexed 10 is a DMRS tone 822 for transmitting a DMRS. The scheme 800 configures the UE D with the subcarriers 212 indexed 3, 7, 11, where subcarriers 212 indexed 3 and 11 are data tones 820 for transmitting UCI and the subcarrier 212 indexed 7 is a DMRS tone 822 for transmitting a DMRS. As can be observed, a UE may be given DMRS tones 822 and data tones 820 in different distribution patterns depending on the multiplexing, where the DMRS tone 822 can be the first, second, or third subcarriers 212 in a given allocation.

FIG. 9 illustrates an UL control channel multiplexing scheme 900 according to some embodiments of the present disclosure. Similar to the scheme 800, the scheme 900 multiplexes multiple UE's PUCCH transmission using tone interlacing or IFDMA. However, the scheme 800 configures the UE A, UE B, UE C, and UE D (e.g., the UEs 115 and 300) with the same DMRS-data tone distribution pattern, where the DMRS tone 922 is in the second subcarrier 212 within a given allocation. For example, the scheme 900 configures the UE A with the subcarriers 212 indexed 0, 4, 8, where subcarriers 212 indexed 0 and 8 are data tones 920 for transmitting UCI (e.g., the UCIs 520, 620, and/or 702) and the subcarrier 212 indexed 4 is a DMRS tone 922 for transmitting a DMRS (e.g., the DMRSs 522 and 622). The scheme 900 configures the UE B with the subcarriers 212 indexed 1, 5, 9, where subcarriers 212 indexed 1 and 9 are data tones 920 for transmitting UCI and the subcarrier 212 indexed 5 is a DMRS tone 922 for transmitting a DMRS. The scheme 900 configures the UE C with the subcarriers 212 indexed 2, 6, 10, where subcarriers 212 indexed 2 and 10 are data tones 920 for transmitting UCI and the subcarrier 212 indexed 6 is a DMRS tone 922 for transmitting a DMRS. The scheme 900 configures the UE D with the subcarriers 212 indexed 3, 7, 11, where subcarriers 212 indexed 3 and 11 are data tones 920 for transmitting UCI and the subcarrier 212 indexed 7 is a DMRS tone 922 for transmitting a DMRS. Since the DMRS-data tone distribution pattern is the same for all UEs, the scheme 900 may be simpler for UE's implementation.

FIG. 10 illustrates an UL control channel multiplexing scheme 1000 according to some embodiments of the present disclosure. The scheme 1000 multiplexes PUCCH transmissions from multiple UEs (e.g., the UEs 115 and 300), UE A, UE B, UE C, and UE D, by assigning each UE with a fraction of a RB 210 while using similar DMRS tones (e.g., in subcarriers 212 indexed 1, 4, 7, and 10) as a NR PUCCH DMRS configuration. For example, the scheme 1000 configures the UE A with the subcarriers 212 indexed 0, 1, 2, where subcarriers 212 indexed 0 and 2 are data tones 1020 for transmitting UCI (e.g., the UCIs 520, 620, and/or 702) and the subcarrier 212 indexed 1 is a DMRS tone 1022 for transmitting a DMRS (e.g., the DMRSs 522 and 622). The scheme 1000 configures the UE B with the subcarriers 212 indexed 3, 4, 5, where subcarriers 212 indexed 3 and 5 are data tones 1020 for transmitting UCI and the subcarrier 212 indexed 5 is a DMRS tone 1022 for transmitting a DMRS. The scheme 1000 configures the UE C with the subcarriers 212 indexed 6, 7, and 8, where subcarriers 212 indexed 6 and 8 are data tones 1020 for transmitting UCI and the subcarrier 212 indexed 7 is a DMRS tone 1022 for transmitting a DMRS. The scheme 1000 configures the UE D with the subcarriers 212 indexed 9, 10, 11, where subcarriers 212 indexed 9 and 11 are data tones 1020 for transmitting UCI and the subcarrier 212 indexed 10 is a DMRS tone 1022 for transmitting a DMRS.

FIGS. 11-17 illustrate various mechanisms for multiplexing UL control channel signals (e.g., with PUCCH format 3 data) from multiple UEs (e.g., the UEs 115 and the UE 300)

in the same frequency interlace (e.g., the frequency interlaces 208) using FDM and/or CDM. In FIGS. 11-17, the schemes 1100, 1200, 1300, 1400, 1600, and 1700 may be employed by a BS such as the BSs 105 and/or 400 and a UE such as the UEs 115 and/or 300 in a network such as the network 100 operating over a shared frequency band or an unlicensed frequency band. In particular, the BS may schedule multiple UEs to transmit UL control channel signals in the same frequency interlace and uses different mechanism to multiplex data (e.g., the UCI 520, 620, and/or 702) and DMRSs (e.g., the DMRSs 522 and/or 622). In some examples, UCI data and DMRSs from a single UE can be mapped to different OFDM symbols (e.g., the symbols 216). In some examples, when the PUCCH format 3 payload is larger, a DMRS may be transmitted in alternate subcarriers (e.g., the subcarriers 212) within an OFDM symbols, for example, similar to NR PUSCH transmissions and may use a DMRS sequence similar to the DMRS sequence used for NR DFT-spread-OFDM (DFT-S-OFDM) PUSCH. In some examples, the location of the DMRS is pre-defined in each cluster of RBs based on the number of DMRS per cluster and number of RBs per cluster. For simplicity of discussions, FIGS. 11 to 17 illustrate multiplexing among four UEs (e.g., a UE A, a UE B, a UE C, and a UE D) on one RB 210. However, the embodiments of the present disclosure may scale to multiplex any suitable number of UEs (e.g., about 2, 3, 5, 6, or more than 6) on any suitable number of RBs 210s (e.g., between about 2 to about 20) within a frequency interlace 208. Additionally, in FIGS. 11-17, the y-axes represent frequency in some arbitrary units. Further, the schemes 1100-1700 are described using the frequency interlace structure shown in FIG. 2, and may use the same reference numerals as in FIG. 2 for simplicity sake.

Figure 11:
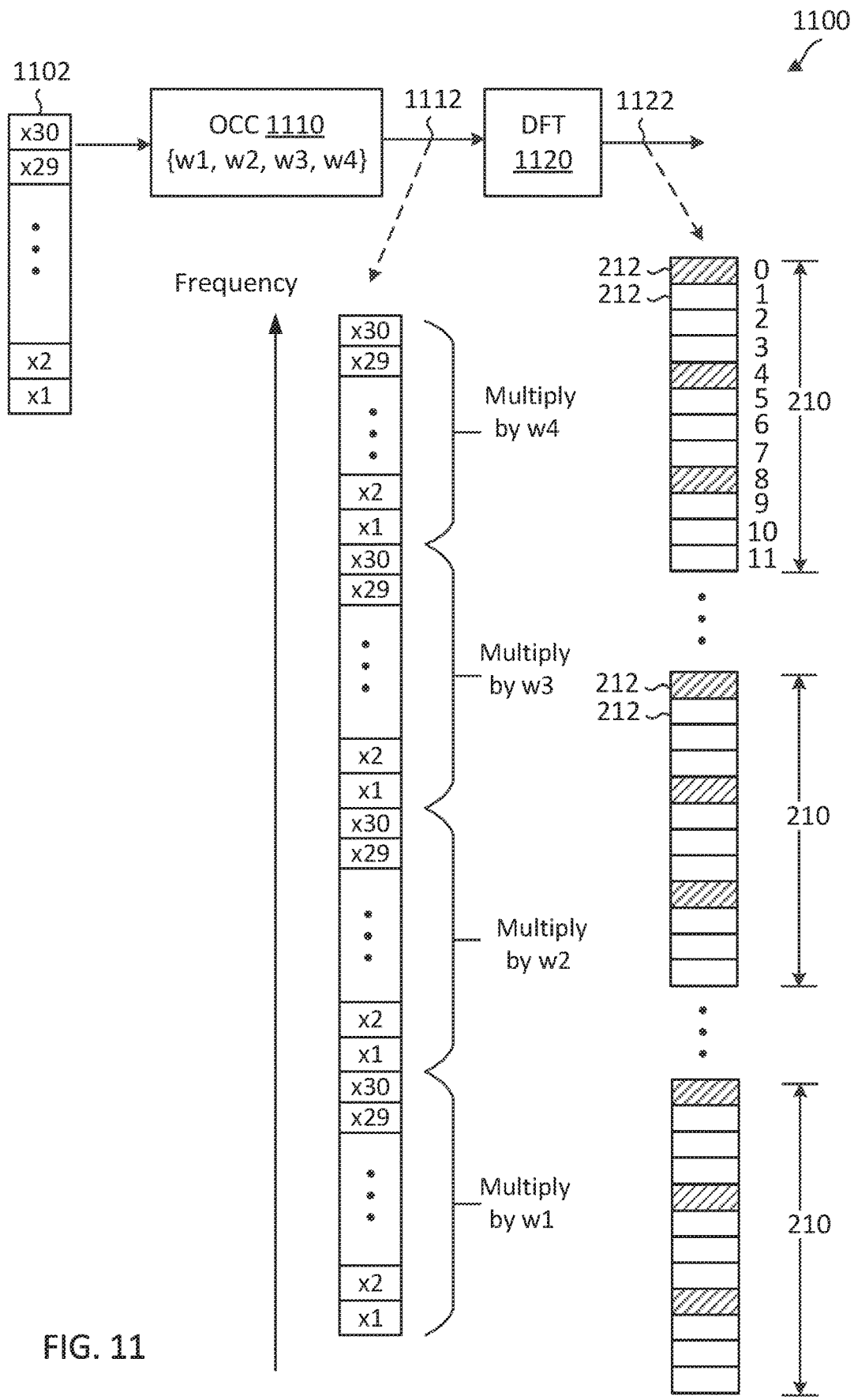
FIG. 11 illustrates an UL control channel multiplexing scheme according to some embodiments of the present disclosure.

FIG. 11 illustrates an UL control channel multiplexing scheme 1000 according to some embodiments of the present disclosure. The scheme 1100 applies pre-DFT OCC and DFT to multiplex UCI data from multiple UEs (e.g., the UEs 115 and 300), UE A, UE B, UE C, and UE D. The scheme 1100 includes an OCC component 1110 and a DFT component 1120. The OCC component 1110 and the DFT component 1120 can be implemented by hardware and/or software components and can be implemented by a UE (e.g., the UEs 115 and/or 300). The OCC component 1110 can be similar to the OCC component 730.

The OCC component 1110 is configured to receive encoded symbols 1102 and apply an OCC to the encoded symbols 1102 to produce spread symbols 1112. The encoded symbols 1102 may carry PUCCH format 3 data, which may include CQI, SR, and/or HARQ ACK/NACK. The encoded symbols 1102 may be generated from PUCCH format 3 UCI by applying encoding, scrambling, rate-matching, and modulation, for example, using components similar to the encode/rate-match component 710 and the modulation component 720. In an example, the scrambling can be performed by a PN sequence generator initialized based on a scrambling identifier (ID) assigned for a PUSCH of the UE. In an example, the modulation can be based on QPSK. In another example, the modulation can be based on half-pi (pi/2) binary-phase-shift keying (BPSK). The OCC can be any suitable orthogonal code. In an example, the OCC can have a length of 2 for multiplexing two UEs. The OCC can include {+1, +1} for one UE and {1, −1} for another UE. In another example, the OCC can have a length of 4 for multiplexing four UEs and can be denoted as {w1, w2, w3, w4}. The OCC can include {+1, +1, +1, +1}, {+1, −j, −1, +j}, {+1, −1, +1, −1}, and {+1, +j, −1, −j}, each assigned to one of the four UEs. The DFT component 1120 is configured to perform a DFT to the spread symbols 1112 to produce frequency data points 1122. Depending on the OCC, the DFT property of the frequency data points 1122 can occupy every fourth subcarriers, for example, in subcarriers 212 indexed {0, 4, 8, . . . }, {1, 5, 9, . . . }, {2, 6, 10, . . . }, or {3, 7, 11, . . . }. Subsequently, the data points 1122 can be mapped to subcarriers 212 of a frequency interlace (e.g., the frequency interlace $208_{I(0)}$) allocated by a BS (e.g., the BSs 105 and/or 400), for example, using a tone map component similar to the tone map component 790. Since the OCC is applied before the DFT, the OCC can be referred to as a pre-DFT OCC or a pre-DFT frequency spreading code.

As an example, UE A's the PUCCH format 3 UCI is encoded to a sequence of thirty symbols 1102 shown as {x1, x2, . . . , x29, x30}. The OCC component 1110 multiplies sequence of symbols 1102 by w1, w2, w3, and w4 and concatenates the multiplied symbols as shown to produce 120 symbols 1112. For example, the OCC is {+1, +1, +1, +1}. In general, for N encoded UCI symbols 1102, denoted as {x1, x2, . . . xN}, with an M-length OCC, denoted as {w1, w2, . . . , wM}, the sequence of spread symbols 1112 may be represented as {w1*x1, . . . w1*xN, w2*x1, . . . w2*xN, w3*x1, . . . w3*xN, . . . wM*x1, . . . wM*xN,}. In other words, the sequence of N encoded PUCCH format 3 UCI symbols 1102 {x1, x2, . . . xN} can be represented by x(n), where n varies from 1 to N, the M-length OCC {w1, w2, wM} is a sequence of M values represented by w(m), where m varies from 1 to M, and the OCC component 1110 is configured to, for each m, multiply w(m) by x(n) for n=1 to N to produce a multiplied sequence and concatenate each multiplied sequence to generate the spread symbols 1112.

The DFT component 1120 applies the DFT to the 120 symbols 1112 to produce a 120-point DFT output (e.g., the data points 1122), where every fourth subcarriers 212 are occupied (shown by the patterned boxes). The DFT property creates zero-values (shown by the empty-filled boxes) between the occupied subcarriers 212. For example, the subcarriers 212 indexed {0, 4, 8, . . . } are occupied. When another UE B is assigned with an OCC {+1, −1, +1, −1}, the UE B can apply the scheme 700 to generate 30 encoded UCI symbols (e.g., the symbols 1102) with a 120-point DFT output (e.g., the data points 1122) occupying a different set of subcarriers, for example, the subcarriers 212 indexed {2, 6, 10}.

In some embodiments, the pre-DFT OCC length can be limited to numbers (e.g., 1, 2, 3, 4, 6, or 12) that can fit within one chunk or portion of an interlace so that each chunk or portion may include an equal number of tones.

FIG. 12 illustrates an UL reference signal multiplexing scheme 1200 according to some embodiments of the present disclosure. The scheme 1200 multiplexes DMRSs from multiple UEs (e.g., the UEs 115 and 300), UE A, UE B, UE C, and UE D, using tone interlacing. The scheme 1200 assigns different UEs with different set of subcarriers 212 in a frequency interlace (e.g., a frequency interlace $208_{I(i)}$. The scheme 1200 can be used in conjunction with the scheme 1100. The scheme 1200 uses a long DMRS sequence (e.g., a ZC sequence, a PN sequence, or a CGS). For example, for a frequency interlace with ten RBs (e.g., the RBs 210) and a multiplex of four UEs, the scheme 1200 can use a DMRS sequence with a length of 30, where the DMRS may occupy the same tones as data in a symbol (e.g., the symbol 216) different than the data. A BS (e.g., the BSs 105 and 400) may assign a UE with a same set of subcarriers 212 as for the UCI data tones, where different UEs may be assigned with the same DMRS, but a different set of subcarriers 212. For example, the BS may assign the UE A with subcarriers 212 indexed 0, 4, and 8 in one symbol (e.g., the symbol 216) for UCI transmission and subcarriers 212 indexed 0, 4, and 8 in another symbol for DMRS transmission. The BS may assign the UE B with subcarriers 212 indexed 1, 5, and 9 in one symbol (e.g., the symbol 216) for UCI transmission and subcarriers 212 indexed 1, 5, and 9 in another symbol for DMRS transmission. The BS may assign the UE C with subcarriers 212 indexed 2, 6, and 10 in one symbol (e.g., the symbol 216) for UCI transmission and subcarriers 212 indexed 2, 6, and 10 in another symbol for DMRS transmission. The BS may assign the UE D with subcarriers 212 indexed 3, 7, and 11 in one symbol (e.g., the symbol 216) for UCI transmission and subcarriers 212 indexed 3, 7, and 11 in another symbol for DMRS transmission.

FIG. 13 illustrates an UL reference signal multiplexing scheme 1300 according to some embodiments of the present disclosure. The scheme 1300 multiplexes DMRSs from multiple UEs (e.g., the UEs 115 and 300), UE A, UE B, UE C, and UE D, using cyclic-shifts. The scheme 1300 can be used in conjunction with the scheme 1100. The scheme 1300 uses a long DMRS sequence (e.g., a ZC sequence, a PN sequence, or a CGS). For example, for a frequency interlace with ten RBs (e.g., the RBs 210) and a multiplex of four UEs, the scheme 1300 can use a DMRS sequence 1302 with a length of 120. A BS (e.g., the BSs 105 and 400) may assign different UEs with the same DMRS sequence 1302, but with different cyclic-shifts, denoted as CS 0, CS 1, CS 2, and CS 3. The cyclic-shift CS 0 (e.g., a cyclic-shift of 0) is assigned to the UE A. The cyclic-shift CS 1 (e.g., a cyclic-shift of 1) is assigned to the UE B. The cyclic-shift CS 2 (e.g., a cyclic-shift of 2) is assigned to the UE C. The cyclic-shift CS 3 (e.g., a cyclic-shift of 3) is assigned to the UE D. Each UE A, UE B, UE C, UE D may include a cyclic-shift component 1310 configured to apply a corresponding cyclic-shift to the DMRS sequence 1302 to produce a DMRS sequence 1312 and maps the DMRS sequence 1312 to RBs 210 of the assigned frequency interlace.

In some examples, the DMRS sequence length may change depending on the number of RBs 210 in the allocated interlace 208. Thus, the BS may provide the UE A and/or the UE B with a cyclic-shift index and the UE A and/or the UE B may compute the cyclic-shift value (e.g., the CS 0, CS 1, CS 2, and/or CS 3) based on the cyclic-shift index and/or the DMRS sequence length. As an example, for a DMRS sequence with a length of 120 with a multiplexing of four UEs, UE A, UE B, UE C, and UE D, the BS may assign the UE A, the UE B, the UE C, and the UE D with cyclic-shift indices of 0, 1, 2, and 3, respectively. The UE A may select a cyclic-shift value of 0 based on the assigned cyclic-shift index 0. The UE B may select a cyclic-shift value of 30 based on the assigned cyclic-shift index 1. The UE C may select a cyclic-shift value of 60 based on the assigned cyclic-shift index 2. The UE D may select a cyclic-shift value of 90 based on the assigned cyclic-shift index 3.

In some aspects, when applying a long DMRS sequence (e.g., a ZC sequence) with different cyclic-shift values for UE multiplexing, cyclic-shift values are selected for the UEs such that RB-wise orthogonality is achieved. In other words, the DMRSs transmitted by multiple UEs on the same frequency interlace 208 are to be orthogonal with each other for each RB within the frequency interlace 208. For instance, to achieve RB-wise orthogonality, the UEs may be assigned with DMRS cyclic-shift values that are separated by multiples of 10. For example, a UE A may be assigned with a cyclic-shift value of 10, a UE B may be assigned with a cyclic-shift value of 20, a UE C may be assigned with a cyclic-shift value of 30, and so on. Thus, for a frequency interlace 208 with 120 tones (e.g., the subcarriers 212) and a cyclic-shift value separation of 10, a maximum of 12 UEs can be multiplexed on the same frequency interlace 208. When multiplexing 2 UEs on a frequency interlace 208, the UEs may be assigned with cyclic-shifts separated by 60 (e.g., 120/2=60). When multiplexing 4 UEs on a frequency interlace 208, the UEs may be assigned with cyclic-shifts separated by 30 (e.g., 120/2=30). In general, if N number of UEs are multiplexed on a frequency interlace 208, each of the N UEs may be assigned with a cyclic-shift value as shown below:

$$CS_{UE(i)} = \frac{i \times L_{DMRS}}{N} + \Delta, \tag{1}$$

where i represents the UE index and may vary from 0 to N−1 with increment of 1 (e.g., 0:1:N−1), $CS_{UE(i)}$ represents the cyclic-shift assigned to the $i^{th}$ UE, $L_{DMRS}$ represents the length of the DMRS sequence, $\Delta$ may be selected from the set of values between 0 to $$\left(\frac{L_{DMRS}}{N}\right) - 1$$

with increment of 1

$$\left(e.g., 0:1:\left(\frac{L_{DMRS}}{N}\right) - 1\right).$$

In some aspects, the value for $\Delta$ can be preconfigured or predetermined. In some aspects, the value for $\Delta$ can be configured via RRC configuration. In some instances, a preconfigured RRC table may include a mapping between cyclic-shift values and OCC indices. In other words, an $i^{th}$ UE assigned with an OCC[i] may look up the $i^{th}$ entry of an RRC OCC index-cyclic-shift mapping table to obtain a cyclic-shift value for a DMRS transmission. For example, for multiplexing with two UEs, UE A and UE B, the UE A may be assigned with a OCC[0]={1,1}, and the UE B may be assigned with OCC[1]={1,−1}. The UE A may determine the DMRS cyclic-shift value by looking up the entry indexed 0 of the RRC OCC index-cyclic-shift mapping table RRC table. Similarly, the UE B may determine the DMRS cyclic-shift value by looking up the entry indexed 1 of the RRC OCC index-cyclic-shift mapping table RRC table.

In some aspects, multiple UEs may be multiplexed on two frequency interlaces 208, each including ten RBs. Thus, a DMRS length for transmitting in the two frequency interlaces is about 240. The selection of cyclic-shifts for multiplexing UEs on two frequency interlaces 208 can be performed using similar mechanisms as for one frequency interlace 208 as shown in Equation (1) discussed above, for example, by setting $L_{DMRS}$ to 240.

In some aspects, to improve performance for multiplexing 2 UEs or 4 UEs, a DMRS sequence can be selected from sequences that are orthogonal within two tones (e.g., subcarriers) or four tones, respectively.

FIG. 14 illustrates an UL reference signal multiplexing scheme 1400 according to some embodiments of the present disclosure. The scheme 1400 multiplexes DMRSs from multiple UEs (e.g., the UEs 115 and 300), UE A, UE B, UE C, and UE D, using frequency-domain (FD)-OCC. The scheme 1400 can be used in conjunction with the scheme 1100. The scheme 1400 uses a long DMRS sequence (e.g., a ZC sequence, a PN sequence, or a CGS). For example, for a frequency interlace with ten RBs (e.g., the RBs 210) and a multiplex of four UEs, the scheme 1400 can use a DMRS sequence 1402 with a length of 120. A BS (e.g., the BSs 105 and 400) may assign different UEs with the same DMRS sequence 1402, but with different FD-OCCs, denoted as {w1, w2, w3, and w4}. The UE A is assigned with the OCC {+1, +1, +1, +1}. The UE B is assigned with the OCC {+1, −j, −1, +j}. The UE C is assigned with the OCC {+1, −1, +1, −1}. The UE D is assigned with the OCC {+1, +j, −1, −j}. Each UE A, UE B, UE C, UE D may include an OCC component 1410 configured to apply a corresponding OCC to the DMRS sequence 1402 to produce a DMRS sequence 1412 and maps the DMRS sequence 1412 to RBs 210 of the assigned frequency interlace.

FIG. 15 illustrates an UL reference signal multiplexing scheme 1500 according to some embodiments of the present disclosure. The scheme 1500 multiplexes DMRSs from multiple UEs (e.g., the UEs 115 and 300), UE A, UE B, UE C, and UE D, using different sets of cyclic-shifts. The scheme 1500 can be used in conjunction with the scheme 1100. The scheme 1500 uses a short DMRS sequence (e.g., a ZC sequence, a PN sequence, or a CGS). For example, the scheme 1500 can use a DMRS sequence 1502 with a length of 12 irrespective of the number of RBs 210 in a frequency interlace (e.g., a frequency interlace $208_{I(i)}$. The DMRS sequence 1502 can be repeated for each RB 210 in the frequency interlace. To reduce the PAPR from the repetitions, the scheme 1500 applies a different cyclic-shift for each RB 210.

A BS (e.g., the BSs 105 and 400) may assign different UEs with the same DMRS sequence 1502, but with different sets of cyclic-shifts. For example, the UE A may be configured to start with applying a cyclic-shift of 0 to the DMRS sequence 1502 for a first RB 210 of the frequency interlace, a cyclic-shift of 1 to the DMRS sequence 1502 for a next RB 210 of the frequency interlace, and cycle through the cycle-shifts (e.g., 2, 3, . . . 9) for subsequent RBs 210 in the frequency interlace. The UE B may be configured to start with a cyclic-shift of 1 for a first RB 210 of the frequency interlace, a cyclic-shift of 2 for a next RB 210 of the frequency interlace, and cycle through the cycle-shifts (e.g., 3, . . . 9, 10) for subsequent RBs 210 in the frequency interlace.

Each UE A, UE B, UE C, UE D may include a cyclic-shift cycling component 1510 configured to apply a corresponding cyclic-shift to the DMRS sequence 1502 for each RB 210 by cycling through the set of cyclic-shifts (e.g., 0, 1, . . . , 9) to produce a DMRS sequence 1512 and maps the DMRS sequence 1512 to RBs 210 of the assigned frequency interlace.

In an example, the DMRS sequence may have a length of 12. The cyclic-shift cycling component 1510 may compute the cyclic-shift by applying a modulo 12. In general, the cyclic shift can be computed as shown below:

$$CS(n) = \mod(CS(0) + nX, 12), \quad (2)$$

where n represents the RB index in the interlace, X represents the cyclic shift step-size, CS(0) represents the initial cyclic shift, and X can be configured by the BS.

FIG. 16 illustrates an UL reference signal multiplexing scheme 1600 according to some embodiments of the present disclosure. The scheme 1600 multiplexes DMRSs from multiple UEs (e.g., the UEs 115 and 300), UE A, UE B, UE C, and UE D, using different sets of cyclic-shifts. The scheme 1600 can be used in conjunction with the scheme 1100. The scheme 1600 uses a short DMRS sequence (e.g., a ZC sequence, a PN sequence, or a CGS). For example, the scheme 1600 can use a DMRS sequence 1602 with a length of 12 irrespective of the number of RBs 210 in a frequency interlace (e.g., a frequency interlace $208_{I(i)}$. The DMRS sequence 1602 can be repeated for each RB 210 in the frequency interlace. To reduce the PAPR from the repetitions, the scheme 1600 applies a different phase-rotation for each RB 210. A BS (e.g., the BSs 105 and 400) may assign different UEs with the same DMRS sequence 1602, but with different sets of phase-rotations. For example, the UE A may be configured apply a phase-rotation of θ (e.g., denoted as P0) degrees to the DMRS sequence 1602 for a first RB 210 of the frequency interlace, a phase-rotation of θ+Δ (e.g., denoted as P1) degrees to the DMRS sequence 1602 for a next RB 210 of the frequency interlace, and apply the phase-rotations with a step of Δ degrees (e.g., 2Δ, 3Δ, . . . 9Δ) for subsequent RBs 210 in the frequency interlace. The UE B may be configured to apply a different phase rotation of α degrees to the DMRS sequence 1602 for a first RB 210 of the frequency interlace, a phase-rotation of α+Δ degrees to the DMRS sequence 1602 for a next RB 210 in the next RB 210 of the frequency interlace, and apply the phase-rotations with a step of Δ degrees (e.g., 2Δ, 3Δ, . . . 9Δ) for subsequent RBs 210 in the frequency interlace. In some examples, different UEs may be assigned with different step-sizes. Each UE A, UE B, UE C, UE D may include a phase-rotation component 1610 configured to apply a corresponding phase-rotation to the DMRS sequence 1502 for each RB 210 and incrementing the phase-rotation in a certain step-size for each subsequent RB 210 to produce a DMRS sequence 1612 and maps the DMRS sequence 1612 to RBs 210 of the assigned frequency interlace.

FIG. 17 illustrates an UL reference signal multiplexing scheme 1700 according to some embodiments of the present disclosure. The scheme 1700 multiplexes DMRSs from multiple UEs (e.g., the UEs 115 and 300), UE A, UE B, UE C, and UE D, using different sets of cyclic-shifts. The scheme 1700 can be used in conjunction with the scheme 1100. The scheme 1700 uses a short DMRS sequence (e.g., a ZC sequence, a PN sequence, or a CGS). For example, the scheme 1700 can use a DMRS sequence 1712 with a length of 12 irrespective of the number of RBs 210 in a frequency interlace (e.g., a frequency interlace $208_{I(i)}$. The DMRS sequence 1712 can be generated with a different sequence root index for each RB 210 in the frequency interlace. A BS (e.g., the BSs 105 and 400) may assign different UEs with a different set of root sequences. For example, the UE A may be configured generate a DMRS sequence 1712 with a root index 0 (e.g., R0) for a first RB 210 of the frequency interlace, a DMRS sequence 1712 with a root index 1 (e.g., R1) for a next RB 210 of the frequency interlace, and incrementing the root index (e.g., 2, 3, . . . 9) for subsequent RBs 210 in the frequency interlace. The UE B may be configured to generate a DMRS sequence 1712 with a root index 1 for a first RB 210 of the frequency interlace, a DMRS sequence 1712 with a root index 2 for a next RB 210 of the frequency interlace, and incrementing the root index (e.g., 3, 4, . . . 10) for subsequent RBs 210 in the frequency interlace. Each UE A, UE B, UE C, UE D may include a DMRS generation component 1710 configured to generate a DMRS sequence 1712 based on a corresponding sequence root index for each RB 210 and incrementing the root index (e.g., in a certain step-size) for each subsequent RB 210 and maps the DMRS sequence 1712 to RBs 210 of the assigned frequency interlace.

FIGS. 18-23 illustrate various mechanisms for generating DMRSs with a wide bandwidth for use with PUCCH transmissions. For example, an unlicensed frequency band of 80 MHz can be partitioned into about four 20 MHz channels or subband (e.g., the frequency band 202). In some instances, a BS (e.g., the BSs 105 and 400) may configure UEs (e.g., the UEs 115 and 300) to transmit PUCCH signals (e.g., PUCCH format 2 or PUCCH format 3) in frequency interlaces (e.g., the frequency interlaces $208_{I(i)}$ extending over two subbands and/or multiplex multiple UEs on a frequency interlaces extending over two subbands. In FIGS. 18-23, the schemes 1800, 1900, 2000, 2100, 2200, and 2300 may be employed by a BS such as the BSs 105 and/or 400 and a UE such as the UEs 115 and/or 300 in a network such as the network 100 operating over a shared frequency band or an unlicensed frequency band. In particular, the BS may configure a UE to transmit a wide-band DMRSs, for example, in a frequency interlace having more than ten RBs (e.g., the RBS 210). For simplicity of discussions, FIGS. 18 to 23 illustrate DMRS transmission for a single UE (e.g., the UEs 115 and 400). However, the embodiments of the present disclosure may scale to apply to any suitable number of UEs (e.g., about 2, 3, 5, 6, or more than 6) on any suitable number of RBs 210s (e.g., between about 2 to about 20) within a frequency interlace 208 and can be used in conjunction with the scheme 1100, which multiplexes UCI of different UEs using pre-DFT OCC. Additionally, in FIGS. 18-23, the y-axes represent frequency in some arbitrary units. Further, the schemes 1800-2300 are described using the frequency interlace structure shown in FIG. 2, and may use the same reference numerals as in FIG. 2 for simplicity sake.

Figures 18, 19, 20:
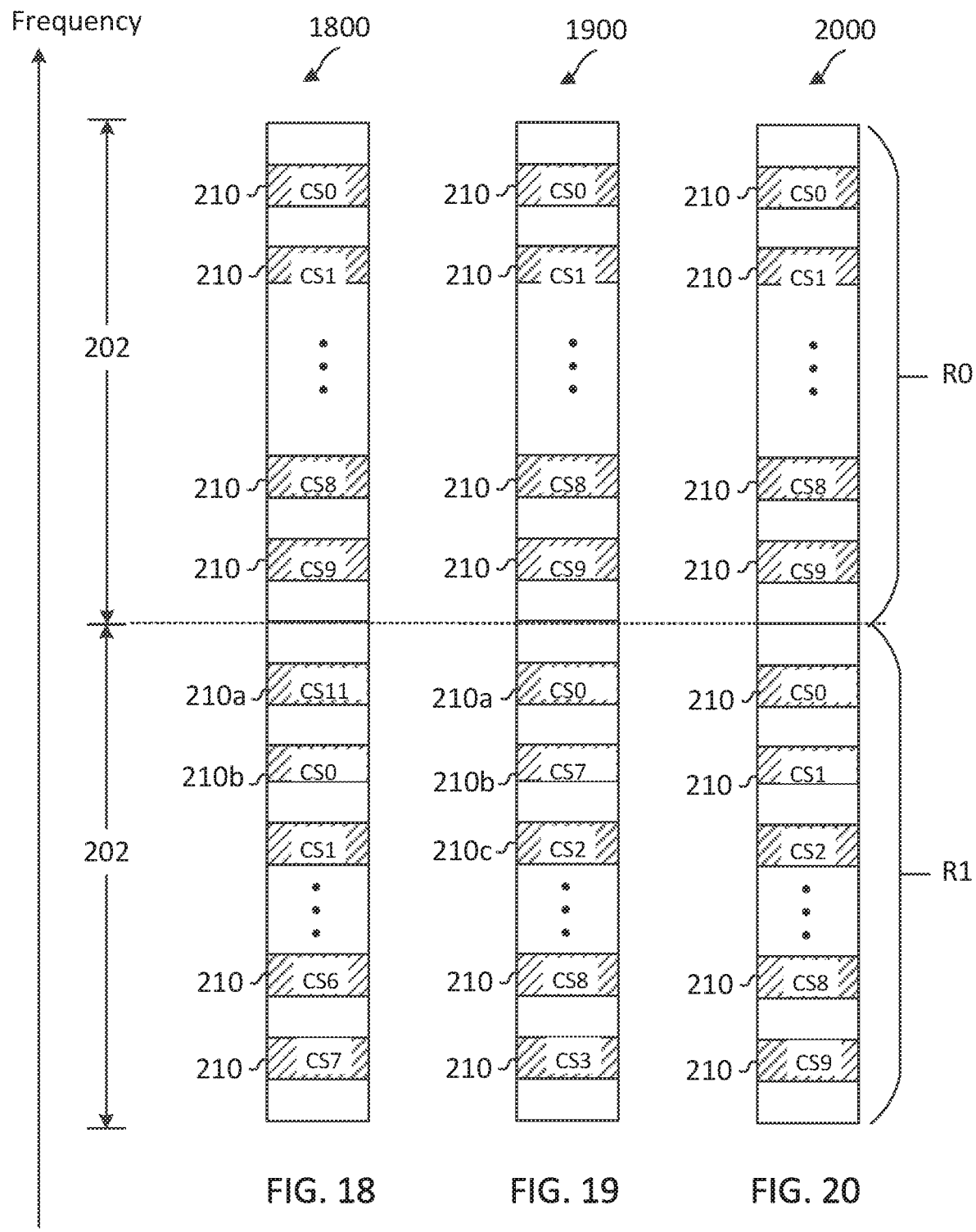
FIG. 18 illustrates a wide-band reference signal transmission scheme according to some embodiments of the present disclosure.
FIG. 19 illustrates a wide-band reference signal transmission scheme according to some embodiments of the present disclosure.
FIG. 20 illustrates a wide-band reference signal transmission scheme according to some embodiments of the present disclosure.

FIG. 18 illustrates a wide-band reference signal transmission scheme 1800 according to some embodiments of the present disclosure. The scheme 1800 uses a short DMRS sequence (e.g., a ZC sequence, a PN sequence, or a CGS). For example, the scheme 1800 can use a DMRS sequence (e.g., the DMRS sequences 1502, 1602, and 1712) with a length of 12 irrespective of the number of RBs 210 in a frequency interlace (e.g., a frequency interlace $208_{I(i)}$. The DMRS sequence can be repeated for each RB 210 in the frequency interlace. To reduce the PAPR from the repetitions, a BS (e.g., the BSs 105 and 400) may configure a UE to cycle through twelve cyclic-shifts available for a length-12 sequence for the RBs 210 in the frequency interlace. The scheme 1800 is illustrated for a frequency interlace $208_{I(i)}$ with ten RBs 210 in each channel or subband 202. As shown, the UE may apply a cyclic-shift of 0, denoted as CS0, to the DMRS sequence mapped to a first RB 210 in the frequency interlace $208_{I(i)}$. The UE may apply a cyclic-shift of 1, denoted as CS1, to the DMRS sequence mapped to a second RB 210 in the frequency interlace $208_{I(i)}$. The UE may apply a cyclic-shift of 2, denoted as CS2, to the DMRS sequence mapped to a third RB 210 in the frequency interlace $208_{I(i)}$ and continue with incrementing the cyclic-shift by 1 for each subsequent RB 210 of the frequency interlace $208_{I(i)}$. After exhausting the 12 cyclic-shifts from 0 to 11, the UE may cycle through the cyclic-shifts from 0 again. As shown, the UE applies a cyclic-shift of 0 (CS0) to the DMRS sequence mapped to the RB 210b subsequent to the RB 210a where a cyclic-shift of 11 was applied.

FIG. 19 illustrates a wide-band reference signal transmission scheme 1900 according to some embodiments of the present disclosure. The scheme 1900 uses a short DMRS sequence (e.g., a ZC sequence, a PN sequence, or a CGS). For example, the scheme 1900 can use a DMRS sequence (e.g., the DMRS sequences 1502, 1602, and 1712) with a length of 12 irrespective of the number of RBs 210 in a frequency interlace (e.g., a frequency interlace $208_{I(i)}$. The DMRS sequence can be repeated for each RB 210 in the frequency interlace. To reduce the PAPR from the repetitions, a BS (e.g., the BSs 105 and 400) may configure a UE to use different cyclic-shift step-size for different subbands 202. The scheme 1900 is illustrated for a frequency interlace $208_{I(i)}$ with ten RBs 210 in each channel or subband 202.

As an example, the UE may use a cyclic-shift step-size of 1 for one subband 202 and a cyclic-shift step-size of 7 for a next subband 202. In a first subband 202 (shown in the top half of the FIG. 19), the UE may apply a cyclic-shift of 0, denoted as CS0, to the DMRS sequence mapped to a first RB 210 in the frequency interlace $208_{I(i)}$, a cyclic-shift of 1, denoted as CS1, to the DMRS sequence mapped to a second RB 210 in the frequency interlace $208_{I(i)}$. The UE may apply a cyclic-shift of 2, denoted as CS2, to the DMRS sequence mapped to a third RB 210 in the frequency interlace $208_{I(i)}$ and continue with incrementing the cyclic-shift by 1 for each subsequent RB 210 of the frequency interlace $208_{I(i)}$. In a next subband 202 (shown in the bottom half of the FIG. 19), the UE may apply a cyclic-shift of 0, denoted as CS0, to the DMRS sequence mapped to a RB 210a in the frequency interlace $208_{I(i)}$. The UE may apply a cyclic-shift of 7, denoted as CS7, to the DMRS sequence mapped to a next RB 210b in the frequency interlace $208_{I(i)}$, a cyclic-shift of 2, denoted as CS2, to the DMRS sequence mapped to a third RB 210 in the frequency interlace $208_{I(i)}$ and continue with incrementing the cyclic-shift by 7 with a modulo of 12 for each subsequent RB 210 of the frequency interlace $208_{I(i)}$.

FIG. 20 illustrates a wide-band reference signal transmission scheme 2000 according to some embodiments of the present disclosure. The scheme 2000 uses a short DMRS sequence (e.g., a ZC sequence, a PN sequence, or a CGS). For example, the scheme 2000 can use a DMRS sequence (e.g., the DMRS sequences 1502, 1602, and 1712) with a length of 12 irrespective of the number of RBs 210 in a frequency interlace (e.g., a frequency interlace $208_{I(i)}$). The DMRS sequence can be repeated for each RB 210 in the frequency interlace. To reduce the PAPR from the repetitions, a BS (e.g., the BSs 105 and 400) may configure a UE to use different root induces for different subbands 202. The scheme 2000 is illustrated for a frequency interlace $208_{I(i)}$ with ten RBs 210 in each channel or subband 202.

As an example, the UE may generate a DMRS sequence with a root index of 0, denoted as R0 for a first subband 202 (shown in the top half of FIG. 20) and a root index of 1, denoted as R1 for a next subband 202 (shown in the bottom half of FIG. 20). The UE may apply a different cyclic-shift to the DMRS sequence for each RB 210 in a subband 202 by incrementing the cyclic-shift, for example, by 1, for each RB 210.

FIG. 21 illustrates a wide-band reference signal transmission scheme 2100 according to some embodiments of the present disclosure. The scheme 2100 uses a short DMRS sequence (e.g., a ZC sequence, a PN sequence, or a CGS). For example, the scheme 2100 can use a DMRS sequence (e.g., the DMRS sequences 1502, 1602, and 1712) with a length of 12 irrespective of the number of RBs 210 in a frequency interlace (e.g., a frequency interlace $208_{I(i)}$). The DMRS sequence can be repeated for each RB 210 in the frequency interlace. To reduce the PAPR from the repetitions, a BS (e.g., the BSs 105 and 400) may configure a UE to a different phase-rotations to the DMRS sequence for different subbands 202. The scheme 2100 is illustrated for a frequency interlace $208_{I(i)}$ with ten RBs 210 in each channel or subband 202.

As an example, the UE may use a phase-rotation, denoted as P0, for one subband 202 and a phase-rotation, denoted as P1, for a next subband 202. In a first subband 202 (shown in the top half of the FIG. 19), the UE may apply a cyclic-shift of 0, denoted as CS0, with a phase-rotation P0 to the DMRS sequence mapped to a first RB 210 in the frequency interlace $208_{I(i)}$. The UE may apply a cyclic-shift of 1, denoted as CS1, with a phase-rotation P0 to the DMRS sequence mapped to a second RB 210 in the frequency interlace $208_{I(i)}$. The UE may apply a cyclic-shift of 2, denoted as CS2, to the DMRS sequence mapped to a third RB 210 in the frequency interlace $208_{I(i)}$ and continue with incrementing the cyclic-shift by 1 with a phase-rotation P0 for each subsequent RB 210 of the frequency interlace $208_{I(i)}$. In a next subband 202 (shown in the bottom half of the FIG. 19), the UE may apply a cyclic-shift of 0, denoted as CS0, with a phase-rotation P1 to the DMRS sequence mapped to a RB 210a in the frequency interlace $208_{I(i)}$. The UE may apply a cyclic-shift of 1, denoted as CS1, with a phase-rotation P1 to the DMRS sequence mapped to a next RB 210 in the frequency interlace $208_{I(i)}$. The UE may apply a cyclic-shift of 2, denoted as CS2, with a phase-rotation P1 to the DMRS sequence mapped to a third RB 210c in the frequency interlace $208_{I(i)}$ and continue with incrementing the cyclic-shift by 1 with a phase-rotation P1 for each subsequent RB 210 of the frequency interlace $208_{I(i)}$.

FIG. 22 illustrates a wide-band reference signal transmission scheme 2200 according to some embodiments of the present disclosure. The scheme 2200 uses a short DMRS sequence (e.g., a ZC sequence, a PN sequence, or a CGS). For example, the scheme 2200 can use a DMRS sequence (e.g., the DMRS sequences 1502, 1602, and 1712) with a length of 12 irrespective of the number of RBs 210 in a frequency interlace (e.g., a frequency interlace $208_{I(i)}$. The DMRS sequence can be repeated for each RB 210 in the frequency interlace. To reduce the PAPR from the repetitions, a BS (e.g., the BSs 105 and 400) may transmit a DMRS in alternating RBs of the frequency interlace $208_{I(i)}$ (e.g., a partial interlace). In other words, the UE may skip DMRS transmission in every other RB 210 within the frequency interlace $208_{I(i)}$ as shown by the cross symbols. The UE may apply a different cyclic-shift to the DMRS sequence for each subsequent alternating RB 210 in a subband 202 by incrementing the cyclic-shift, for example, by 1, for each subsequent alternating RB 210. The transmission of DMRSs in alternating RBs 210 can avoid repeating a cyclic-shift in the frequency interlace $208_{I(i)}$, and thus may prevent having a high PAPR.

FIG. 23 illustrates a wide-band reference signal transmission scheme 2300 according to some embodiments of the present disclosure. The scheme 2300 uses a longer DMRS sequence (e.g., a ZC sequence, a PN sequence, or a CGS). For example, the scheme 2300 can use a DMRS sequence with a length of 24. The DMRS sequence can be repeated for a cluster 2310 of RBs 210 (e.g., 2 contiguous RBs 210) in a frequency interlace $208_{I(i)}$. The UE may apply a different cyclic-shift to the DMRS sequence for each cluster 2310 of RBs 210 in a subband 202 by incrementing the cyclic-shift, for example, by 1, for each subsequent cluster 2310 of RBs 210. The transmission of a longer DMRS sequence can avoid repeating a cyclic-shift in the frequency interlace $208_{I(i)}$, and thus may prevent having a high PAPR.

In another embodiment, instead of using a length-24 DMRS sequence, a BS (e.g., the BSs 105 and 400) can configure UEs (e.g., the UEs 115 and 300) to use a long DMRS sequence with a length corresponding to a size or number of subcarriers (e.g., the subcarriers 212) in a frequency interlace $208_{I(i)}$. For example, a wide-band frequency interlace $208_{I(i)}$ having twenty RBs (e.g., the RBs 210) with 240 subbcarriers, the BS can configure a UE with a length-240 DMRS sequence with a cyclic-shift 0 and without having to cycle through different cyclic-shifts. In such an embodiment, a different DMRS sequences with different lengths may be required for frequency interlace of different sizes.

In some embodiments, some UEs (e.g., the UEs 115 and 300) may use one channel or subband (e.g., the frequency band 202), while other UEs may use two channels or subbands. In an example, a BS (e.g., the BSs 105 and 400) may not allow UE multiplexing in wide-band frequency interlaces (frequency interlace $208_{I(i)}$). In an example, a BS may allow orthogonal multiplexing among UEs with frequency interlace allocations having the same BW. For example, a BS multiplex a UE A and UE B, each allocated with a frequency interlace with a 20 MHz BW. Conversely, a BS may not multiplex A UE with a UE B when the UE A is assigned with a frequency interlace over a BW of 40 MHz and the UE B is assigned with a frequency interlace over a BW of 20 MHz. In an example, a BS may allow orthogonal multiplexing among UEs with frequency interlace allocations having different BWs. For example, a BS may multiplex a UE A assigned with a frequency interlace over a BW of 40 MHz (e.g., a first subband 202 and a second subband 202) and a UE B assigned with a frequency interlace over a BW of 20 MHz (e.g., the first subband 202 or the second subband 202).

Figure 24:
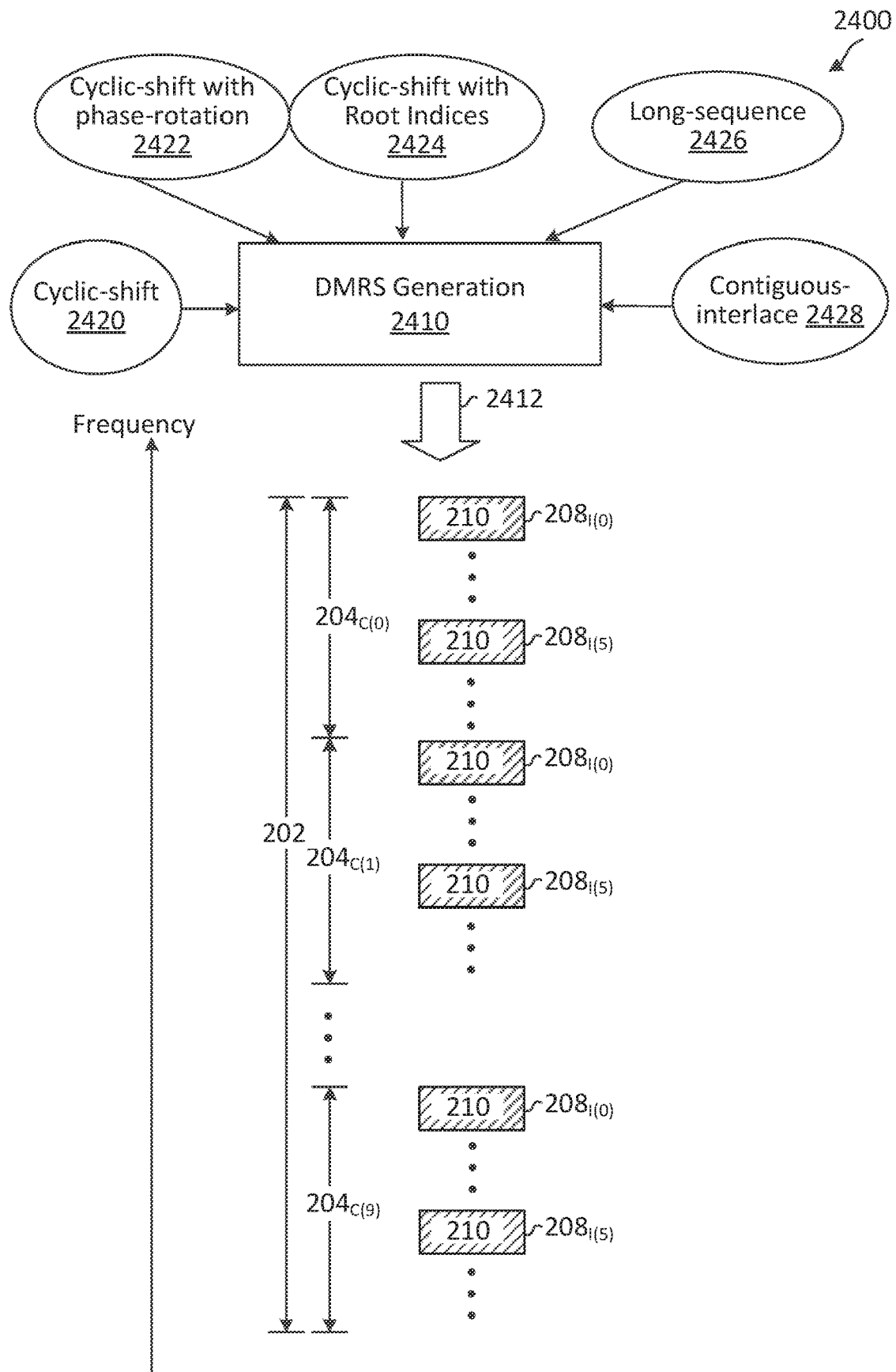
FIG. 24 illustrates a reference signal transmission scheme using multiple frequency interlaces according to some embodiments of the present disclosure.

FIG. 24 illustrates a reference signal transmission scheme 2400 using multiple frequency interlaces according to some embodiments of the present disclosure. The scheme 2400 may be employed by a BS such as the BSs 105 and/or 400 and a UE such as the UEs 115 and/or 300 in a network such as the network 100 operating over a shared frequency band or an unlicensed frequency band. The BS may configure a UE with multiple frequency interlaces for PUCCH transmission. The BS may employ the scheme 2400 to configure the UE for PUCCH DMRS transmission. For simplicity of discussions, FIG. 24 illustrate DMRS transmission for a single UE (e.g., the UEs 115 and 400) on two frequency interlaces (e.g., the frequency interlaces $208_{I(0)}$ and $208_{I(5)}$). However, the embodiments of the present disclosure may scale to apply to any suitable number of UEs (e.g., about 2, 3, 5, 6, or more than 6) on any suitable number of frequency interlaces (e.g., about 3, 4, or more) and can be used in conjunction with the scheme 1100, which multiplexes UCI of different UEs using pre-DFT OCC. In FIG. 24, the y-axis represents frequency in some arbitrary units. The scheme 2400 is described using the frequency interlace structure shown in FIG. 2, and may use the same reference numerals as in FIG. 2 for simplicity sake.

As an example, a BS (e.g., the BSs 105 and 400) assigns a UE (e.g., the UEs 115 and 300) with an allocation including a frequency interlace $208_{I(0)}$ and a frequency interlace $208_{I(5)}$. Each frequency interlace $208_{I(0)}$, $208_{I(5)}$ may include about ten RBs 210. Thus, the allocation includes a total of twenty RBs 210. The scheme 2400 includes a DMRS generation component 2410. The DMRS generation component 2410 can be implemented by hardware and/or software components and can be implemented by a UE (e.g., the UEs 115 and/or 300). The DMRS generation component 2410 is configured to generate a DMRS 2412 for transmissions in multiple frequency interlaces 208. The generation can be based a cyclic-shift mode 2420, a cyclic-shift with phase rotation mode 2422, a cyclic-shift with root indices mode 2424, a long sequence mode 2426, or a contiguous-interlace mode 2428.

In an example, the DMRS generation component 2410 is configured to generate a DMRS 2412 based on the cyclic-shift mode 2420. For example, the DMRS generation component 2410 may generate a DMRS sequence of length 12. The DMRS generation component 2410 may apply a different cyclic-shift to the DMRS sequence for mapping to each RB 210 in the frequency interlace. The DMRS generation component 2410 may increment the cyclic-shift by 1 or any suitable cyclic-shift step-size value for each subsequent RB 210 in the frequency interlace $208_{I(0)}$ and $208_{I(5)}$ (e.g., in a frequency order) and may repeat the cyclic-shifts after exhausting the 12 available cyclic-shifts (e.g., from 0 to 11) to provide the DMRS 2412, for example, similar to the schemes 1800 and 1900 described above with respect to FIGS. 18 and 19, respectively. With twenty RBs 210 in the frequency interlaces $208_{I(0)}$ and $208_{I(5)}$, the DMRS generation component 2410 may apply cyclic-shifts 0, 1, 2, ..., 11, 0, 1, ..., 8, one for each of the RBs 210. As can be seen, some cyclic-shifts (e.g., 0 to 8) are repeated in the frequency interlaces $208_{I(0)}$ and $208_{I(5)}$. The repetitions can cause a PAPR increase.

In an example, the DMRS generation component 2410 is configured to generate a DMRS 2412 based on the cyclic-shift with phase-rotation mode 2422. For example, the DMRS generation component 2410 may generate a DMRS sequence of length 12. The DMRS generation component 2410 may apply a different cyclic-shift to the DMRS sequence for mapping to each RB 210 in the frequency interlace to provide the DMRS 2412. The DMRS generation component 2410 may increment the cyclic-shift by 1 or any suitable cyclic-shift step-size value for each subsequent RB 210 in the frequency interlace $208_{I(0)}$ and $208_{I(5)}$ (e.g., in a frequency order). Additionally, DMRS generation component 2410 can apply a phase-rotation to the DMRS sequence for mapping to the RBs 210. For example, after exhausting the available cyclic-shifts (e.g., 0 to 11), the DMRS generation component 2410 can repeat the cyclic-shifts with a different phase-rotation for subsequent RBs 210, for example, similar to the scheme 2100 described above with respect to FIG. 21. With twenty RBs 210 in the frequency interlaces $208_{I(0)}$ and $208_{I(5)}$, the DMRS generation component 2410 may apply cyclic-shifts {0, 1, 2, ..., 11} one for each of the first twelve RBs in a frequency order, followed by cyclic-shifts {0, 1, 2, ..., 8} with a phase-rotation of 0 degree for the next eight RBs 210 in a frequency order. The combination of cyclic-shifts and phase-rotations may provide a lower PAPR for the DMRS 2412 than the cyclic-shift mode 2420.

In an example, the DMRS generation component 2410 is configured to generate a DMRS 2412 based on the cyclic-shift with root indices mode 2424. For example, the DMRS generation component 2410 may generate a first DMRS sequence of length 12 using a first root index (e.g., a root index of 0). The DMRS generation component 2410 may apply a different cyclic-shift to the first DMRS sequence for mapping to each RB 210 in the frequency interlace to provide the DMRS 2412. The DMRS generation component 2410 may increment the cyclic-shift by 1 or any suitable cyclic-shift step-size value for each subsequent RB 210 in the frequency interlace $208_{I(0)}$ and $208_{I(5)}$ (e.g., in a frequency order). Additionally, after exhausting the available cyclic-shifts (e.g., 0 to 11), the DMRS generation component 2410 can generate a second DMRS sequence with a different root index (e.g., by incrementing the root index by 1 or any suitable value) and cycle through the cyclic-shifts when mapping the second DMRS sequence to subsequent RBs 210, for example, similar to the scheme 2000 described above with respect to FIG. 20. With twenty RBs 210 in the frequency interlaces $208_{I(0)}$ and $208_{I(5)}$, a first DMRS sequence with a root index R0 may be mapped to the first twelve RBs 210 with one of the cyclic-shifts {0, 1, ..., 11} for each RB 210. A second DMRS sequence with a root index R1 may be mapped to the remaining eight RBs 210 with one of the cyclic-shifts {0, 1, ..., 8} for each RB 210. The combination of cyclic-shifts and root indices may provide a lower PAPR for the DMRS 2412 than the cyclic-shift mode 2420.

In an example, the DMRS generation component 2410 is configured to generate a DMRS 2412 based on the long-sequence mode 2426. For example, the DMRS generation component 2410 may generate a DMRS sequence with a length corresponding to the size (e.g., total number of subcarriers 212) of the frequency interlaces $208_{I(0)}$ and $208_{I(5)}$. When each frequency interlace 208 include ten RBs, the DMRS generation component 2410 may generate a 120-length DMRS sequence 2412 and map the DMRS sequence 2412 to RBs 210 in the frequency interlaces $208_{I(0)}$ and $208_{I(5)}$.

In an example, the DMRS generation component 2410 is configured to generate a DMRS 2412 based on the contiguous-interlace mode 2428. For example, the DMRS generation component 2410 may generate a DMRS sequence with a length corresponding to the size (e.g., total number of subcarriers 212) of contiguous frequency interlaces 208 (e.g., frequency interlaces $208_{I(0)}$ and $208_{I(1)}$). When each frequency interlace 208 includes ten RBs, the DMRS generation component 2410 may generate a 24-length DMRS sequence 2412. The DMRS generation component 2410 may apply a different cyclic-shift (e.g., 0 to 19) to the DMRS sequence for mapping to each RB 210 in the frequency interlace to provide the DMRS 2412, for example, similar to the scheme 2300 described above with respect to FIG. 23.

In some embodiments, the selection of the modes 2420, 2422, 2424, 2426, 2428 can be dependent on the SCS used for the DMRS communications. For example, the BS may determine a DMRS pattern generation mode (e.g., one of the modes 2420, 2422, 2424, 2426, 2428) based on the SCS of the DMRS and configure the UE with the selected mode. In an example, with a SCS of 60 kHz and a PUCCH allocation with two interlaces, the PUCCH is transmitted using a full-band PUCCH, and thus a long ZC sequence with a length equal to the total number of subcarriers 212 in the full-band PUCCH may be used for DMRS generation.

In some embodiments, for allocations with multiple frequency interlace (e.g., the frequency interlaces 208), a BS (e.g., the BSs 105 and 400) may apply certain rules in multiplexing UEs. In an example, the BS may not allow UE multiplexing with multiple frequency interlaces. In an example, the BS may allow multiplexing among UEs allocated with the same number of frequency interlaces. In an example, the BS may configure a UE with two frequency interlaces. The BS may not allow UE multiplexing when the UE switches to use one frequency interlace. In an example, the BS may configure a UE with two frequency interlaces and may allow UE multiplexing when the UE uses one interlace, but may not allow UE multiplexing when the UE uses the two interlaces. In an example, the BS may configure a UE with two frequency interlaces and may restrict the UE to use the two frequency interlaces. In an example, the BS may configure a UE with two frequency interlaces and may allow the UE to use one frequency interlace (e.g., the payload may be small and the UE may determine that one frequency interlace is sufficient in transmitting the payload).

In some embodiments, a BS (e.g., the BSs 105 and 400) may restrict the allocation of multiple frequency interlaces (e.g., the frequency interlaces 208) to have a uniform frequency distribution pattern. In other words, the RBs 210 from the multiple frequency interlaces are to be uniformly spaced across frequency. In an example, for a 15 kHz SCS, the BS may configure an allocation with frequency interlace $208_{I(0)}$ and $208_{I(5)}$, but may not configure an allocation with frequency interlaces $208_{I(0)}$ and $208_{I(3)}$. In an example, for a 30 kHz SCS, the BS may configure an allocation with frequency interlace $208_{I(0)}$ and $208_{I(1)}$, but may not configure an allocation with frequency interlaces $208_{I(0)}$ and $208_{I(3)}$. Thus, allocations of multiple frequency interlaces can be dependent on the SCS. In some aspects, the uniform allocation is applied for communications with DFT-s-OFDM.

In some embodiments, when performing UE multiplexing for PUCCH transmission, the multiplexing factor or OCC length assigned to a UE (e.g., the UEs 115 and 300) may be based on a number of RBs (e.g., the RBs 210) required by the UE for PUCCH transmission. In an example, for a frequency interlace (e.g., the frequency interlace 208) with ten RBs, an OCC with a length of 4 can be used when the number of required RBs is about 1-2. In an example, for a frequency interlace with ten RBs, an OCC with a length of 2 can be used when the number of required RBs is about 3-5. In an example, for a frequency interlace with ten RBs, an OCC with a length of 1 can be used when the number of required RBs is greater 5. In other words, an OCC length can be selected based on a number of required RBs and a number of available RBs in a frequency interlace. In general, a largest spreading factor (SF) can be determined as follows:

SF≤number of RBs in a frequency interlace/number of required RBs (3)

In NR, a BS (e.g., the BSs 105 and 400) may schedule UEs (e.g., the UEs 115 and 300) to transmit a PUSCH signal. A PUSCH transmission may include PUSCH data (e.g., UL user data) and DMRS. A transform precoding (e.g., a DFT-spreading (DFT-s)) is applied to pre-code the PUSCH data (e.g., UL user data). The transmission of the DMRSs can facilitate UL channel estimation and decoding of PUSCH data at the BS. The PUSCH DMRSs are mapped to alternate REs or subcarriers (e.g., the subcarriers 212) within each allocated RB (e.g., the RB 210). The DMRS may be a long predetermined sequences (e.g., a ZC sequence, a PN sequence, a CGS, or a sequence of QPSK symbols). The DMRS sequence is mapped to the REs or subcarriers of the allocation RBs and antenna port that is scheduled for the UE by the BS. In an example, if the number of REs is greater than 36, a ZC sequence is used for the DMRS. Otherwise, a CGS defined by the 3GPP standard used for the DMRS. Additionally, the DMRS may use a cyclic-shift of 0 for the sequence. If N_RB of RBs allocated to the UE, the length of the DMRS sequence is 6×N_RB.

In NR—U, PUSCH allocations are frequency interlaces. When DFT-s is to pre-code PUSCH data with a long ZC-based DMRS sequence mapped to a frequency interlace, the PAPR of the PUSCH transmission can be higher than when a PUSCH transmission over contiguous RBs. Further, while using a short DMRS sequence (e.g., with a length of about 12) with cyclic-shifts can provide a DMRS with a lower PAPR, the cyclic-shifts may repeat when the frequency interlace includes more than twelve clusters (e.g., groups of contiguous RBs). The repetitions can in turn degrade PAPR.

Accordingly, the present disclosure provides techniques for DMRS transmission with a low PAPR when used with DFT-s-OFDM PUSCH and/or PUCCH transmissions.

Figure 25:
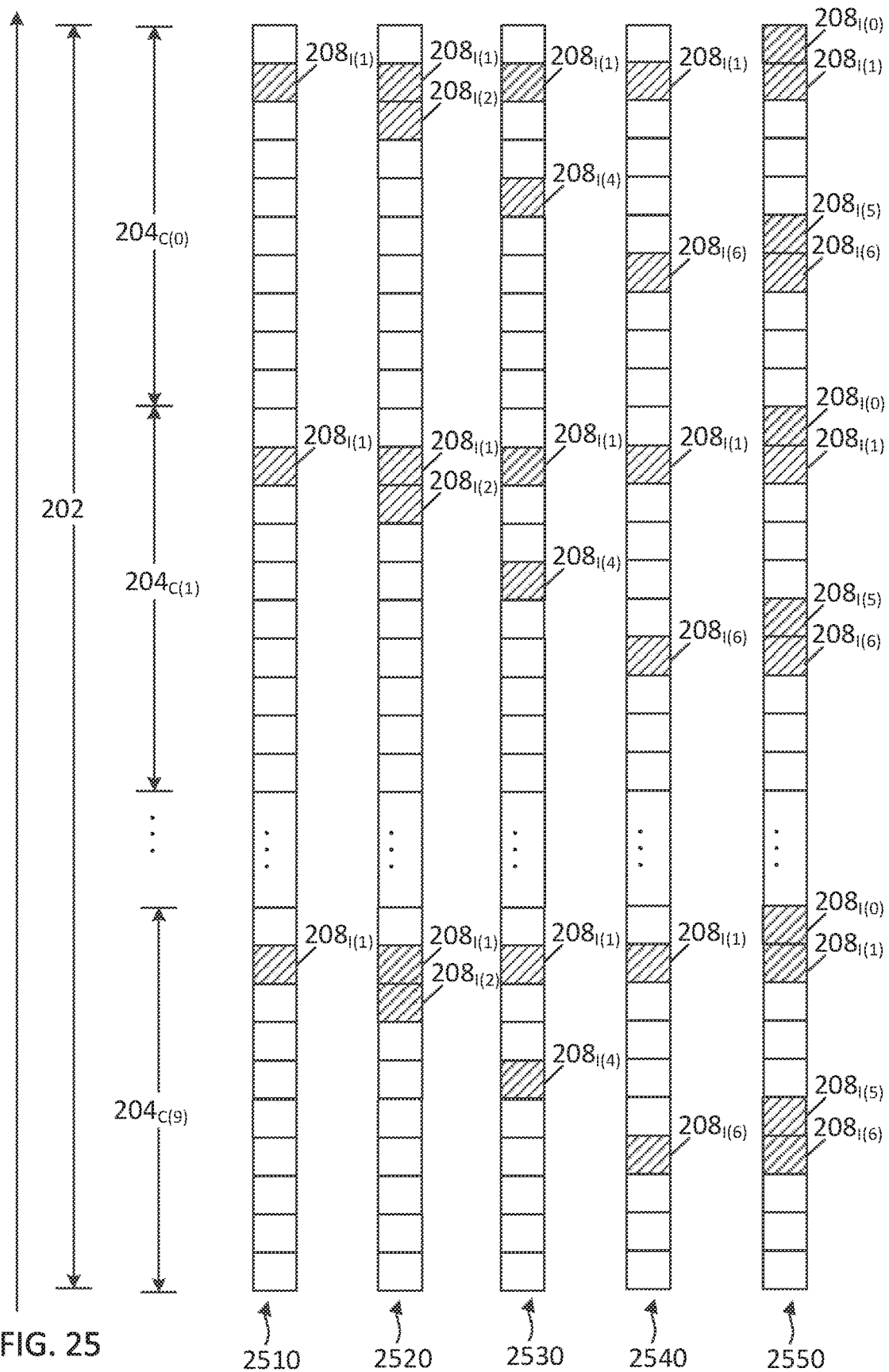
FIG. 25 illustrates example frequency interlaced-based resource allocations according to some embodiments of the present disclosure.

FIG. 25 illustrates example frequency interlaced-based resource allocation 2510, 2520, 2530, 2540, and 2550 according to some embodiments of the present disclosure. The allocation 2510, 2520, 2530, 2540, and 2550 may correspond to allocations determined by a BS 105 in the network 100 for PUSCH transmission by a UE 115. In FIG. 25, the y-axis represents frequency in some arbitrary units. The allocation 2510, 2520, 2530, 2540, and 2550 are illustrated using the same frequency interlace structure shown in the scheme 200, and may use the same reference numerals as in FIG. 2 for simplicity sake. The allocation 2510 includes one frequency interlace $208_{I(1)}$ shown by the pattern-filled boxes. The allocation 2520 includes two frequency interlaces $208_{I(1)}$ and $208_{I(2)}$ shown by the pattern-filled boxes, where the allocation 2520 includes a uniform frequency pattern. The allocation 2530 includes two frequency interlaces $208_{I(1)}$ and $208_{I(4)}$ shown by the pattern-filled boxes, where the allocation 2530 includes a non-uniform frequency pattern. The allocation 2540 includes two frequency interlaces $208_{I(1)}$ and $208_{I(6)}$ shown by the pattern-filled boxes, where the allocation 2540 includes a uniform frequency pattern. The allocation 2550 includes four frequency interlaces $208_{I(0)}$, $208_{I(1)}$, $208_{I(5)}$, and $208_{I(6)}$ shown by the pattern-filled boxes, where the allocation 2550 includes a uniform frequency pattern.

In some aspects, for PUCCH format 2 and PUCCH format 3 configured with interlace mapping, the number of configured interlaces in an allocation can be one or two. For instance, the allocation 2510 with one frequency interlace 208 may include about 10 RBs 210 and the allocation 2520 with two interlaces 208 may include about 20 RBs 210. In some aspects, a UE (e.g., the UEs 115 and/or 300) configured with an allocation including two frequency interlaces 208 may use one full interlace or two full interlaces according to the configured maximum code rate and the UCI payload size. There may be various rules in configuring an allocation with two frequency interlaces 208 as discussed below.

In some aspects, a PUCCH format 2 or PUCCH format 3 allocation may include two frequency interlaces 208. In some aspects, a dedicated PUCCH allocation can be indicated via an RRC configuration. The allocation may indicate an index of a first frequency interlace, for example, denoted as i, and an index of a second frequency interlace, for example, denoted as j, in a carrier bandwidth. For instance, for a PUCCH allocation including an $i^{th}$ interlace (e.g., a frequency interlace $208_{I(i)}$) and a $j^{th}$ interlace (e.g., the frequency interlace $208_{I(j)}$, the allocation may include the index i and the index j. Alternatively, the allocation may indicate the index of a first frequency interlace, for example, denoted as i, and an index offset, denoted as X, for determining a second interlace. For instance, for a PUCCH allocation including an $i^{th}$ interlace (e.g., a frequency interlace $208_{I(i)}$) and a $j^{th}$ interlace (e.g., the frequency interlace $208_{I(j)}$), the allocation may include the index i and the offset computed from j−i. The $i^{th}$ interlace and the $j^{th}$ interlace may can be represented by interlace {i, i+X}, where j=i+X.

Referring to the illustrated example allocation 2520 including the frequency interlace $208_{I(1)}$ and the frequency interlace $208_{I(2)}$, the allocation 2520 can include a value of 1 for i and a value of 2 for j, where X is 1. In some aspects, for PUCCH format 2 with CP-OFDM waveforms, X may be any integer. For instance, in a first option, X may be a positive value. In other words, if an allocation is configured with interlaces {i, j}, i<j. In a second option, X may be a negative value. In a third option, X may be configured in a same manner as for PUCCH format 3 with DFT-s-OFDM waveforms discussed below.

For PUCCH format 3 with DFT-s-OFDM waveforms, the value of X may have certain restrictions, for example, to ensure that RBs in the allocation are uniformly spaced in frequency. For instance, in a first option, X may be selected from a set of values {+1 or −1} for an SCS of 15 kHz or an SCS of 30 kHz. For example, when a first frequency interlace in an allocation includes the frequency interlace $208_{I(3)}$, a second frequency interlace in the allocation can be the frequency interlace $208_{I(2)}$ (for X=−1) or the frequency interlace $208_{I(4)}$ (for X=+1). In a second option, X may be selected from a set of values {+1, −1, 5} when the SCS is 15 kHz. For example, when a first frequency interlace in an allocation includes the frequency interlace $208_{I(3)}$, a second frequency interlace in the allocation can be the frequency interlace $208_{I(2)}$ (for X=−1), the frequency interlace $208_{I(4)}$ (for X=+1), the frequency interlace $208_{I(8)}$ (for X=5). In a third option, X may be configured with a value of 5 for an SCS of 15 kHz. For example, when a first frequency interlace in an allocation includes the frequency interlace $208_{I(3)}$, a second frequency interlace in the allocation can be the frequency interlace $208_{I(8)}$ (for X=5). In a fourth option, X may be configured with a value of 1 when the SCS is 15 kHz SCS or 30 kHz. In other words, an allocation may include interlace {i, i+1}. In some aspects, X is set to a value of 1 if i is odd, and X is set to a value of −1 if i is even. For example, when a first frequency interlace in an allocation includes the frequency interlace $208_{I(3)}$, a second frequency interlace in the allocation can be the frequency interlace $208_{I(4)}$ (for X=+1). When a first frequency interlace in an allocation includes the frequency interlace $208_{I(4)}$, a second frequency interlace in the allocation can be the frequency interlace $208_{I(3)}$ (for X=−1).

In some aspects, the offset X for the PUCCH format 2 or PUCHC format 3 can be selected from a set of one or more allowable offsets, which may be predetermined, specified by a wireless communication standard, semi-statically configured, or dynamically configured.

In some aspects, an allocation may include interlaces {i, MOD(i+X, M)}, where M represents a total number of frequency interlaces 208 in a carrier frequency bandwidth and MOD represents a modulo operation. For instance, for a carrier bandwidth with ten frequency interlaces 208 (e.g., from $208_{I(0)}$ to $208_{I(9)}$), an allocation may include frequency interlaces {9, 0} (e.g., frequency interlaces $208_{I(9)}$ and $208_{I(0)}$). In some other aspects, the modulo operation may not be applied to select frequency interlaces for an allocation.

FIGS. 26-31 illustrate various mechanisms for generating DMRSs for transmission in a frequency interlace (e.g., the frequency band 202) allocated for PUSCH and/or PUCCH. In FIGS. 26-31, the scheme 2600, the method 2700, the schemes 2800, 2900, 3000, and the method 3100 may be employed by a BS such as the BSs 105 and/or 400 and a UE such as the UEs 115 and/or 300 in a network such as the network 100 operating over a shared frequency band or an unlicensed frequency band. In particular, the BS may configure the UE to transmit a DMRS with a certain DMRS pattern that can be used in conjunction with transform coding (e.g., DFT-s) applied to PUSCH data or PUSCH UCI. Additionally, in FIGS. 28-30, the y-axes represent frequency in some arbitrary units. Further, the schemes 2600, 2800, 2900, and 3000 are described using the frequency interlace structure shown in FIG. 2, and may use the same reference numerals as in FIG. 2 for simplicity sake.

Figure 26:
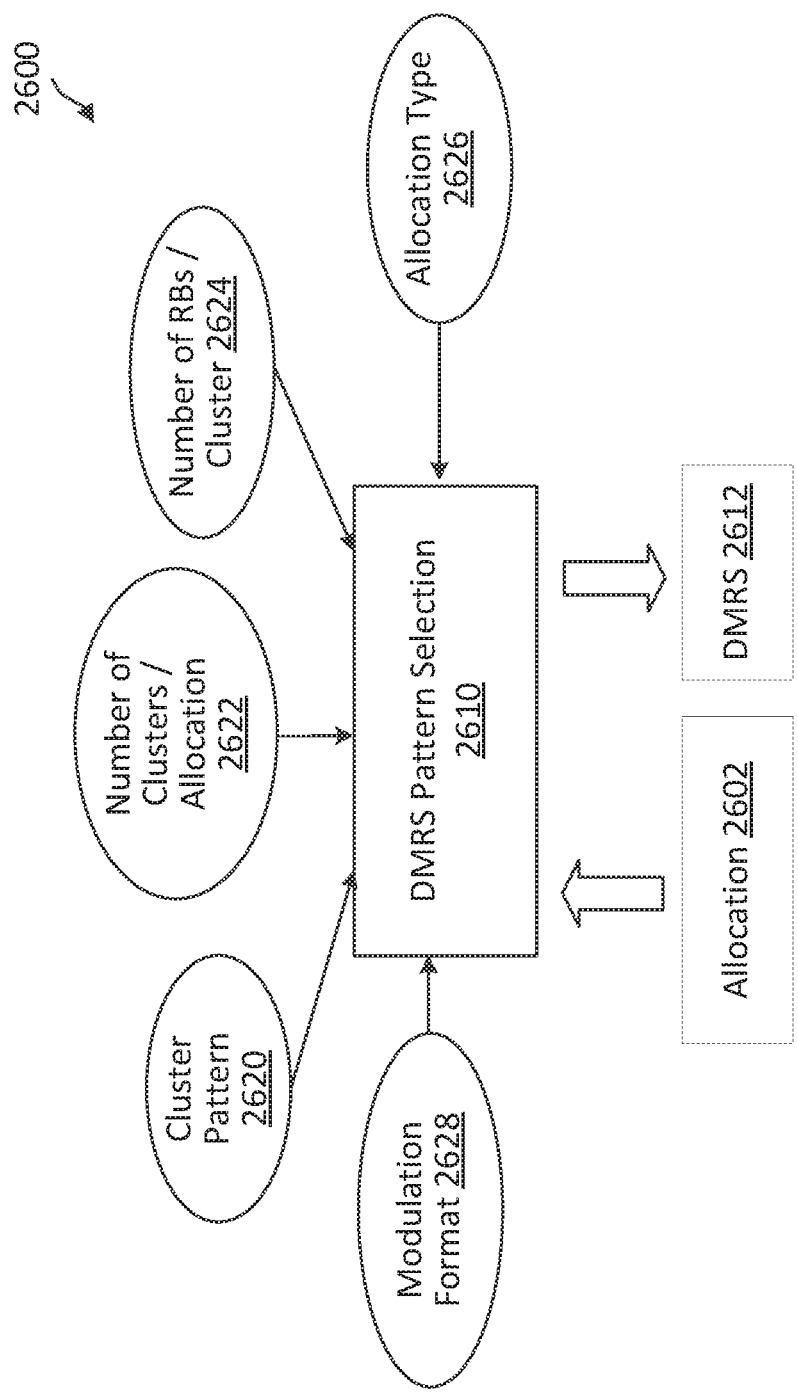
FIG. 26 illustrates a reference signal configuration scheme for frequency interlaced-based resource allocations according to some embodiments of the present disclosure.

FIG. 26 illustrates a reference signal configuration scheme 2600 for frequency interlaced-based resource allocations (e.g., the allocations 2510, 2520, 2530, 2540, and 2550) according to some embodiments of the present disclosure. The scheme 2600 determines a DMRS pattern for PUSCH transmission when transform precoding is enabled (e.g., in DFT-s-OFDM). The DMRS pattern may include a sequence length, a repetition factor, and/or a frequency density of DMRS REs (e.g., subcarriers 212) per RB (e.g., the RB 210). The sequence can be a ZC sequence, a PN sequence, or a CGS. The scheme 2600 includes a DMRS pattern selection component 2610. The DMRS pattern selection component 2610 can be implemented using a combination of hardware and software components. In an example, the DMRS pattern selection component 2610 can be implemented by a BS (e.g., the BSs 105 and 400). In an example, the DMRS pattern selection component 2610 can be implemented by a UE (e.g., the UEs 115 and 300).

The DMRS pattern selection component 2610 is configured to determine a DMRS pattern for an allocation 2602 (e.g., PUSCH or PUCCH) based on various parameters 2620, 2622, 2624, and 2626 associated with a frequency pattern of the allocation 2602 and a modulation format 2628 configured for the PUSCH or PUCCH transmission in the allocation 2602. The parameter 2626 may indicate an allocation type of the allocation 2602, for example, whether the allocation 2602 includes a frequency-interlaced structure or not. The DMRS pattern selection component 2610 outputs a DMRS 2612 based on the frequency pattern parameters 2620, 2622, 2624, and 2626 and the modulation format 2628.

If the allocation 2602 includes a frequency-interlaced structure, the parameter 2620 may indicate whether the clusters (e.g., groups of contiguous RBs) in the allocation 2602 are uniform or non-uniform and whether the cluster size (e.g., number of tones in each group of contiguous RBs) are uniform or non-uniform. The parameter 2622 may indicate a number of clusters in the allocation 2602. The parameter 2624 may indicate a number of RBs (e.g., the RBs 210) per cluster. The DMRS pattern selection component 2610 can implement the methods 2700 and/or 3100 and/or the schemes 2800, 2900, and/or 3000 described below in greater details.

Figure 27:
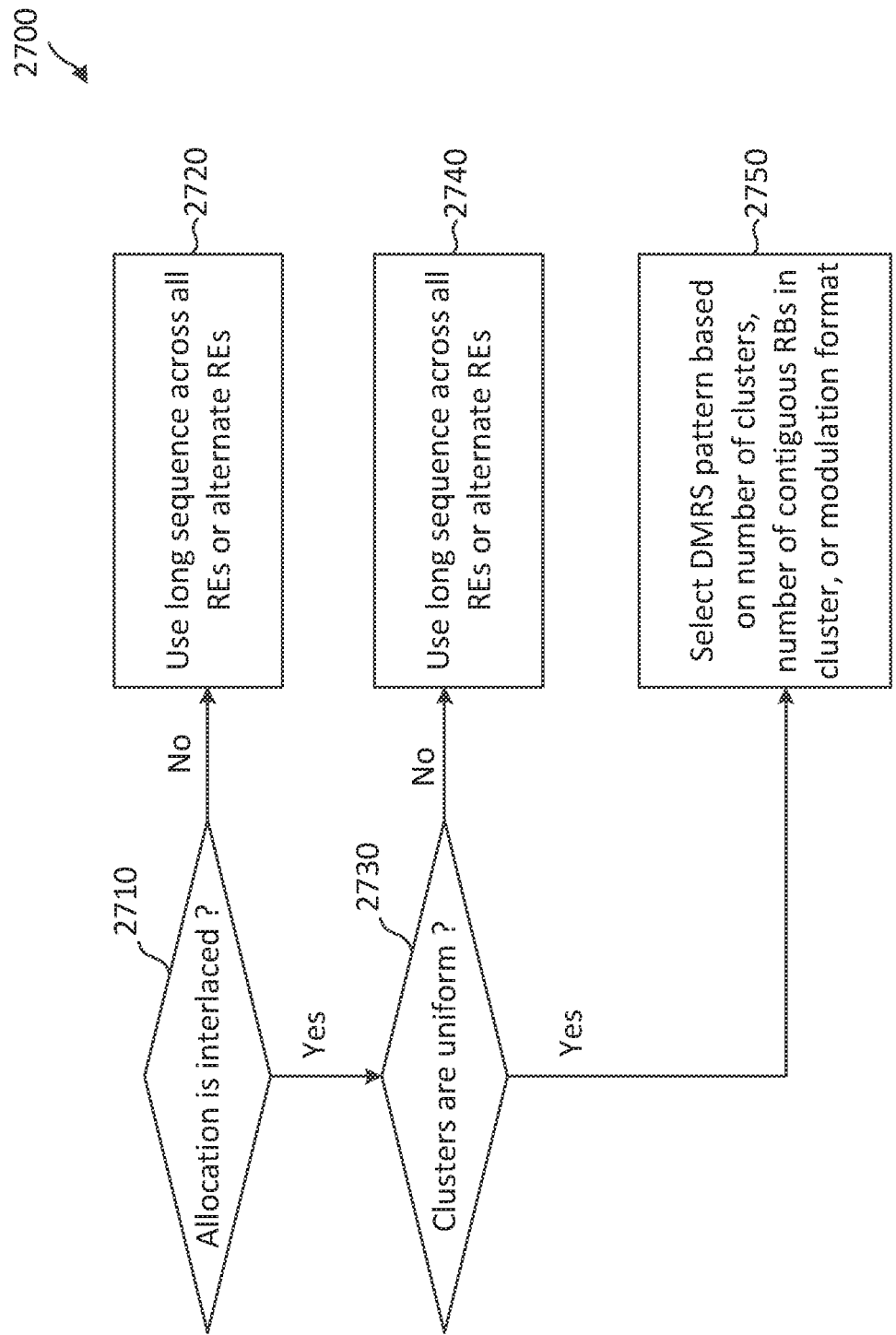
FIG. 27 is a flow diagram illustrating a reference signal configuration method for frequency interlaced-based resource allocations according to some embodiments of the present disclosure.

FIG. 27 is a flow diagram illustrating a reference signal configuration method 2700 for frequency interlaced-based resource allocations according to some embodiments of the present disclosure. Steps of the method 2700 can be executed by a computing device (e.g., a processor, processing circuit, and/or other suitable component) of a wireless communication device or other suitable means for performing the steps. For example, a wireless communication device, such as the UE 115 or the UE 300, may utilize one or more components, such as the processor 302, the memory 304, the UL communication module 308, the transceiver 310, the modem 3412, and the one or more antennas 316, to execute the steps of method 2700. In another example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 2700. The method 2700 may use similar mechanisms as in the scheme 2600 described above with respect to FIG. 26 and can be implemented by the DMRS pattern selection component 2610 of FIG. 26. As illustrated, the method 2700 includes a number of enumerated steps, but embodiments of the method 2700 may include additional steps before, after, and in between the enumerated steps. In some embodiments, one or more of the enumerated steps may be omitted or performed in a different order.

At step 2710, the method 2700 includes determining whether an allocation (e.g., the allocation 2602) is frequency-interlaced (e.g., the parameter 2626). When determining that the allocation is not interlaced (e.g., including contiguous RBs), the method 2700 proceeds to step 2720.

At step 2720, the method 2700 includes using a long sequence across all REs (e.g., the subcarriers 212) or alternate REs in a DMRS symbol to produce a DMRS (e.g., the DMRS 2612). For example, the allocation may include a frequency interlace with ten contiguous RBs. Thus, the long sequence may include a length of 120 (e.g., 12 subcarriers× 10 RBs) when all REs are mapped for DMRS. Alternatively, the long sequence may include a length of 60 (e.g., 6 subcarriers×10 RBs) when alternate REs are mapped for DMRS.

Returning to step 2710, when determining that the allocation is interlaced, the method 2700 proceeds to step 2730. At step 2730, the method 2700 includes determining whether the clusters in the allocation are uniform (e.g., uniformly spaced in frequency and with a uniform size similar to the parameter 2620).

When determining that the clusters in the allocation are non-uniform, the method 2700 proceeds to step 2740. At step 2740, the method 2700 includes using a long sequence across all REs (e.g., the subcarriers 212) or alternate REs of a DMRS symbol to produce a DMRS. For example, the allocation may include a frequency interlace with ten RBs spaced apart in frequency. Thus, the long sequence may include a length of 120 (e.g., 12 subcarriers×10 RBs) when all REs are mapped for DMRS. Alternatively, the long sequence may include a length of 60 (e.g., 6 subcarriers×10 RBs) when alternate REs are mapped for DMRS.

Returning to step 2730, when determining that the clusters in the allocation are uniform, the method 2700 proceeds to step 2750. At step 2750, the method 2700 selecting a DMRS pattern for a DMRS based on at least one a number of clusters in the allocation (e.g., the parameter 2622), a number of contiguous RBs in a cluster (e.g., the parameter 2624), or a modulation format (e.g., the modulation format 2628).

Figure 28:
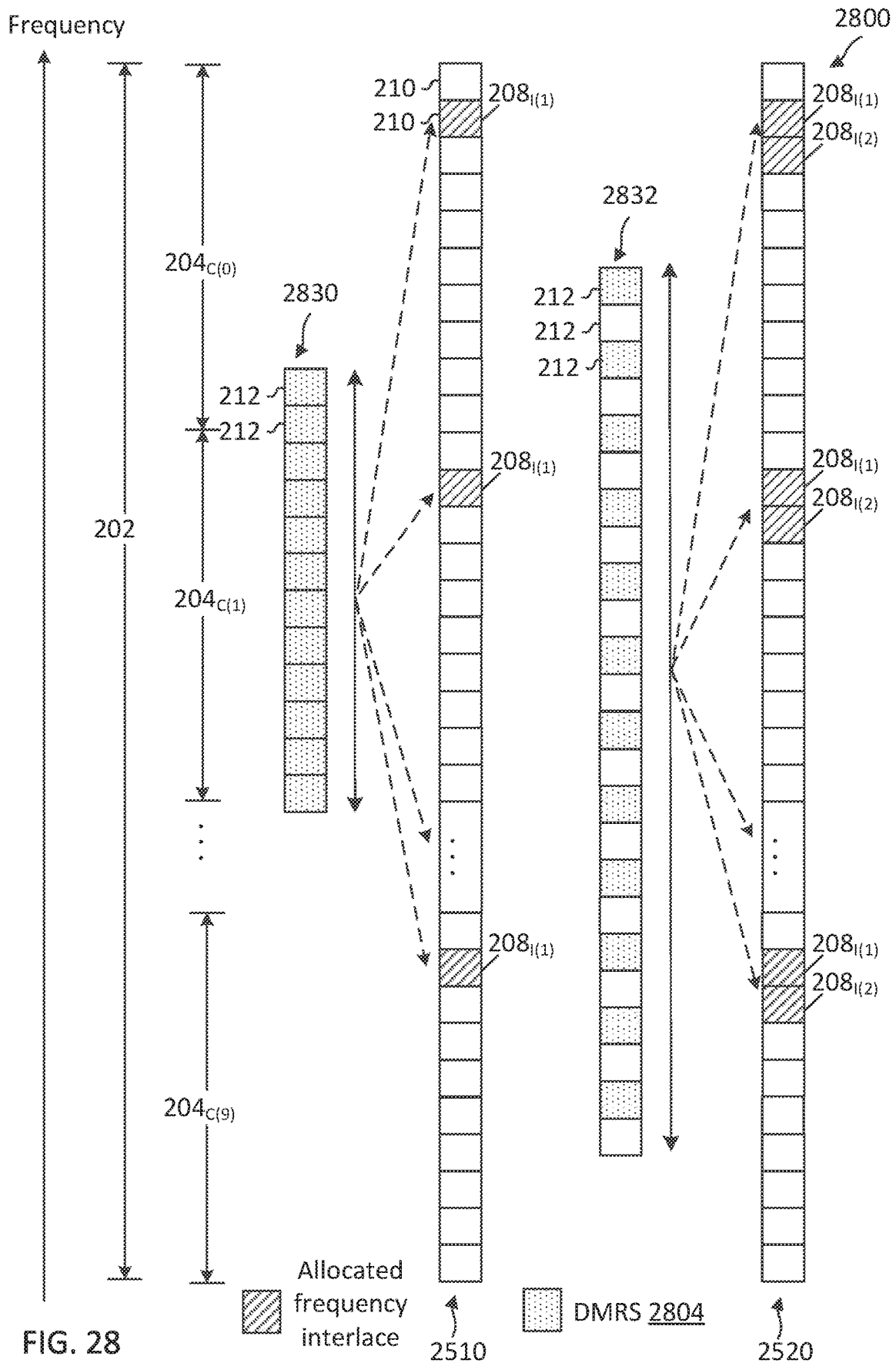
FIG. 28 illustrates a reference signal configuration scheme for frequency interlaced-based resource allocations according to some embodiments of the present disclosure.

FIG. 28 illustrates a reference signal configuration scheme 2800 for frequency interlaced-based resource allocations according to some embodiments of the present disclosure. The configuration scheme 2800 may be use similar mechanisms as in the scheme 2600 described above with respect to FIG. 26 and the method 2700 described above with respect to FIG. 27. In the scheme 2800, when the number of clusters, denoted by Nc, and the number of contiguous RBs in a cluster, denoted by NcRBs, satisfies a certain constraint (e.g., clusters uniformly spaced in frequency and with a uniform size), a short sequence (e.g., a ZC sequence with a length of 12) may be used for a DMRS and repeatedly mapped the sequence with a uniform cyclic-shifts to DMRS REs 2804 (e.g., subcarriers 212) in each cluster.

If the cluster size is low (e.g., one RB 210), then the DMRS REs can include all REs in the frequency interlace. As shown, for the allocation 2510 (from FIG. 25), a length-12 sequence 2830 may be used to repeatedly mapped to all REs within the frequency interlace $208_{I(1)}$ to produce a DMRS (e.g., the DMRS 2612). In other words, all REs in the frequency interlace $208_{I(1)}$ are DMRS REs 2804 in a DMRS symbol of the allocation 2510. The PAPR for a short sequence (e.g., with a length 12) repeated ten times with different cyclic-shifts is lower than the PAPR for a long sequence (e.g., with a length of 120).

If the cluster size is higher, then the density of DMRS REs can be lower (e.g., about 6 DMRS REs per RB). As shown, the allocation 2520 (from FIG. 25) may have a high cluster size (e.g., 2 RBs per cluster), and thus a length-12 sequence 2832 may be used to repeatedly mapped to alternate REs within the frequency interlace $208_{I(1)}$ and $208_{I(2)}$ to produce a DMRS (e.g., the DMRS 2612). In other words, alternate REs in the frequency interlace $208_{I(1)}$ and $208_{I(2)}$ are DMRS REs 2804 in a DMRS symbol of the allocation 2520.

Figure 29:
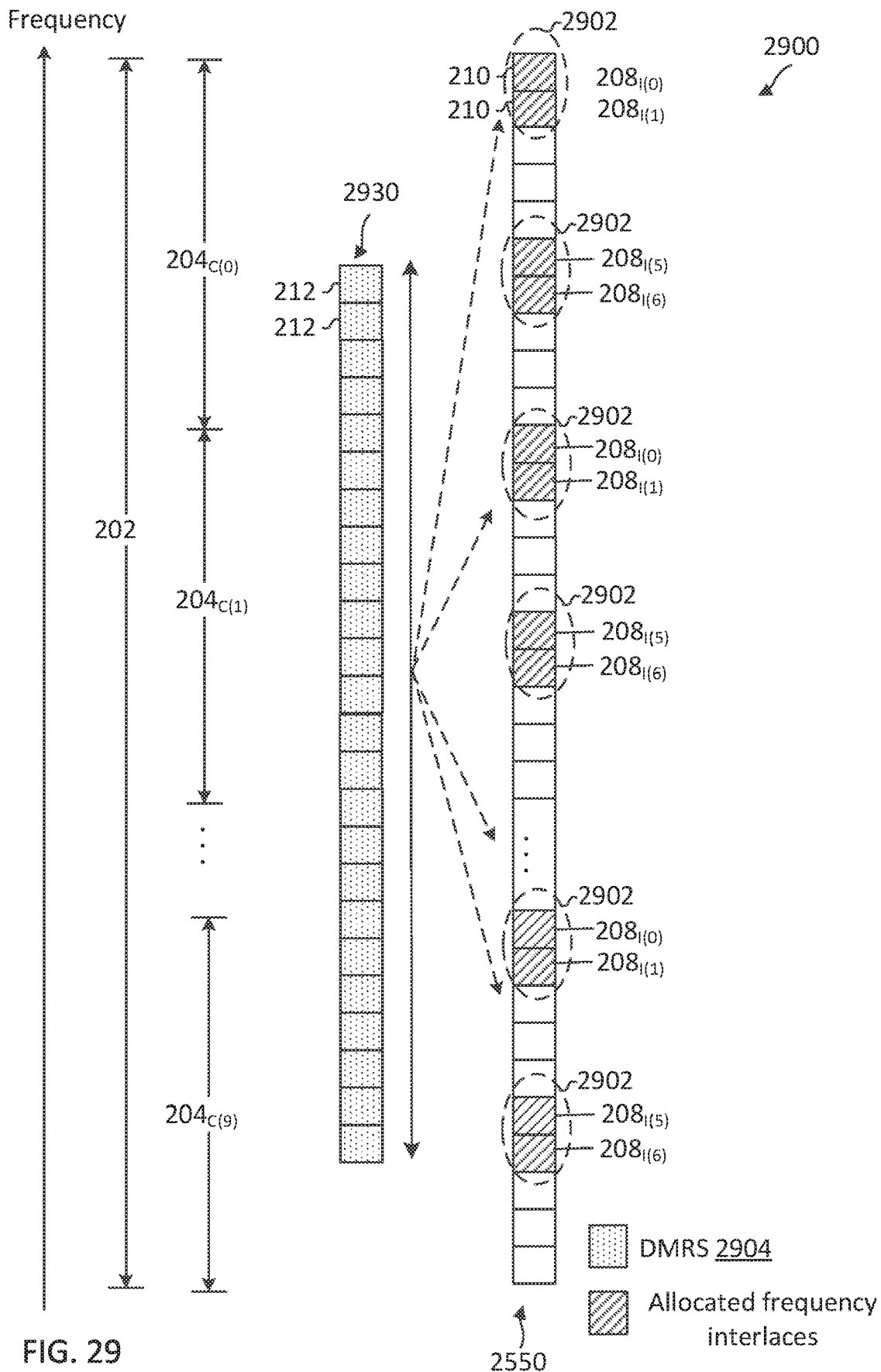
FIG. 29 illustrates a reference signal configuration scheme for frequency interlaced-based resource allocations according to some embodiments of the present disclosure.

FIG. 29 illustrates a reference signal configuration scheme 2900 for frequency interlaced-based resource allocations according to some embodiments of the present disclosure. The configuration scheme 2900 may be use similar mechanisms as in the scheme 2600 described above with respect to FIG. 26 and the method 2700 described above with respect to FIG. 27. In the scheme 2900, when the number of clusters is large, the length of the sequence is increased for DMRS so that cyclic-shift may not repeat within any cluster. The use of non-repeating cyclic-shifts can provide a lower PAPR than when repeating cyclic-shifts are used. In an example, a sequence length greater than Nc may be used.

As shown, the allocation 2550 (from FIG. 25) includes twenty clusters 2902 each including two RBs 210, where the frequency interlace $208_{I(1)}$ and $208_{I(2)}$ form ten clusters 2902 and the frequency interlace $208_{I(5)}$ and $208_{I(6)}$ may form another ten clusters 2902. Thus, a sequence length greater than 20 may be used. For example, a sequence 2930 with a length of 24 may be used and mapped to DMRS REs 2904 (e.g., all REs in the allocation) in a DMRS symbol of the allocation 2550 as shown.

Figure 30:
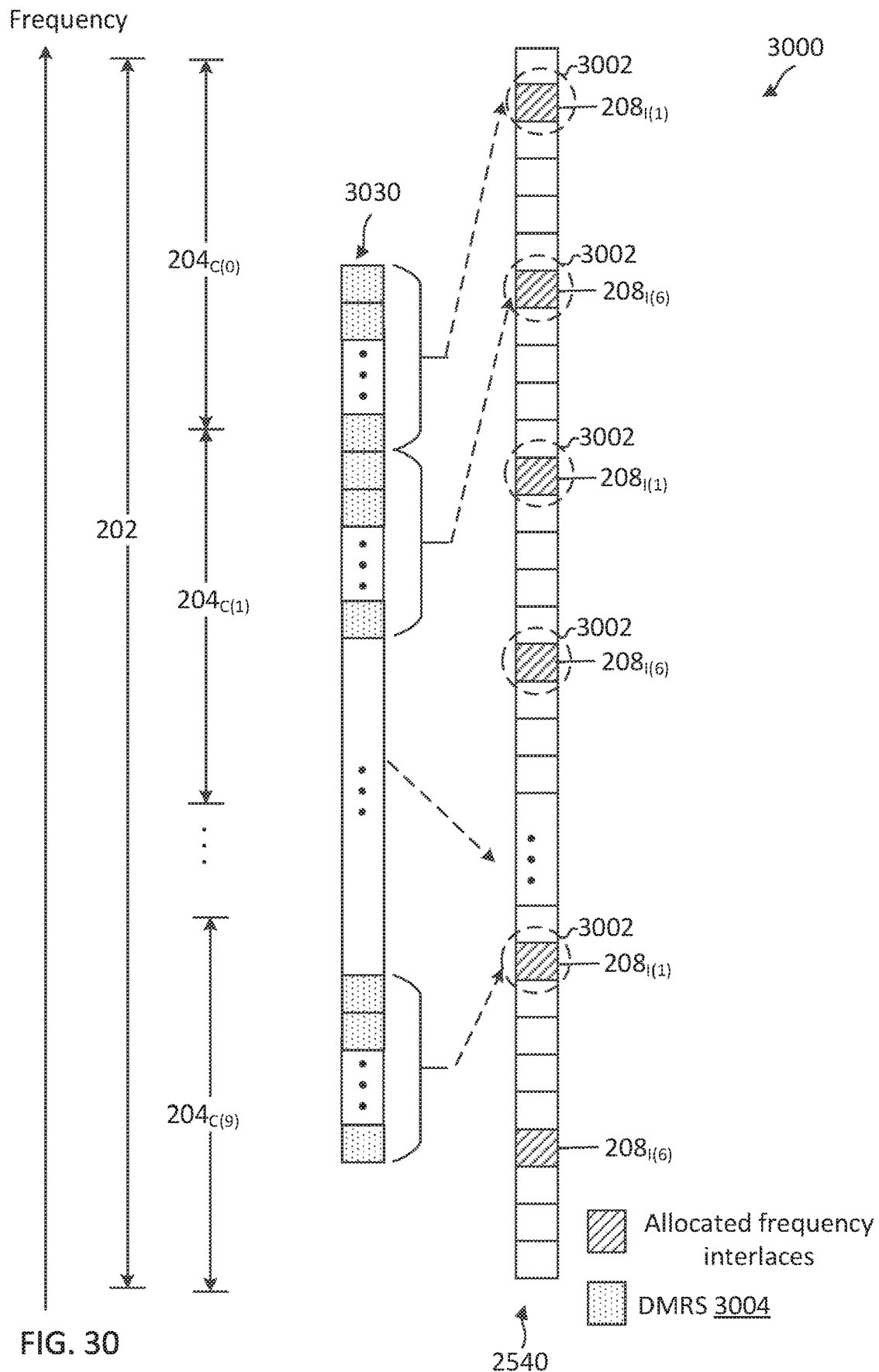
FIG. 30 illustrates a reference signal configuration scheme for frequency interlaced-based resource allocations according to some embodiments of the present disclosure.

FIG. 30 illustrates a reference signal configuration scheme 3000 for frequency interlaced-based resource allocations according to some embodiments of the present disclosure. The configuration scheme 3000 may be use similar mechanisms as in the scheme 2600 described above with respect to FIG. 26 and the method 2700 described above with respect to FIG. 27. In the scheme 3000, when the number of clusters Nc is greater than 12×NcRB, a single long sequence (e.g., a ZC sequence or a CGS) can be used to map to all DMRS REs 3004. If a short sequence is used, cyclic-shifts may repeat and thus increasing the PAPR. Additionally, due to repeating cyclic-shifts, channel estimation cannot benefit from RB bundling as in a contiguous allocation.

As shown, the allocation 2540 (from FIG. 25) includes twenty clusters 3002, but the cluster size is one RB 210. Thus, a long sequence 3030 with a length of 240 can be used to map to DMRS REs 3004 in a DMRS symbol of the allocation 2540 to produce a DMRS (e.g., the DMRS 2612).

Figure 31:
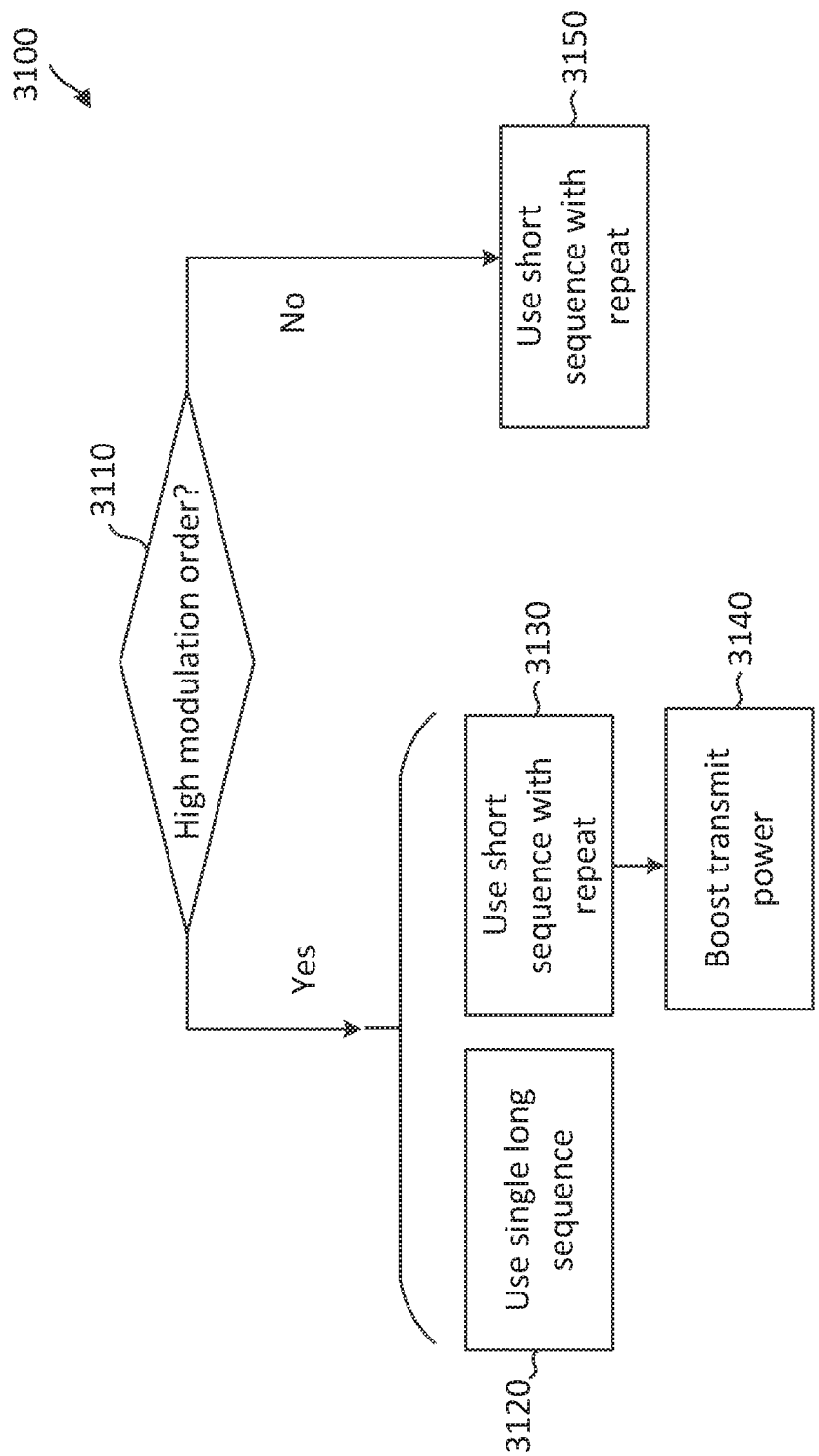
FIG. 31 is a flow diagram illustrating a reference signal configuration method for frequency interlaced-based resource allocations according to some embodiments of the present disclosure.

FIG. 31 is a flow diagram illustrating a reference signal configuration method 3100 for frequency interlaced-based resource allocations according to some embodiments of the present disclosure. Steps of the method 3100 can be executed by a computing device (e.g., a processor, processing circuit, and/or other suitable component) of a wireless communication device or other suitable means for performing the steps. For example, a wireless communication device, such as the UE 115 or the UE 300, may utilize one or more components, such as the processor 302, the memory 304, the UL communication module 308, the transceiver 310, the modem 3412, and the one or more antennas 316, to execute the steps of method 3100. In another example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 3100. The method 3100 may use similar mechanisms as in the scheme 2600 described above with respect to FIG. 26 and can be implemented by the DMRS pattern selection component 2610 of FIG. 26. As illustrated, the method 3100 includes a number of enumerated steps, but embodiments of the method 3100 may include additional steps before, after, and in between the enumerated steps. In some embodiments, one or more of the enumerated steps may be omitted or performed in a different order.

At step 3110, the method 3100 includes determining whether a modulation format (e.g., the modulation format 2628) for an allocation (e.g., the allocations 2510, 2520, 2530, 2540, 2550, and 2602) is high (e.g., higher than a predetermined modulation order of 64 quadrature-amplitude modulation (64QAM)).

When determining that the modulation format is high, the method 3100 proceeds to step 3120. At step 3120, the method 3100 includes using a long sequence (e.g., a long ZC sequence with a length corresponding to the number of DMRS REs in the allocation) to generate a DMRS (e.g., the DMRS 2612). The long sequence may produce a higher PAPR. However, the high-order modulation format may be produce a high PAPR, and thus the transmit power backoff at a UE transmitter may be limited by the PAPR of the data.

Alternatively, the method 3100 may proceed to step 3130. At step 3130, the method 3100 includes using a short sequence (e.g., with a length 12) and repeats the sequence across RBs (e.g., using a combination of cyclic-shifts, phase-rotations, or root indices discussed above in the schemes 1500-2300) to provide a lower PAPR. At step 3140, the method 3100 includes boosting the transmit power (e.g., to a higher power level) for the DMRS. The transmit power boost can provide a better signal-to-noise ratio (SNR) for channel estimation at the BS's receiver. In some examples, the transmit power boost or a power ratio between a DMRS and data may be signaled via RRC or dynamic DCI (in a PDCCH).

Returning to step 3110, when determining that the modulation format is not high, the method 3100 proceeds to step 3150. At step 3150, the method 3100 includes using a short sequence (e.g., with a length 12) and repeats the sequence across RBs (e.g., using a combination of cyclic-shifts, phase-rotations, or root indices discussed above in the schemes 1500-2300) to provide a lower PAPR. In an example, the modulation format may be a QPSK, which may have a low PAPR, and thus it may be beneficial to select a DMRS with a low PAPR. In some instances, since the PAPR difference between QPSK and DMRS may be low, the method 3100 can apply a transmit power boost to the transmission.

In some embodiments, a BS (e.g., the BSs 105 and 400) may employ any suitable combination of the schemes 2600, 2800, 2900, or 3000 or the methods 2700 and 3100 to configure a UE for PUSCH DMRS and/or PUCCH DMRS transmissions. In an example, when applying the schemes 2600, 2800, 2900, and/or 3000 and/or or the methods 2700 and/or 3100 for PUCCH transmissions, the number of frequency interlaces (e.g., the frequency interlaces 208) is limited to about two. In some embodiments, a BS (e.g., the BSs 105 and 400) may employ any suitable combination of the schemes 2600, 2800, 2900, or 3000 or the methods 2700 and 3100 in conjunction with any of the schemes 500-2400 for multiplexing PUCCH transmissions.

Figure 32:
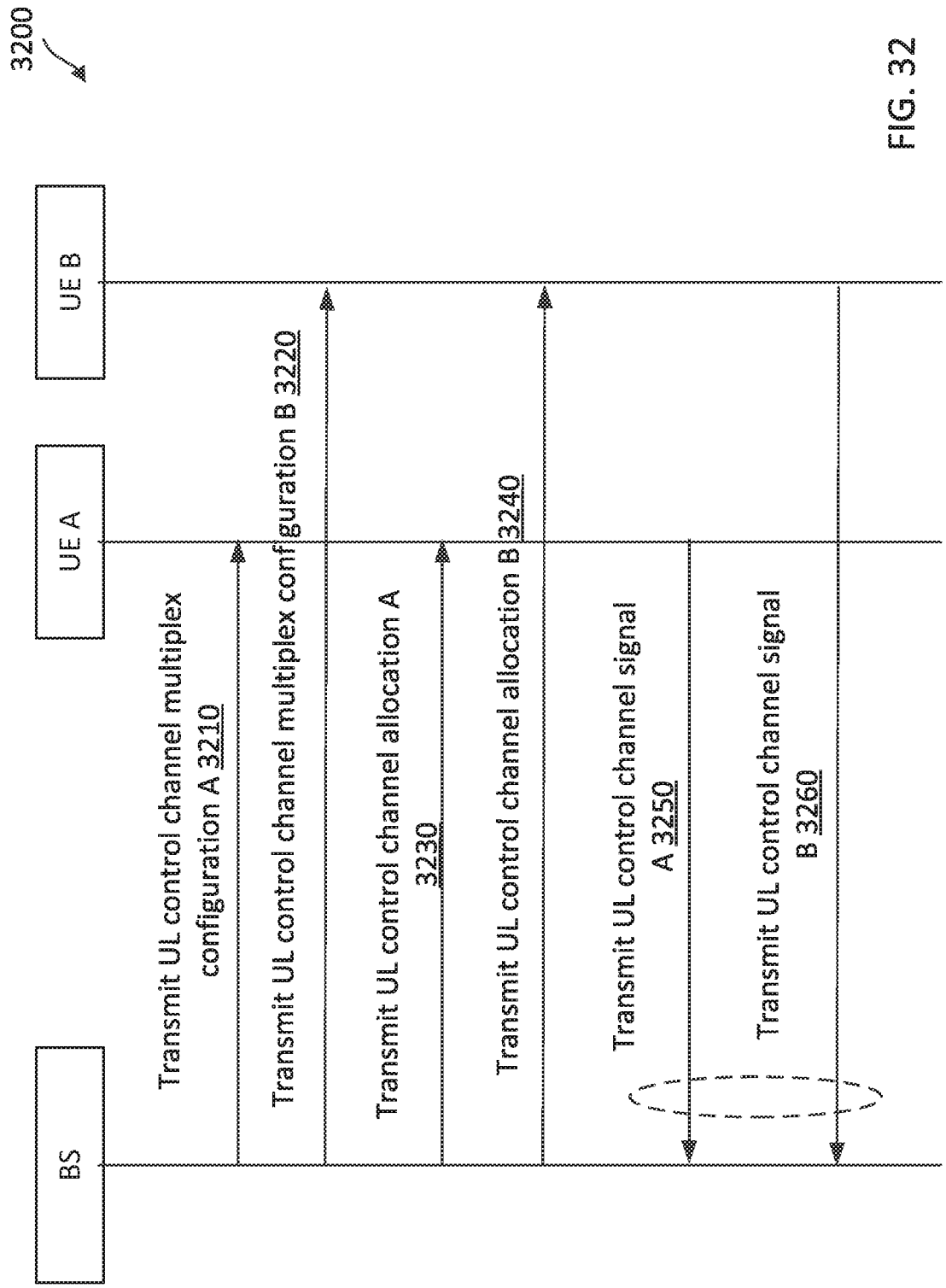
FIG. 32 is a signaling diagram illustrating an UL control channel multiplex method according to some embodiments of the present disclosure.

FIG. 32 is a signaling diagram illustrating an UL control channel multiplex method 3200 according to some embodiments of the present disclosure. The method 3200 may be implemented between a BS (e.g., BS 105 or BS 400) and a UE A and a UE B (e.g., the UE 115 or UE 300). The method 3200 may employ similar mechanisms as in the schemes 500, 600, 700, 800, 900, 1000, 1100, 1200, 1300, 1400, 1500, 1600, and/or 1700 described above with respect to FIGS. 5, 6, 7, 8, 9, 10, 11, 12, 13, 14, 15, 16, and/or 17, respectively. Steps of the method 3200 can be executed by computing devices (e.g., a processor, processing circuit, and/or other suitable component) of the BS and the UE. In an example, the BS may utilize one or more components, such as the processor 402, the memory 404, the UL communication module 408, the transceiver 410, the modem 412, and the one or more antennas 416, to execute the steps of method 3200. The UE A and the UE B, each may utilize one or more components, such as the processor 302, the memory 304, the UL communication module 308, the transceiver 310, the modem 312, and the one or more antennas 316, to execute the steps of method 3200. As illustrated, the method 3200 includes a number of enumerated steps, but embodiments of the method 3200 may include additional steps before, after, and in between the enumerated steps. In some embodiments, one or more of the enumerated steps may be omitted or performed in a different order.

At step 3210, the BS transmits an UL control channel multiplex configuration A to the UE A. At step 3220, the BS transmits an UL control channel multiplex configuration B to the UE B. The BS may use any suitable combination of the schemes 500-1700 to multiplex the UE A and the UE B for UL control channel signal transmissions. The BS may include any suitable combination of frequency spreading codes, time spreading codes, tone-interlacing information, or OCCs in the UL control channel multiplex configuration A and B for PUCCH UCI multiplexing. The BS may include any suitable combination of cyclic-shifts, phase-rotations, or root indices in the UL control channel multiplex configuration A and B for PUCCH DMRS multiplexing. In some examples, At step 3230, the BS transmits an UL control channel allocation A (e.g., including a frequency interlace $208_{I(i)}$ for the UE A. At step 3240, the BS transmits an UL control channel allocation B (e.g., including the same frequency interlace $208_{I(i)}$) for the UE B. In some examples, the BS may transmit the UL control channel allocation A and the configuration A in a grant. Similarly, the BS may transmit the UL control channel allocation B and the configuration B in a grant.

At step 3250, the UE A transmits an UL control channel signal A (e.g., a PUCCH signal) using the frequency interlace $208_{I(i)}$ based on the configuration A. At step 3260, the UE B transmits an UL control channel signal B (e.g., a PUCCH signal) using the frequency interlace $208_{I(i)}$ based on the configuration B. The UE A transmits the UL control channel signal A concurrent with the UE B transmitting the UL control channel signal B.

Figure 33:
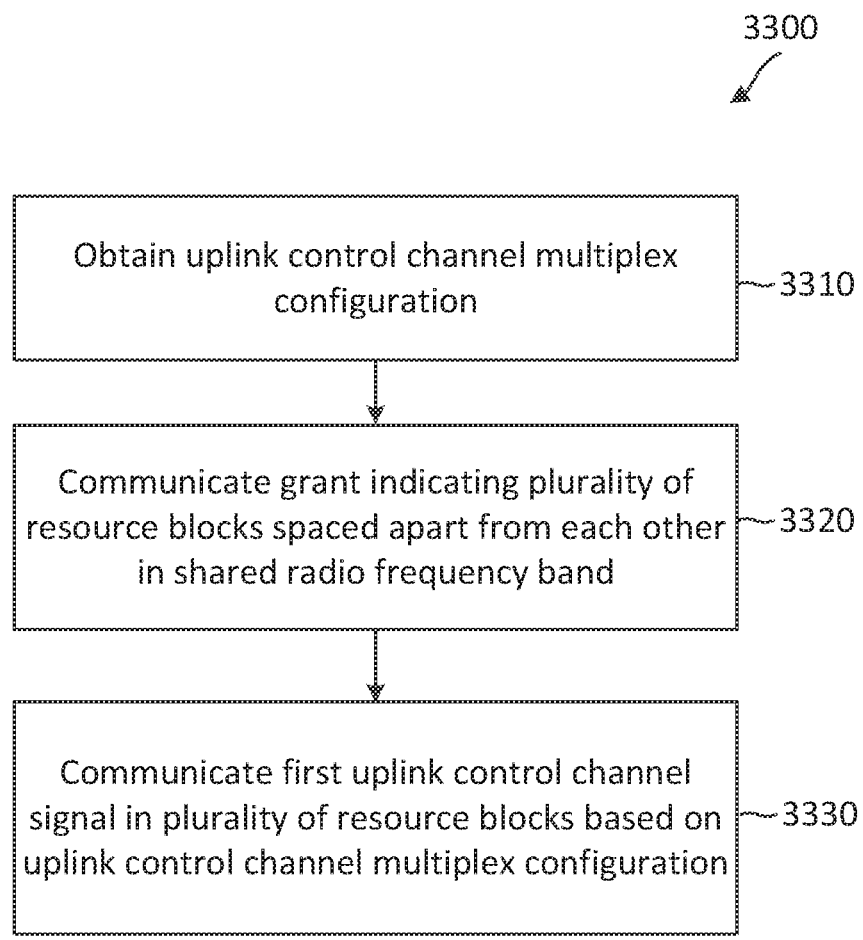
FIG. 33 is a flow diagram of a communication method according to some embodiments of the present disclosure.

FIG. 33 is a flow diagram of a communication method 3300 according to some embodiments of the present disclosure. Steps of the method 3300 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 3300. In another example, a wireless communication device, such as the UE 115 or the UE 300, may utilize one or more components, such as the processor 302, the memory 304, the UL communication module 308, the transceiver 310, the modem 312, and the one or more antennas 316, to execute the steps of method 3300. The method 3300 may employ similar mechanisms as in the schemes 500-2400 described above with respect to FIGS. 5-24 and the method 3200 described above with respect to FIG. 32. As illustrated, the method 3300 includes a number of enumerated steps, but embodiments of the method 3300 may include additional steps before, after, and in between the enumerated steps. In some embodiments, one or more of the enumerated steps may be omitted or performed in a different order.

At step 3310, the method 3300 includes obtaining, by a first wireless communication device, an uplink control channel multiplex configuration.

At step 3320, the method 3300 includes communicating, by the first wireless communication device with a second wireless communication device, a grant indicating a plurality of resource blocks (e.g., the RBs 210) spaced apart from each other by at least one other resource block in a shared radio frequency band (e.g., the frequency band 202), the plurality of resource blocks scheduled for multiple wireless communication devices (e.g., the UEs 115 and 300) based on the uplink control channel multiplex configuration.

At step 3330, the method 3300 includes communicating, by the first wireless communication device with the second wireless communication device, a first uplink control channel signal (e.g., the PUCCH signals 530, 630, a PUCCH format 2 signal, a PUCCH format 3 signal) in one or more of the plurality of resource blocks based on the uplink control channel multiplex configuration.

In an embodiment, the first wireless communication device may correspond to a BS (e.g., BS 105 or 500) and the second wireless communication device may correspond to a UE (e.g., UE 115 or 400). In such an embodiment, the first wireless communication device may transmit the grant to the second wireless communication device. The first wireless communication device may receive the first uplink control channel signal from the second wireless communication device.

In an embodiment, the first wireless communication device may correspond to a UE (e.g., UE 115 or 400) and the second wireless communication device may correspond to a BS (e.g., BS 105 or 500). In such an embodiment, the first wireless communication device may receive the grant from the second wireless communication device. The first wireless communication device may transmit the first uplink control channel signal to the second wireless communication device.

In an embodiment, the uplink control channel multiplex configuration includes a first frequency spreading code (e.g., the codes 514 and 516). The communicating the first uplink control channel signal includes communicating, by the first wireless communication device with the second wireless communication device, PUCCH format 2 data based on the first frequency spreading code and a post-frequency spreading scrambling code, for example, using the scheme 700.

In an embodiment, the first wireless communication device applies the first frequency spreading code to the PUCCH format 2 data to generate a frequency spread signal (e.g., the spread symbols 732), for example, using the OCC component 730. The first wireless communication device applies the post-frequency spreading scrambling code to the frequency spread signal, for example, using the scrambling component 740.

In an embodiment, the uplink control channel multiplex configuration includes a second frequency spreading code (e.g., the codes 512 and 514). The communicating the first uplink control channel signal includes communicating, by the first wireless communication device with the second wireless communication device, a reference signal (e.g., a DMRS) based on the second frequency spreading code.

In an embodiment, the uplink control channel multiplex configuration includes a time frequency spreading code. The communicating the first uplink control channel signal includes communicating, by the first wireless communication device with the second wireless communication device, PUCCH format 2 data based on a time spreading code (e.g., the codes 610 and 612).

In an embodiment, the communicating the first uplink control channel signal includes communicating, by the first wireless communication device with the second wireless communication device, PUCCH format 2 data and a reference signal using a subset of tones in each resource block of the plurality of resource blocks based on the uplink control channel multiplex configuration. In an embodiment, the subset of tones in each resource block of the plurality of resource blocks are spaced apart from each other by at least one other tone in the resource block, for example, as shown in the schemes 800 and 900. In an embodiment, the subset of tones in each resource block of the plurality of resource blocks includes contiguous tones, for example, as shown in the scheme 1000.

In an embodiment, the uplink control channel multiplex configuration includes a pre-DFT spreading code. The communicating the first uplink control channel signal includes communicating, by the first wireless communication device with the second wireless communication device, PUCCH format 3 data based on the pre-DFT frequency spreading code and a DFT, for example, as shown in the scheme 1100. In embodiment, the pre-DFT spreading code includes a length based on a number of tones in each resource block of the plurality of resource blocks.

In an embodiment, the first wireless communication device applies the pre-DFT frequency spreading code to the PUCCH format 3 data to generate a frequency spread signal, for example, using the OCC component 1110. The first wireless communication device applies the DFT to the frequency spread signal, for example, using the DFT component 1120.

In an embodiment, the communicating the first uplink control channel signal includes communicating, by the first wireless communication device with the second wireless communication device, a reference signal (e.g., a DMRS) using a subset of tones in each resource block of the plurality of resource blocks based on the uplink control channel multiplex configuration, for example, as shown in the scheme 1200.

In an embodiment, the uplink control channel multiplex configuration further includes a first cyclic-shift value. The communicating the first uplink control channel signal includes communicating, by the first wireless communication device with the second wireless communication device, a reference signal based on the first cyclic-shift value, for example, as shown in the scheme 1300. In an embodiment, the uplink control channel multiplex configuration further includes a cyclic-shift index. The first wireless communication device may compute the first cyclic-shift value based on the cyclic-shift index and a length of the reference signal.

In an embodiment, the communicating the first uplink control channel signal includes communicating, by the first wireless communication device with the second wireless communication device, the reference signal based on the first cyclic-shift value in a first resource block of the plurality of resource blocks. The communicating the first uplink control channel signal includes communicating, by the first wireless communication device with the second wireless communication device, the reference signal based on a second cyclic-shift value in a second resource block of the plurality of resource blocks, the first resource block being different than the second resource block, and the second cyclic-shift value being different than the first cyclic-shift value, for example, as shown in the scheme 1500.

In an embodiment, the uplink control channel multiplex configuration further includes a first frequency spreading code. The communicating the first uplink control channel signal includes communicating, by the first wireless communication device with the second wireless communication device, a reference signal based on the first frequency spreading code, for example, as shown in the scheme 1400.

In an embodiment, the uplink control channel multiplex configuration further includes a first phase-rotation and a second phase-rotation different from the first phase-rotation. The communicating the first uplink control channel signal includes communicating, by the first wireless communication device with the second wireless communication device, a reference signal based on the first phase-rotation in a first resource block of the plurality of resource blocks. The communicating the first uplink control channel signal includes communicating, by the first wireless communication device with the second wireless communication device, the reference signal based on the second phase-rotation in a second resource block of the plurality of resource blocks, the first resource block being different than the second resource block, for example, as shown in the scheme 1600.

In an embodiment, the uplink control channel multiplex configuration further includes a first sequence root index and a second sequence root index different from the first sequence root index. The communicating the first uplink control channel signal includes communicating, by the first wireless communication device with the second wireless communication device, a reference signal based on the first sequence root index in a first resource block of the plurality of resource blocks. The communicating the first uplink control channel signal includes communicating, by the first wireless communication device with the second wireless communication device, the reference signal based on the second sequence root index in a second resource block of the plurality of resource blocks, the first resource block being different than the second resource block, for example, as shown in the scheme 1700.

In an embodiment, the uplink control channel multiplex configuration includes at least one of a cyclic-shift mode, a phase-rotation mode, or multiple sequence root indices. The communicating the first uplink control channel signal includes communicating, by the first wireless communication device with the second wireless communication device, a reference signal in a first subset of the plurality of resource blocks based on at least one of the cyclic-shift mode, the phase-rotation mode, or the multiple sequence root indices. The communicating the first uplink control channel signal includes communicating, by the first wireless communication device with the second wireless communication device, the reference signal in a second subset of the plurality of resource blocks based on at least one of the cyclic-shift mode, the phase-rotation mode, or the multiple sequence root indices, the second subset of the plurality of resource blocks being non-overlapping with the first subset of the plurality of resource blocks. In an embodiment, the first subset of the plurality of resource blocks and the second subset of the plurality of resource blocks are in different subbands of the shared radio frequency band. For example, the plurality of resource blocks correspond to a wideband interlace as shown in the schemes 1800-2300. In an embodiment, the first subset of the plurality of resource blocks interleaves with the second subset of the plurality of resource blocks in the shared radio frequency band. For example, first subset of the plurality of resource blocks correspond to one frequency interlace (e.g., the frequency interlace $208_{I(0)}$). and the second subset of the plurality of resource blocks correspond to another frequency interlace (e.g., the frequency interlace $208_{I(i)}$. In an embodiment, the plurality of resource blocks are uniformly spaced apart from each other in the shared radio frequency band.

In an embodiment, the uplink control channel multiplex configuration includes the cyclic-shift mode. The communicating the first uplink control channel signal includes communicating, by the first wireless communication device with the second wireless communication device, the reference signal based on a first set of cyclic-shift values associated with the cyclic-shift mode in the first subset of the plurality of resource blocks. The communicating the first uplink control channel signal includes communicating, by the first wireless communication device with the second wireless communication device, the reference signal based on a second set of cyclic-shift values associated with the cyclic-shift mode in the second subset of the plurality of resource blocks, for example, as shown in the scheme 1800.

In an embodiment, adjacent cyclic-shift values in the first set of cyclic-shift values are offset by a first cyclic-shift step-size value, and wherein adjacent cyclic-shift values in the second set of cyclic-shift values are offset by a second cyclic-shift step-size value different from the first cyclic-shift step-size value, for example, as shown in the scheme 1900.

In an embodiment, the uplink control channel multiplex configuration includes the multiple sequence root indices. The communicating the first uplink control channel signal includes communicating, by the first wireless communication device with the second wireless communication device, the reference signal based on a first sequence root index of the multiple sequence root indices in the first subset of the plurality of resource blocks. The communicating the first uplink control channel signal includes communicating, by the first wireless communication device with the second wireless communication device, the reference signal based on a second sequence root index of the multiple sequence root indices in the second subset of the plurality of resource blocks, the second sequence root index being different than the first sequence root index, for example, as shown in the scheme 2000.

In an embodiment, the uplink control channel multiplex configuration includes the phase-rotation mode. The communicating the first uplink control channel signal includes communicating, by the first wireless communication device with the second wireless communication device, the reference signal based on a first phase rotation associated with the phase-rotation mode in the first subset of the plurality of resource blocks. The communicating the first uplink control channel signal includes communicating, by the first wireless communication device with the second wireless communication device, the reference signal based on a second phase-rotation associated with the phase-rotation mode in the second subset of the plurality of resource blocks, the second phase-rotation being different than the second phase-rotation, for example, as shown in the scheme 2100.

In an embodiment, the communicating the first uplink control channel signal includes communicating, by the first wireless communication device with the second wireless communication device, a reference signal in a portion of the plurality of resource blocks, for example, as shown in the scheme 2200.

In an embodiment, the communicating the first uplink control channel signal includes communicating, by the first wireless communication device with the second wireless communication device, a reference signal sequence including a length based on a number of tones in a first resource block of the plurality of resource blocks, for example, as shown in the scheme 2300.

In an embodiment, the communicating the first uplink control channel signal includes communicating, by the first wireless communication device with the second wireless communication device, a reference signal sequence (e.g., a long sequence) including a length based on a number of tones in the plurality of resource blocks.

In an embodiment, the communicating the first uplink control channel signal includes communicating, by the first wireless communication device with the second wireless communication device, the first uplink control channel signal in a portion of the plurality of resource blocks based on an uplink control information data size.

Figure 34:
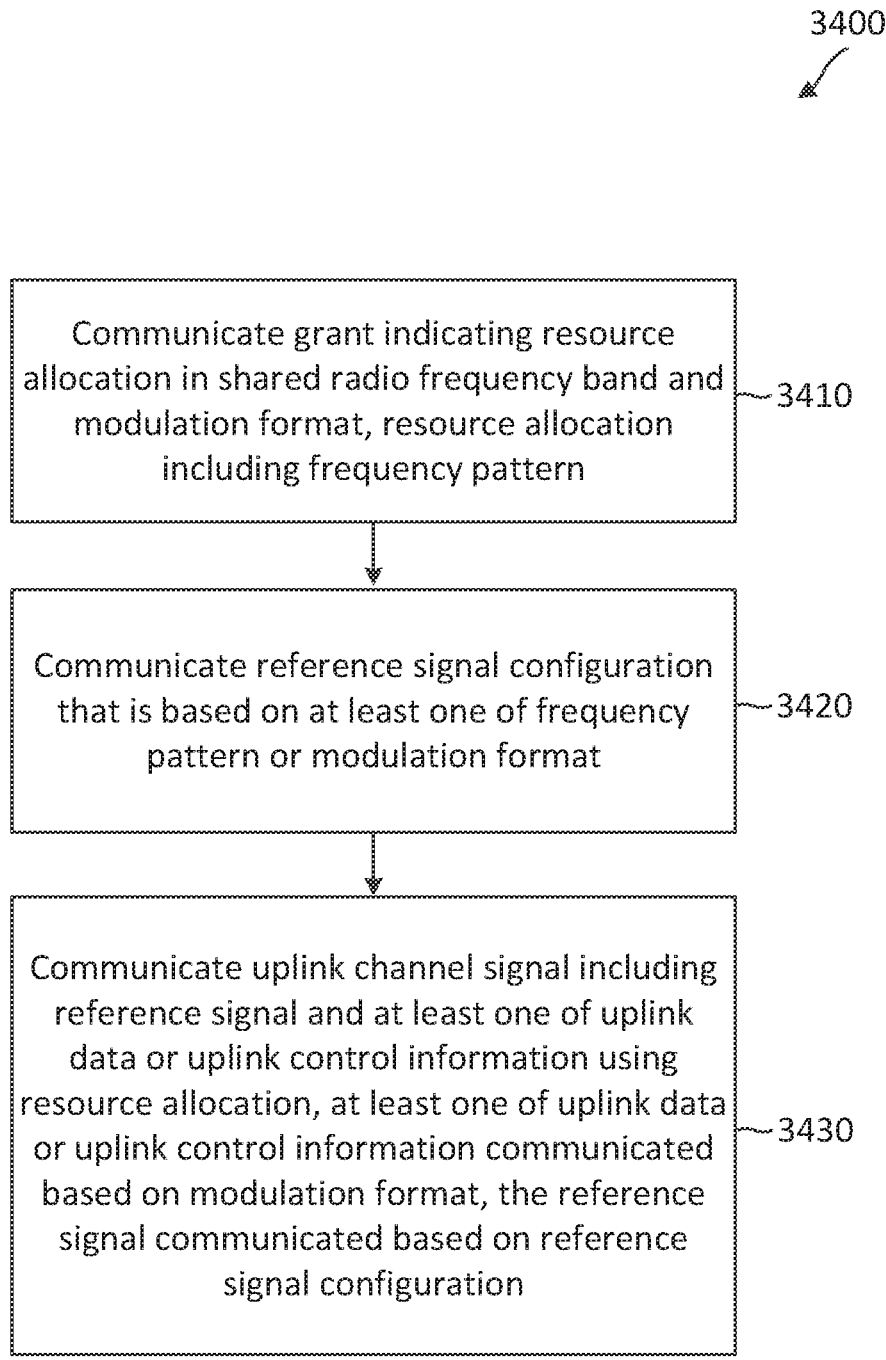
FIG. 34 is a flow diagram of a communication method according to some embodiments of the present disclosure.

FIG. 34 is a flow diagram of a communication method 3400 according to some embodiments of the present disclosure. Steps of the method 3400 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 3400. In another example, a wireless communication device, such as the UE 115 or the UE 300, may utilize one or more components, such as the processor 302, the memory 304, the UL communication module 308, the transceiver 310, the modem 312, and the one or more antennas 316, to execute the steps of method 3400. The method 3400 may employ similar mechanisms as in the schemes 2600, 2800, 2900, and 300 described above with respect to FIGS. 26, 28, 29, and 30, respectively and the methods 2700 and 3100 described above with respect to FIGS. 27 and 310, respectively. As illustrated, the method 3400 includes a number of enumerated steps, but embodiments of the method 3400 may include additional steps before, after, and in between the enumerated steps. In some embodiments, one or more of the enumerated steps may be omitted or performed in a different order.

At step 3410, the method 3400 includes communicating, by a first wireless communication device with a second wireless communication device, a grant indicating a resource allocation (e.g., the allocations 2510, 2520, 2530, 2540, 2550, and 2602) in a shared radio frequency band (e.g., the band 202) and a modulation format (e.g., the modulation format 2628), the resource allocation including a frequency pattern. The frequency pattern may be similar to the parameters 2620, 2622, 2624, and 2626.

At step 3420, the method 3400 includes communicating, by the first wireless communication device with the second wireless communication device, a reference signal configuration that is based on at least one of the frequency pattern or the modulation format.

At step 3430, the method 3400 includes communicating, by the first wireless communication device with the second wireless communication device, an uplink channel signal including at least one of uplink data or uplink control information (e.g., the UCIs 520 and 620, PUCCH format 3 data0 and a reference signal (e.g., a DMRS) using the resource allocation, the at least one of the uplink data or the uplink control information communicated based on the modulation format, and the reference signal communicated based on the reference signal configuration.

In an embodiment, the first wireless communication device may correspond to a BS (e.g., BS 105 or 500) and the second wireless communication device may correspond to a UE (e.g., UE 115 or 400). In such an embodiment, the first wireless communication device may transmit the grant and the reference signal configuration to the second wireless communication device. The first wireless communication device may receive the first uplink control channel signal from the second wireless communication device.

In an embodiment, the first wireless communication device may correspond to a UE (e.g., UE 115 or 400) and the second wireless communication device may correspond to a BS (e.g., BS 105 or 500). In such an embodiment, the first wireless communication device may receive the grant and the reference signal configuration from the second wireless communication device. The first wireless communication device may transmit the first uplink control channel signal to the second wireless communication device.

In an embodiment, the reference signal configuration is based on the frequency pattern. The resource allocation including a set of resource blocks in the shared radio frequency band. The communicating the uplink channel signal includes communicating, by the first wireless communication device with the second wireless communication device, the reference signal including a sequence with a length based on a number of tones in the set of resource blocks in response to a determination that the frequency pattern includes at least one of the set of resource blocks are contiguous in frequency, the set of resource blocks are non-uniformly spaced in the shared radio frequency band, or a first resource block and a second resource block of the set of resource blocks include different numbers of tones.

In an embodiment, the reference signal configuration is based on the frequency pattern. The resource allocation including a set of resource blocks spaced apart from each other in the shared radio frequency band. The communicating the uplink channel signal includes communicating, by the first wireless communication device with the second wireless communication device, the reference signal based on a set of cyclic-shift values in response to a determination that the frequency pattern includes at least one of the set of resource blocks uniformly spaced in the shared radio frequency band.

In an embodiment, the reference signal configuration is based on the frequency pattern. The resource allocation including a set of resource blocks spaced apart from each other in the shared radio frequency band. The communicating the uplink channel signal includes communicating, by the first wireless communication device with the second wireless communication device, the reference signal including a frequency density determined based on at least one of a number of tones in each resource block of the set of resource blocks; or a number of tones in the set of resource blocks in a subband of the shared radio frequency band.

In an embodiment, the reference signal configuration is based on the modulation format. The communicating the uplink channel signal includes communicating, by the first wireless communication device with the second wireless communication device, the reference signal including a first sequence in response to a determination that the modulation format includes a modulation order higher than a threshold. Alternatively, the communicating the uplink channel signal includes communicating, by the first wireless communication device with the second wireless communication device, the reference signal including a second sequence based on a set of cyclic-shift values in response to a determination that the modulation format includes a modulation order below the threshold, the second sequence includes a shorter length than the first sequence.

Figure 35:
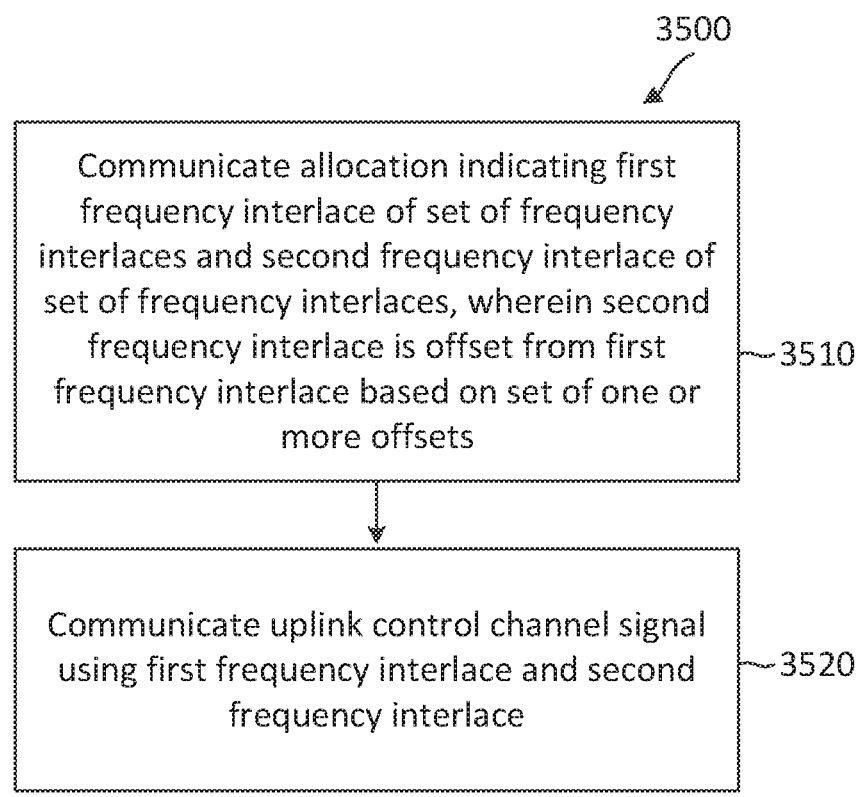
FIG. 35 is a flow diagram of a communication method according to some embodiments of the present disclosure.

FIG. 35 is a flow diagram of a communication method 3500 according to some embodiments of the present disclosure. Steps of the method 3500 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 3500. In another example, a wireless communication device, such as the UE 115 or the UE 300, may utilize one or more components, such as the processor 302, the memory 304, the UL communication module 308, the transceiver 310, the modem 312, and the one or more antennas 316, to execute the steps of method 3500. The method 3500 may employ similar mechanisms as in the schemes 2600, 2800, 2900, and 300 described above with respect to FIGS. 26, 28, 29, and 30, respectively and the methods 2700 and 3100 described above with respect to FIGS. 27 and 310, respectively. As illustrated, the method 3500 includes a number of enumerated steps, but embodiments of the method 3500 may include additional steps before, after, and in between the enumerated steps. In some embodiments, one or more of the enumerated steps may be omitted or performed in a different order.

At step 3510, the method 3500 includes communicating, by a first wireless communication device with a second wireless communication device, an allocation indicating a first frequency interlace of a set of frequency interlaces and a second frequency interlace of the set of frequency interlaces, where the second frequency interlace is offset from the first frequency interlace based on a set of one or more offsets. In some instances, the first wireless communication device may correspond to a BS and may use components, such as the processor 402, the memory 404, the UL communication module 408, the transceiver 410, the modem 412, and the one or more antennas 416, to communicate the allocation. In some other instances, the first wireless communication may correspond to a UE and may use components, such as the processor 302, the memory 304, the UL communication module 308, the transceiver 310, the modem 312, and the one or more antennas 316, to communicate the allocation.

At step 3520, the method 3500 includes communicating, by the first wireless communication device with the second wireless communication device, an uplink control channel signal using the first frequency interlace and the second frequency interlace. In some instances, the first wireless communication device may correspond to a BS and may use components, such as the processor 402, the memory 404, the UL communication module 408, the transceiver 410, the modem 412, and the one or more antennas 416, to communicate the uplink control channel signal. In some other instances, the first wireless communication may correspond to a UE and may use components, such as the processor 302, the memory 304, the UL communication module 308, the transceiver 310, the modem 312, and the one or more antennas 316, to communicate the uplink control channel signal.

In some aspects, the first wireless communication device may correspond to a BS (e.g., BS 105 or 500) and the second wireless communication device may correspond to a UE (e.g., UE 115 or 400). The first wireless communication device may transmit the allocation to the second wireless communication device and receive the uplink control channel signal from the second wireless communication device.

In some aspects, the first wireless communication device may correspond to a UE (e.g., UE 115 or 400) and the second wireless communication device may correspond to a BS (e.g., BS 105 or 500). The first wireless communication device may receive the allocation the second wireless communication device and transmit the uplink control channel signal to the second wireless communication device.

In some aspects, the step 3520 includes communicating, by the first wireless communication device with the second wireless communication device, at least one of a physical uplink control channel (PUCCH) format 2 signal or a PUCCH format 3 signal.

In some aspects, each frequency interlace in the set of frequency interlaces is identified by an index and the allocation includes a first index (e.g., i) identifying the first frequency interlace from among the set of frequency interlaces and a second index (e.g., j) identifying the second frequency interlace from among the set of frequency interlaces, where an offset (e.g., X) between the first index and the second index is based on the set of one or more offsets. In some aspects, the first wireless communication device may determine the offset between the first index and the second index based on the set of one or more offsets. In some instances, the first wireless communication device may correspond to a BS and may use components, such as the processor 402, the memory 404, the UL communication module 408, the transceiver 410, the modem 412, and the one or more antennas 416, to determine a second index for the second frequency interlace by adding the offset to the first index and applying a modulo N operation to determine a second index for the second frequency interlace, where N corresponds to a number of frequency interlaces in a carrier bandwidth. In some aspects, the uplink control channel signal has a subcarrier spacing of 15 kHz or 30 kHz, and the set of one or more offsets includes 1 or −1. In some aspects, the uplink control channel signal includes a subcarrier spacing of 15 kHz, and the set of one or more offsets includes 1, −1, or 5.

In some aspects, the first frequency interlace includes a first set of resource blocks spaced apart from each other in a frequency band, and the second frequency interlace includes a second set of resource blocks spaced apart from each other in the frequency band and interleaved with the first set of resource blocks. The step 3520 further includes communicating, by the first wireless communication device with the second wireless communication device, the uplink control channel signal using the first set of resource blocks and the second set of resource blocks, wherein a spacing between the used resource blocks in the frequency band is uniform.

In some aspects, the set of one or more offsets may be predetermined. In some aspects, the set of one or more offsets may be specified by a wireless communication standard. In some aspects, the set of one or more offsets may be semi-statically configured. In some aspects, the set of one or more offsets may be dynamically configured.

Figure 36:
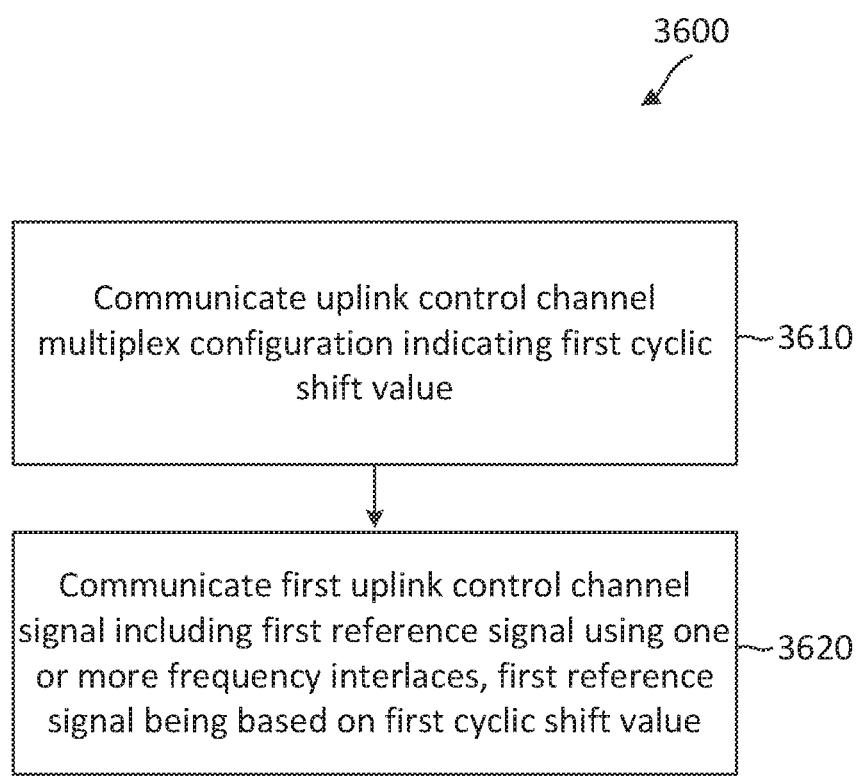
FIG. 36 is a flow diagram of a communication method according to some embodiments of the present disclosure.

FIG. 36 is a flow diagram of a communication method 3600 according to some embodiments of the present disclosure. Steps of the method 3600 can be executed by a computing device (e.g., a processor, processing circuit, and/or other suitable component) of a wireless communication device or other suitable means for performing the steps. For example, a wireless communication device, such as the BS 105 or the BS 400, may utilize one or more components, such as the processor 402, the memory 404, the UL communication module 408, the transceiver 410, the modem 412, and the one or more antennas 416, to execute the steps of method 3600. In another example, a wireless communication device, such as the UE 115 or the UE 300, may utilize one or more components, such as the processor 302, the memory 304, the UL communication module 308, the transceiver 310, the modem 312, and the one or more antennas 316, to execute the steps of method 3600. The method 3600 may employ similar mechanisms as in the schemes 2600, 2800, 2900, and 300 described above with respect to FIGS. 26, 28, 29, and 30, respectively and the methods 2700 and 3100 described above with respect to FIGS. 27 and 310, respectively. As illustrated, the method 3600 includes a number of enumerated steps, but embodiments of the method 3600 may include additional steps before, after, and in between the enumerated steps. In some embodiments, one or more of the enumerated steps may be omitted or performed in a different order.

At step 3610, the method 3600 includes communicating, by a first wireless communication device with a second wireless communication device, an uplink control channel multiplex configuration indicating a first cyclic shift value. In some instances, the first wireless communication device may correspond to a BS and may use components, such as the processor 402, the memory 404, the UL communication module 408, the transceiver 410, the modem 412, and the one or more antennas 416, to communicate the uplink control channel multiplex configuration. In some other instances, the first wireless communication may correspond to a UE and may use components, such as the processor 302, the memory 304, the UL communication module 308, the transceiver 310, the modem 312, and the one or more antennas 316, to communicate the uplink control channel multiplex configuration.

At step 3620, the method 3600 includes communicating, by the first wireless communication device with the second wireless communication device, a first uplink control channel signal including a first reference signal using one or more frequency interlaces, the first reference signal being based on the first cyclic shift value. In some instances, the first wireless communication device may correspond to a BS and may use components, such as the processor 402, the memory 404, the UL communication module 408, the transceiver 410, the modem 412, and the one or more antennas 416, to communicate the first uplink control channel signal. In some other instances, the first wireless communication may correspond to a UE and may use components, such as the processor 302, the memory 304, the UL communication module 308, the transceiver 310, the modem 312, and the one or more antennas 316, to communicate the first uplink control channel signal.

In some aspects, the first wireless communication device may correspond to a BS (e.g., BS 105 or 500) and the second wireless communication device may correspond to a UE (e.g., UE 115 or 400). The first wireless communication device may transmit the uplink control channel multiplex configuration to the second wireless communication device and receive the uplink control channel signal from the second wireless communication device.

In some aspects, the first wireless communication device may correspond to a UE (e.g., UE 115 or 400) and the second wireless communication device may correspond to a BS (e.g., BS 105 or 500). The first wireless communication device may receive the uplink control channel multiplex configuration the second wireless communication device and transmit the uplink control channel signal to the second wireless communication device.

In some aspects, the step 3620 includes communicating, by the first wireless communication device with the second wireless communication device, a physical uplink control channel (PUCCH) format 3 signal.

In some aspects, the first cyclic shift value is based on at least one of a length of the first reference signal or a number of users using the one or more frequency interlaces.

In some aspects, the method 3600 further includes communicating, by the first wireless communication device with a third wireless communication device different from the second wireless communication device, a second uplink control channel signal including a second reference signal using the one or more frequency interlaces, where the second reference signal is based on a second cyclic shift value and a difference between the first cyclic shift value and the second cyclic shift value is a multiple of a predetermined value, the predetermined value associated with at least one of a length of the first reference signal or a number of users using the one or more frequency interlaces. In some instances, the first wireless communication device may correspond to a BS and may use components, such as the processor 402, the memory 404, the UL communication module 408, the transceiver 410, the modem 412, and the one or more antennas 416, to communicate the second uplink control channel signal. In some other instances, the first wireless communication may correspond to a UE and may use components, such as the processor 302, the memory 304, the UL communication module 308, the transceiver 310, the modem 312, and the one or more antennas 316, to communicate the second uplink control channel signal.

In some aspects, the step 3620 includes communicating the first uplink control channel signal further based on an orthogonal cover code, and wherein the uplink control channel multiplex configuration includes an index for determining the orthogonal cover code and first cyclic shift value from a lookup table.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Further embodiments of the present disclosure include a method of wireless communication. The method includes obtaining, by a first wireless communication device, an uplink control channel multiplex configuration. The method also includes communicating, by the first wireless communication device with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration. The method also includes communicating, by the first wireless communication device with the second wireless communication device, a first uplink control channel signal in one or more of the plurality of resource blocks based on the uplink control channel multiplex configuration.

The method may also include one or more of the following features. The method may include where the uplink control channel multiplex configuration includes a first frequency spreading code; and the communicating the first uplink control channel signal includes communicating, by the first wireless communication device with the second wireless communication device, physical uplink control channel (PUCCH) format 2 data based on the first frequency spreading code and a post-frequency spreading scrambling code. The method may include applying, by the first wireless communication device, the first frequency spreading code to the PUCCH format 2 data to generate a frequency spread signal; and applying the post-frequency spreading scrambling code to the frequency spread signal. The uplink control channel multiplex configuration includes a second frequency spreading code; and the communicating the first uplink control channel signal includes communicating, by the first wireless communication device with the second wireless communication device, a reference signal based on the second frequency spreading code. The uplink control channel multiplex configuration includes a time frequency spreading code; and the communicating the first uplink control channel signal includes communicating, by the first wireless communication device with the second wireless communication device, PUCCH format 2 data based on a time spreading code. The communicating the first uplink control channel signal includes communicating, by the first wireless communication device with the second wireless communication device, physical uplink control channel (PUCCH) format 2 data and a reference signal using a subset of tones in each resource block of the plurality of resource blocks based on the uplink control channel multiplex configuration. The subset of tones in each resource block of the plurality of resource blocks are spaced apart from each other by at least one other tone in the resource block. The subset of tones in each resource block of the plurality of resource blocks includes contiguous tones. The uplink control channel multiplex configuration includes a pre-discrete Fourier transform (pre-DFT) spreading code; and the communicating the first uplink control channel signal includes communicating, by the first wireless communication device with the second wireless communication device, physical uplink control channel (PUCCH) format 3 data based on the pre-DFT frequency spreading code and a discrete Fourier transform (DFT). The pre-DFT spreading code includes a length based on a number of tones in each resource block of the plurality of resource blocks. The method may include applying, by the first wireless communication device, the pre-DFT frequency spreading code to the PUCCH format 3 data to generate a frequency spread signal; and applying the DFT to the frequency spread signal. The communicating the first uplink control channel signal includes communicating, by the first wireless communication device with the second wireless communication device, a reference signal using a subset of tones in each resource block of the plurality of resource blocks based on the uplink control channel multiplex configuration. The communicating the first uplink control channel signal includes communicating, by the first wireless communication device with the second wireless communication device, a reference signal based on a first cyclic-shift value. The uplink control channel multiplex configuration further includes a first cyclic-shift value. The uplink control channel multiplex configuration further includes a cyclic-shift index; and the method further includes determining, by the first wireless communication device, the first cyclic-shift value based on the cyclic-shift index and a length of the reference signal. The communicating the first uplink control channel signal includes communicating, by the first wireless communication device with the second wireless communication device, the reference signal based on the first cyclic-shift value in a first resource block of the plurality of resource blocks; and communicating, by the first wireless communication device with the second wireless communication device, the reference signal based on a second cyclic-shift value in a second resource block of the plurality of resource blocks, the first resource block being different than the second resource block, and the second cyclic-shift value being different than the first cyclic-shift value. The uplink control channel multiplex configuration further includes a first frequency spreading code; and the communicating the first uplink control channel signal includes communicating, by the first wireless communication device with the second wireless communication device, a reference signal based on the first frequency spreading code. The uplink control channel multiplex configuration further includes a first phase-rotation and a second phase-rotation different from the first phase-rotation; and the communicating the first uplink control channel signal includes communicating, by the first wireless communication device with the second wireless communication device, a reference signal based on the first phase-rotation in a first resource block of the plurality of resource blocks; and communicating, by the first wireless communication device with the second wireless communication device, the reference signal based on the second phase-rotation in a second resource block of the plurality of resource blocks, the first resource block being different than the second resource block. The uplink control channel multiplex configuration further includes a first sequence root index and a second sequence root index different from the first sequence root index; and the communicating the first uplink control channel signal includes communicating, by the first wireless communication device with the second wireless communication device, a reference signal based on the first sequence root index in a first resource block of the plurality of resource blocks; and communicating, by the first wireless communication device with the second wireless communication device, the reference signal based on the second sequence root index in a second resource block of the plurality of resource blocks, the first resource block being different than the second resource block. The uplink control channel multiplex configuration includes at least one of a cyclic-shift mode, a phase-rotation mode, or multiple sequence root indices; and the communicating the first uplink control channel signal includes communicating, by the first wireless communication device with the second wireless communication device, a reference signal in a first subset of the plurality of resource blocks based on at least one of the cyclic-shift mode, the phase-rotation mode, or the multiple sequence root indices; and communicating, by the first wireless communication device with the second wireless communication device, the reference signal in a second subset of the plurality of resource blocks based on at least one of the cyclic-shift mode, the phase-rotation mode, or the multiple sequence root indices, the second subset of the plurality of resource blocks being non-overlapping with the first subset of the plurality of resource blocks. The communicating the first uplink control channel signal includes communicating, by the first wireless communication device with the second wireless communication device, a reference signal in a portion of the plurality of resource blocks. The communicating the first uplink control channel signal includes communicating, by the first wireless communication device with the second wireless communication device, a reference signal sequence including a length based on a number of tones in a first resource block of the plurality of resource blocks. The communicating the first uplink control channel signal includes communicating, by the first wireless communication device with the second wireless communication device, a reference signal sequence including a length based on a number of tones in the plurality of resource blocks. The communicating the first uplink control channel signal includes communicating, by the first wireless communication device with the second wireless communication device, the first uplink control channel signal in a portion of the plurality of resource blocks based on an uplink control information data size. The communicating the grant includes receiving, by the first wireless communication device from the second wireless communication device, the grant including the uplink control channel multiplex configuration; and the communicating the first uplink control channel signal includes transmitting, by the first wireless communication device from the second wireless communication device, the first uplink control channel signal based on the uplink control channel multiplex configuration. The communicating the grant includes transmitting, by the first wireless communication device to the second wireless communication device, the grant including the uplink control channel multiplex configuration; and the communicating the first uplink control channel signal includes receiving, by the first wireless communication device from the second wireless communication device, the first uplink control channel signal based on the uplink control channel multiplex configuration. The communicating the first uplink control channel signal includes receiving, by the first wireless communication device from the second wireless communication device, the first uplink control channel signal; and the method further includes receiving, by the first wireless communication device from a third wireless communication device different from the second wireless communication device, a second uplink control channel signal in the plurality of resource blocks concurrent with the first uplink control channel signal. The first wireless communication device is a user equipment (UE), and where the second wireless communication device is a base station (BS). The first wireless communication device is a base station (BS), and where the second wireless communication device is a user equipment (UE).

Further embodiments of the present disclosure include a method of wireless communication. The method includes communicating, by a first wireless communication device with a second wireless communication device, a grant indicating a resource allocation in a shared radio frequency band and a modulation format, the resource allocation including a frequency pattern; communicating, by the first wireless communication device with the second wireless communication device, a reference signal configuration that is based on at least one of the frequency pattern or the modulation format. The method also includes communicating, by the first wireless communication device with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

The method may also include one or more of the following features. The method may include where the reference signal configuration is based on the frequency pattern; the resource allocation including a set of resource blocks in the shared radio frequency band; and the communicating the uplink channel signal includes communicating, by the first wireless communication device with the second wireless communication device, the reference signal including a sequence with a length based on a number of tones in the set of resource blocks in response to a determination that the frequency pattern includes at least one of the set of resource blocks are contiguous in frequency; the set of resource blocks are non-uniformly spaced in the shared radio frequency band; or a first resource block and a second resource block of the set of resource blocks include different numbers of tones. The reference signal configuration is based on the frequency pattern; the resource allocation including a set of resource blocks spaced apart from each other in the shared radio frequency band; and the communicating the uplink channel signal includes communicating, by the first wireless communication device with the second wireless communication device, the reference signal based on a set of cyclic-shift values in response to a determination that the frequency pattern includes at least one of the set of resource blocks uniformly spaced in the shared radio frequency band. The reference signal configuration is based on the frequency pattern; the resource allocation including a set of resource blocks spaced apart from each other in the shared radio frequency band; and the communicating the uplink channel signal includes communicating, by the first wireless communication device with the second wireless communication device, the reference signal including a frequency density determined based on at least one of a number of tones in each resource block of the set of resource blocks; or a number of tones in the set of resource blocks in a subband of the shared radio frequency band. The reference signal configuration is based on the modulation format; and the communicating the uplink channel signal includes communicating, by the first wireless communication device with the second wireless communication device, the reference signal including a first sequence in response to a determination that the modulation format includes a modulation order higher than a threshold; or communicating, by the first wireless communication device with the second wireless communication device, the reference signal including a second sequence based on a set of cyclic-shift values in response to a determination that the modulation format includes a modulation order below the threshold, the second sequence includes a shorter length than the first sequence.

Further embodiments of the present disclosure include an apparatus including a processor configured to obtain an uplink control channel multiplex configuration; and a transceiver configured to communicate, with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration; and communicate, with the second wireless communication device, a first uplink control channel signal in one or more of the plurality of resource blocks based on the uplink control channel multiplex configuration.

The apparatus may also include one or more of the following features. The apparatus may include where the uplink control channel multiplex configuration includes a first frequency spreading code; and the transceiver configured to communicate the first uplink control channel signal is further configured to communicate, with the second wireless communication device, physical uplink control channel (PUCCH) format 2 data based on the first frequency spreading code and a post-frequency spreading scrambling code. The processor is further configured to apply the first frequency spreading code to the PUCCH format 2 data to generate a frequency spread signal; and apply the post-frequency spreading scrambling code to the frequency spread signal. The uplink control channel multiplex configuration includes a second frequency spreading code; and the transceiver configured to communicate the first uplink control channel signal is further configured to communicate, with the second wireless communication device, a reference signal based on the second frequency spreading code. The uplink control channel multiplex configuration includes a time frequency spreading code; and the transceiver configured to communicate the first uplink control channel signal is further configured to communicate, with the second wireless communication device, PUCCH format 2 data based on a time spreading code. The transceiver configured to communicate the first uplink control channel signal is further configured to communicate, with the second wireless communication device, physical uplink control channel (PUCCH) format 2 data and a reference signal using a subset of tones in each resource block of the plurality of resource blocks based on the uplink control channel multiplex configuration. The subset of tones in each resource block of the plurality of resource blocks are spaced apart from each other by at least one other tone in the resource block. The subset of tones in each resource block of the plurality of resource blocks includes contiguous tones. The uplink control channel multiplex configuration includes a pre-discrete Fourier transform (pre-DFT) spreading code; and the transceiver configured to communicate the first uplink control channel signal is further configured to communicate, with the second wireless communication device, physical uplink control channel (PUCCH) format 3 data based on the pre-DFT frequency spreading code and a discrete Fourier transform (DFT). The pre-DFT spreading code includes a length based on a number of tones in each resource block of the plurality of resource blocks. The processor is further configured to apply the pre-DFT frequency spreading code to the PUCCH format 3 data to generate a frequency spread signal; and apply the DFT to the frequency spread signal. The transceiver configured to communicate the first uplink control channel signal is further configured to communicate, with the second wireless communication device, a reference signal using a subset of tones in each resource block of the plurality of resource blocks based on the uplink control channel multiplex configuration. The transceiver configured to communicate the first uplink control channel signal is further configured to communicate, with the second wireless communication device, a reference signal based on a first cyclic-shift value. The uplink control channel multiplex configuration further includes a first cyclic-shift value. The uplink control channel multiplex configuration further includes a cyclic-shift index; and the processor is further configured to determine the first cyclic-shift value based on the cyclic-shift index and a length of the reference signal. The transceiver configured to communicate the first uplink control channel signal is further configured to communicate, with the second wireless communication device, the reference signal based on the first cyclic-shift value in a first resource block of the plurality of resource blocks; and communicate, with the second wireless communication device, the reference signal based on a second cyclic-shift value in a second resource block of the plurality of resource blocks, the first resource block being different than the second resource block, and the second cyclic-shift value being different than the first cyclic-shift value. The uplink control channel multiplex configuration further includes a first frequency spreading code; and the transceiver configured to communicate the first uplink control channel signal is further configured to communicate, with the second wireless communication device, a reference signal based on the first frequency spreading code. The uplink control channel multiplex configuration further includes a first phase-rotation and a second phase-rotation different from the first phase-rotation; and the transceiver configured to communicate the first uplink control channel signal is further configured to communicate, with the second wireless communication device, a reference signal based on the first phase-rotation in a first resource block of the plurality of resource blocks; and communicate, with the second wireless communication device, the reference signal based on the second phase-rotation in a second resource block of the plurality of resource blocks, the first resource block being different than the second resource block. The uplink control channel multiplex configuration further includes a first sequence root index and a second sequence root index different from the first sequence root index; and the transceiver configured to communicate the first uplink control channel signal is further configured to communicate, with the second wireless communication device, a reference signal based on the first sequence root index in a first resource block of the plurality of resource blocks; and communicate, with the second wireless communication device, the reference signal based on the second sequence root index in a second resource block of the plurality of resource blocks, the first resource block being different than the second resource block. The uplink control channel multiplex configuration includes at least one of a cyclic-shift mode, a phase-rotation mode, or multiple sequence root indices; and the transceiver configured to communicate the first uplink control channel signal is further configured to communicate, with the second wireless communication device, a reference signal in a first subset of the plurality of resource blocks based on at least one of the cyclic-shift mode, the phase-rotation mode, or the multiple sequence root indices; and communicate, with the second wireless communication device, the reference signal in a second subset of the plurality of resource blocks based on at least one of the cyclic-shift mode, the phase-rotation mode, or the multiple sequence root indices, the second subset of the plurality of resource blocks being non-overlapping with the first subset of the plurality of resource blocks. The first subset of the plurality of resource blocks and the second subset of the plurality of resource blocks are in different subbands of the shared radio frequency band. The first subset of the plurality of resource blocks interleaves with the second subset of the plurality of resource blocks in the shared radio frequency band. The plurality of resource blocks are uniformly spaced apart from each other in the shared radio frequency band. The uplink control channel multiplex configuration includes the cyclic-shift mode; and the transceiver configured to communicate the first uplink control channel signal is further configured to communicate, with the second wireless communication device, the reference signal based on a first set of cyclic-shift values associated with the cyclic-shift mode in the first subset of the plurality of resource blocks; and communicate, with the second wireless communication device, the reference signal based on a second set of cyclic-shift values associated with the cyclic-shift mode in the second subset of the plurality of resource blocks. Adjacent cyclic-shift values in the first set of cyclic-shift values are offset by a first cyclic-shift step-size value, and where adjacent cyclic-shift values in the second set of cyclic-shift values are offset by a second cyclic-shift step-size value different from the first cyclic-shift step-size value. The uplink control channel multiplex configuration includes the multiple sequence root indices; and the transceiver configured to communicate the first uplink control channel signal is further configured to communicate, with the second wireless communication device, the reference signal based on a first sequence root index of the multiple sequence root indices in the first subset of the plurality of resource blocks; and communicate, with the second wireless communication device, the reference signal based on a second sequence root index of the multiple sequence root indices in the second subset of the plurality of resource blocks, the second sequence root index being different than the first sequence root index. The uplink control channel multiplex configuration includes the phase-rotation mode; and the transceiver configured to communicate the first uplink control channel signal is further configured to communicate, with the second wireless communication device, the reference signal based on a first phase rotation associated with the phase-rotation mode in the first subset of the plurality of resource blocks; and communicate, with the second wireless communication device, the reference signal based on a second phase-rotation associated with the phase-rotation mode in the second subset of the plurality of resource blocks, the second phase-rotation being different than the second phase-rotation. The transceiver configured to communicate the first uplink control channel signal is further configured to communicate, with the second wireless communication device, a reference signal in a portion of the plurality of resource blocks. The transceiver configured to communicate the first uplink control channel signal is further configured to communicate, with the second wireless communication device, a reference signal sequence including a length based on a number of tones in a first resource block of the plurality of resource blocks. The transceiver configured to communicate the first uplink control channel signal is further configured to communicate, with the second wireless communication device, a reference signal sequence including a length based on a number of tones in the plurality of resource blocks. The transceiver configured to communicate the first uplink control channel signal is further configured to communicate, with the second wireless communication device, the first uplink control channel signal in a portion of the plurality of resource blocks based on an uplink control information data size. The transceiver configured to communicate the grant is further configured to receive, from the second wireless communication device, the grant including the uplink control channel multiplex configuration; and the transceiver configured to communicate the first uplink control channel signal is further configured to transmit, from the second wireless communication device, the first uplink control channel signal based on the uplink control channel multiplex configuration. The transceiver configured to communicate the grant is further configured to transmit, to the second wireless communication device, the grant including the uplink control channel multiplex configuration; and the transceiver configured to communicate the first uplink control channel signal is further configured to receive, from the second wireless communication device, the first uplink control channel signal based on the uplink control channel multiplex configuration. The transceiver configured to communicate the first uplink control channel signal is further configured to receive, from the second wireless communication device, the first uplink control channel signal; and the transceiver is further configured to receive, from a third wireless communication device different from the second wireless communication device, a second uplink control channel signal in the plurality of resource blocks concurrent with the first uplink control channel signal. The first uplink control channel signal and the second uplink control channel signal include a same bandwidth. The first uplink control channel signal and the second uplink control channel signal include different bandwidths. The transceiver configured to receive the second uplink control channel signal is further configured to receive, from the third wireless communication device, the second uplink control channel signal in a portion of the plurality of resource blocks. The apparatus is a user equipment (UE), and where the second wireless communication device is a base station (BS). The apparatus is a base station (BS), and where the second wireless communication device is a user equipment (UE).

Further embodiments of the present disclosure include an apparatus including a transceiver configured to communicate, with a second wireless communication device, a grant indicating a resource allocation in a shared radio frequency band and a modulation format, the resource allocation including a frequency pattern; communicate, with the second wireless communication device, a reference signal configuration that is based on at least one of the frequency pattern or the modulation format; and communicate, with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

The apparatus may also include one or more of the following features. The apparatus may include where the reference signal configuration is based on the frequency pattern; the resource allocation including a set of resource blocks in the shared radio frequency band; and the transceiver configured to communicate the uplink channel signal is further configured to communicate, with the second wireless communication device, the reference signal including a sequence with a length based on a number of tones in the set of resource blocks in response to a determination that the frequency pattern includes at least one of the set of resource blocks are contiguous in frequency; the set of resource blocks are non-uniformly spaced in the shared radio frequency band; or a first resource block and a second resource block of the set of resource blocks include different numbers of tones. The reference signal configuration is based on the frequency pattern; the resource allocation including a set of resource blocks spaced apart from each other in the shared radio frequency band; and the transceiver configured to communicate the uplink channel signal is further configured to communicate, with the second wireless communication device, the reference signal based on a set of cyclic-shift values in response to a determination that the frequency pattern includes at least one of the set of resource blocks uniformly spaced in the shared radio frequency band. The reference signal configuration is based on the frequency pattern; the resource allocation including a set of resource blocks spaced apart from each other in the shared radio frequency band; and the transceiver configured to communicate the uplink channel signal is further configured to communicate, with the second wireless communication device, the reference signal including a frequency density determined based on at least one of a number of tones in each resource block of the set of resource blocks; or a number of tones in the set of resource blocks in a subband of the shared radio frequency band. The reference signal configuration is based on the modulation format; and the transceiver configured to communicate the uplink channel signal is further configured to communicate, with the second wireless communication device, the reference signal including a first sequence in response to a determination that the modulation format includes a modulation order higher than a threshold; or communicate, with the second wireless communication device, the reference signal including a second sequence based on a set of cyclic-shift values in response to a determination that the modulation format includes a modulation order below the threshold, the second sequence includes a shorter length than the first sequence.

Further embodiments of the present disclosure include a non-transitory computer-readable medium having program code recorded thereon. The non-transitory computer-readable medium includes code for causing a first wireless communication device to obtain an uplink control channel multiplex configuration; and code for causing the first wireless communication device to communicate, with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration. The non-transitory computer-readable medium also includes code for causing the first wireless communication device to communicate, with the second wireless communication device, a first uplink control channel signal in one or more of the plurality of resource blocks based on the uplink control channel multiplex configuration.

The non-transitory computer-readable may also include one or more of the following features. The non-transitory computer-readable medium may include where the uplink control channel multiplex configuration includes a first frequency spreading code; and the code for causing the first wireless communication device to communicate the first uplink control channel signal is further configured to communicate, with the second wireless communication device, physical uplink control channel (PUCCH) format 2 data based on the first frequency spreading code and a post-frequency spreading scrambling code. The non-transitory computer-readable medium may include code for causing the first wireless communication device to apply the first frequency spreading code to the PUCCH format 2 data to generate a frequency spread signal; and code for causing the first wireless communication device to apply the post-frequency spreading scrambling code to the frequency spread signal. The uplink control channel multiplex configuration includes a second frequency spreading code; and the code for causing the first wireless communication device to communicate the first uplink control channel signal is further configured to communicate, with the second wireless communication device, a reference signal based on the second frequency spreading code. The uplink control channel multiplex configuration includes a time frequency spreading code; and the code for causing the first wireless communication device to communicate the first uplink control channel signal is further configured to communicate, with the second wireless communication device, PUCCH format 2 data based on a time spreading code. The code for causing the first wireless communication device to communicate the first uplink control channel signal is further configured to communicate, with the second wireless communication device, physical uplink control channel (PUCCH) format 2 data and a reference signal using a subset of tones in each resource block of the plurality of resource blocks based on the uplink control channel multiplex configuration. The subset of tones in each resource block of the plurality of resource blocks are spaced apart from each other by at least one other tone in the resource block. The subset of tones in each resource block of the plurality of resource blocks includes contiguous tones. The uplink control channel multiplex configuration includes a pre-discrete Fourier transform (pre-DFT) spreading code; and the code for causing the first wireless communication device to communicate the first uplink control channel signal is further configured to communicate, with the second wireless communication device, physical uplink control channel (PUCCH) format 3 data based on the pre-DFT frequency spreading code and a discrete Fourier transform (DFT). The pre-DFT spreading code includes a length based on a number of tones in each resource block of the plurality of resource blocks. The non-transitory computer-readable medium may include code for causing the first wireless communication device to apply the pre-DFT frequency spreading code to the PUCCH format 3 data to generate a frequency spread signal; and code for causing the first wireless communication device to apply the DFT to the frequency spread signal. The code for causing the first wireless communication device to communicate the first uplink control channel signal is further configured to communicate, with the second wireless communication device, a reference signal using a subset of tones in each resource block of the plurality of resource blocks based on the uplink control channel multiplex configuration. The code for causing the first wireless communication device to communicate the first uplink control channel signal is further configured to communicate, with the second wireless communication device, a reference signal based on a first cyclic-shift value. The uplink control channel multiplex configuration further includes a first cyclic-shift value. The uplink control channel multiplex configuration further includes a cyclic-shift index; and the program code further includes code for causing the first wireless communication device to determine the first cyclic-shift value based on the cyclic-shift index and a length of the reference signal. The code for causing the first wireless communication device to communicate the first uplink control channel signal is further configured to communicate, with the second wireless communication device, the reference signal based on the first cyclic-shift value in a first resource block of the plurality of resource blocks; and communicate, with the second wireless communication device, the reference signal based on a second cyclic-shift value in a second resource block of the plurality of resource blocks, the first resource block being different than the second resource block, and the second cyclic-shift value being different than the first cyclic-shift value. The uplink control channel multiplex configuration further includes a first frequency spreading code; and the code for causing the first wireless communication device to communicate the first uplink control channel signal is further configured to communicate, with the second wireless communication device, a reference signal based on the first frequency spreading code. The uplink control channel multiplex configuration further includes a first phase-rotation and a second phase-rotation different from the first phase-rotation; and the code for causing the first wireless communication device to communicate the first uplink control channel signal is further configured to communicate, with the second wireless communication device, a reference signal based on the first phase-rotation in a first resource block of the plurality of resource blocks; and communicate, with the second wireless communication device, the reference signal based on the second phase-rotation in a second resource block of the plurality of resource blocks, the first resource block being different than the second resource block. The uplink control channel multiplex configuration further includes a first sequence root index and a second sequence root index different from the first sequence root index; and the code for causing the first wireless communication device to communicate the first uplink control channel signal is further configured to communicate, with the second wireless communication device, a reference signal based on the first sequence root index in a first resource block of the plurality of resource blocks; and communicate, with the second wireless communication device, the reference signal based on the second sequence root index in a second resource block of the plurality of resource blocks, the first resource block being different than the second resource block. The uplink control channel multiplex configuration includes at least one of a cyclic-shift mode, a phase-rotation mode, or multiple sequence root indices; and the code for causing the first wireless communication device to communicate the first uplink control channel signal is further configured to communicate, with the second wireless communication device, a reference signal in a first subset of the plurality of resource blocks based on at least one of the cyclic-shift mode, the phase-rotation mode, or the multiple sequence root indices; and communicate, with the second wireless communication device, the reference signal in a second subset of the plurality of resource blocks based on at least one of the cyclic-shift mode, the phase-rotation mode, or the multiple sequence root indices, the second subset of the plurality of resource blocks being non-overlapping with the first subset of the plurality of resource blocks. The first subset of the plurality of resource blocks and the second subset of the plurality of resource blocks are in different subbands of the shared radio frequency band. The first subset of the plurality of resource blocks interleaves with the second subset of the plurality of resource blocks in the shared radio frequency band. The plurality of resource blocks are uniformly spaced apart from each other in the shared radio frequency band. The uplink control channel multiplex configuration includes the cyclic-shift mode; and the code for causing the first wireless communication device to communicate the first uplink control channel signal is further configured to communicate, with the second wireless communication device, the reference signal based on a first set of cyclic-shift values associated with the cyclic-shift mode in the first subset of the plurality of resource blocks; and communicate, with the second wireless communication device, the reference signal based on a second set of cyclic-shift values associated with the cyclic-shift mode in the second subset of the plurality of resource blocks. Adjacent cyclic-shift values in the first set of cyclic-shift values are offset by a first cyclic-shift step-size value, and where adjacent cyclic-shift values in the second set of cyclic-shift values are offset by a second cyclic-shift step-size value different from the first cyclic-shift step-size value. The uplink control channel multiplex configuration includes the multiple sequence root indices; and the code for causing the first wireless communication device to communicate the first uplink control channel signal is further configured to communicate, with the second wireless communication device, the reference signal based on a first sequence root index of the multiple sequence root indices in the first subset of the plurality of resource blocks; and communicate, with the second wireless communication device, the reference signal based on a second sequence root index of the multiple sequence root indices in the second subset of the plurality of resource blocks, the second sequence root index being different than the first sequence root index. The uplink control channel multiplex configuration includes the phase-rotation mode; and the code for causing the first wireless communication device to communicate the first uplink control channel signal is further configured to communicate, with the second wireless communication device, the reference signal based on a first phase rotation associated with the phase-rotation mode in the first subset of the plurality of resource blocks; and communicate, with the second wireless communication device, the reference signal based on a second phase-rotation associated with the phase-rotation mode in the second subset of the plurality of resource blocks, the second phase-rotation being different than the second phase-rotation. The code for causing the first wireless communication device to communicate the first uplink control channel signal is further configured to communicate, with the second wireless communication device, a reference signal in a portion of the plurality of resource blocks. The code for causing the first wireless communication device to communicate the first uplink control channel signal is further configured to communicate, with the second wireless communication device, a reference signal sequence including a length based on a number of tones in a first resource block of the plurality of resource blocks. The code for causing the first wireless communication device to communicate the first uplink control channel signal is further configured to communicate, with the second wireless communication device, a reference signal sequence including a length based on a number of tones in the plurality of resource blocks. The code for causing the first wireless communication device to communicate the first uplink control channel signal is further configured to communicate, with the second wireless communication device, the first uplink control channel signal in a portion of the plurality of resource blocks based on an uplink control information data size. The code for causing the first wireless communication device to communicate the grant is further configured to receive, from the second wireless communication device, the grant including the uplink control channel multiplex configuration; and the code for causing the first wireless communication device to communicate the first uplink control channel signal is further configured to transmit, from the second wireless communication device, the first uplink control channel signal based on the uplink control channel multiplex configuration. The code for causing the first wireless communication device to communicate the grant is further configured to transmit, to the second wireless communication device, the grant including the uplink control channel multiplex configuration; and the code for causing the first wireless communication device to communicate the first uplink control channel signal is further configured to receive, from the second wireless communication device, the first uplink control channel signal based on the uplink control channel multiplex configuration. The code for causing the first wireless communication device to communicate the first uplink control channel signal is further configured to receive, from the second wireless communication device, the first uplink control channel signal; and the program code further includes code for causing the first wireless communication device to receive, from a third wireless communication device different from the second wireless communication device, a second uplink control channel signal in the plurality of resource blocks concurrent with the first uplink control channel signal. The first uplink control channel signal and the second uplink control channel signal include a same bandwidth. The first uplink control channel signal and the second uplink control channel signal include different bandwidths. The code for causing the first wireless communication device to receive the second uplink control channel signal is further configured to receive, from the third wireless communication device, the second uplink control channel signal in a portion of the plurality of resource blocks. The non-transitory computer-readable medium is a user equipment (UE), and where the second wireless communication device is a base station (BS). The non-transitory computer-readable medium is a base station (BS), and where the second wireless communication device is a user equipment (UE).

Further embodiments of the present disclosure include a non-transitory computer-readable medium having program code recorded thereon. The non-transitory computer-readable medium includes code for causing a first wireless communication device to communicate, with a second wireless communication device, a grant indicating a resource allocation in a shared radio frequency band and a modulation format, the resource allocation including a frequency pattern. The non-transitory computer-readable medium also includes code for causing the first wireless communication device to communicate, with the second wireless communication device, a reference signal configuration that is based on at least one of the frequency pattern or the modulation format. The non-transitory computer-readable medium also includes code for causing the first wireless communication device to communicate, with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

The non-transitory computer-readable may also include one or more of the following features. The non-transitory computer-readable medium where the reference signal configuration is based on the frequency pattern; the resource allocation including a set of resource blocks in the shared radio frequency band; and the code for causing the first wireless communication device to communicate the uplink channel signal is further configured to communicate, with the second wireless communication device, the reference signal including a sequence with a length based on a number of tones in the set of resource blocks in response to a determination that the frequency pattern includes at least one of the set of resource blocks are contiguous in frequency; the set of resource blocks are non-uniformly spaced in the shared radio frequency band; or a first resource block and a second resource block of the set of resource blocks include different numbers of tones. The reference signal configuration is based on the frequency pattern; the resource allocation including a set of resource blocks spaced apart from each other in the shared radio frequency band; and the code for causing the first wireless communication device to communicate the uplink channel signal is further configured to communicate, with the second wireless communication device, the reference signal based on a set of cyclic-shift values in response to a determination that the frequency pattern includes at least one of the set of resource blocks uniformly spaced in the shared radio frequency band. The reference signal configuration is based on the frequency pattern; the resource allocation including a set of resource blocks spaced apart from each other in the shared radio frequency band; and the code for causing the first wireless communication device to communicate the uplink channel signal is further configured to communicate, with the second wireless communication device, the reference signal including a frequency density determined based on at least one of a number of tones in each resource block of the set of resource blocks; or a number of tones in the set of resource blocks in a subband of the shared radio frequency band. The reference signal configuration is based on the modulation format; and the code for causing the first wireless communication device to communicate the uplink channel signal is further configured to communicate, with the second wireless communication device, the reference signal including a first sequence in response to a determination that the modulation format includes a modulation order higher than a threshold; or communicate, with the second wireless communication device, the reference signal including a second sequence based on a set of cyclic-shift values in response to a determination that the modulation format includes a modulation order below the threshold, the second sequence includes a shorter length than the first sequence.

Further embodiments of the present disclosure include an apparatus including means for obtaining an uplink control channel multiplex configuration; and means for communicating, with a second wireless communication device, a grant indicating a plurality of resource blocks spaced apart from each other by at least one other resource block in a shared radio frequency band, the plurality of resource blocks scheduled for multiple wireless communication devices based on the uplink control channel multiplex configuration. The apparatus also includes means for communicating, with the second wireless communication device, a first uplink control channel signal in one or more of the plurality of resource blocks based on the uplink control channel multiplex configuration.

The apparatus may also include one or more of the following features. The apparatus may also include where the uplink control channel multiplex configuration includes a first frequency spreading code; and the means for communicating the first uplink control channel signal is further configured to communicate, with the second wireless communication device, physical uplink control channel (PUCCH) format 2 data based on the first frequency spreading code and a post-frequency spreading scrambling code. The apparatus may include means for applying the first frequency spreading code to the PUCCH format 2 data to generate a frequency spread signal; and means for applying the post-frequency spreading scrambling code to the frequency spread signal. The uplink control channel multiplex configuration includes a second frequency spreading code; and the means for communicating the first uplink control channel signal is further configured to communicate, with the second wireless communication device, a reference signal based on the second frequency spreading code. The uplink control channel multiplex configuration includes a time frequency spreading code; and the means for communicating the first uplink control channel signal is further configured to communicate, with the second wireless communication device, PUCCH format 2 data based on a time spreading code. The means for communicating the first uplink control channel signal is further configured to communicate, with the second wireless communication device, physical uplink control channel (PUCCH) format 2 data and a reference signal using a subset of tones in each resource block of the plurality of resource blocks based on the uplink control channel multiplex configuration. The subset of tones in each resource block of the plurality of resource blocks are spaced apart from each other by at least one other tone in the resource block. The subset of tones in each resource block of the plurality of resource blocks includes contiguous tones. The uplink control channel multiplex configuration includes a pre-discrete Fourier transform (pre-DFT) spreading code; and the means for communicating the first uplink control channel signal is further configured to communicate, with the second wireless communication device, physical uplink control channel (PUCCH) format 3 data based on the pre-DFT frequency spreading code and a discrete Fourier transform (DFT). The pre-DFT spreading code includes a length based on a number of tones in each resource block of the plurality of resource blocks. The apparatus may include means for applying the pre-DFT frequency spreading code to the PUCCH format 3 data to generate a frequency spread signal; and means for applying the DFT to the frequency spread signal. The means for communicating the first uplink control channel signal is further configured to communicate, with the second wireless communication device, a reference signal using a subset of tones in each resource block of the plurality of resource blocks based on the uplink control channel multiplex configuration. The means for communicating the first uplink control channel signal is further configured to communicate, with the second wireless communication device, a reference signal based on a first cyclic-shift value. The uplink control channel multiplex configuration further includes a first cyclic-shift value. The uplink control channel multiplex configuration further includes a cyclic-shift index; and the apparatus further includes means for determining the first cyclic-shift value based on the cyclic-shift index and a length of the reference signal. The means for communicating the first uplink control channel signal is further configured to communicate, with the second wireless communication device, the reference signal based on the first cyclic-shift value in a first resource block of the plurality of resource blocks; and communicate, with the second wireless communication device, the reference signal based on a second cyclic-shift value in a second resource block of the plurality of resource blocks, the first resource block being different than the second resource block, and the second cyclic-shift value being different than the first cyclic-shift value. The uplink control channel multiplex configuration further includes a first frequency spreading code; and the means for communicating the first uplink control channel signal is further configured to communicate, with the second wireless communication device, a reference signal based on the first frequency spreading code. The uplink control channel multiplex configuration further includes a first phase-rotation and a second phase-rotation different from the first phase-rotation; and the means for communicating the first uplink control channel signal is further configured to communicate, with the second wireless communication device, a reference signal based on the first phase-rotation in a first resource block of the plurality of resource blocks; and communicate, with the second wireless communication device, the reference signal based on the second phase-rotation in a second resource block of the plurality of resource blocks, the first resource block being different than the second resource block. The uplink control channel multiplex configuration further includes a first sequence root index and a second sequence root index different from the first sequence root index; and the means for communicating the first uplink control channel signal is further configured to communicate, with the second wireless communication device, a reference signal based on the first sequence root index in a first resource block of the plurality of resource blocks; and communicate, with the second wireless communication device, the reference signal based on the second sequence root index in a second resource block of the plurality of resource blocks, the first resource block being different than the second resource block. The uplink control channel multiplex configuration includes at least one of a cyclic-shift mode, a phase-rotation mode, or multiple sequence root indices; and the means for communicating the first uplink control channel signal is further configured to communicate, with the second wireless communication device, a reference signal in a first subset of the plurality of resource blocks based on at least one of the cyclic-shift mode, the phase-rotation mode, or the multiple sequence root indices; and communicate, with the second wireless communication device, the reference signal in a second subset of the plurality of resource blocks based on at least one of the cyclic-shift mode, the phase-rotation mode, or the multiple sequence root indices, the second subset of the plurality of resource blocks being non-overlapping with the first subset of the plurality of resource blocks. The first subset of the plurality of resource blocks and the second subset of the plurality of resource blocks are in different subbands of the shared radio frequency band. The first subset of the plurality of resource blocks interleaves with the second subset of the plurality of resource blocks in the shared radio frequency band. The plurality of resource blocks are uniformly spaced apart from each other in the shared radio frequency band. The uplink control channel multiplex configuration includes the cyclic-shift mode; and the means for communicating the first uplink control channel signal is further configured to communicate, with the second wireless communication device, the reference signal based on a first set of cyclic-shift values associated with the cyclic-shift mode in the first subset of the plurality of resource blocks; and communicate, with the second wireless communication device, the reference signal based on a second set of cyclic-shift values associated with the cyclic-shift mode in the second subset of the plurality of resource blocks. Adjacent cyclic-shift values in the first set of cyclic-shift values are offset by a first cyclic-shift step-size value, and where adjacent cyclic-shift values in the second set of cyclic-shift values are offset by a second cyclic-shift step-size value different from the first cyclic-shift step-size value. The uplink control channel multiplex configuration includes the multiple sequence root indices; and the means for communicating the first uplink control channel signal is further configured to communicate, with the second wireless communication device, the reference signal based on a first sequence root index of the multiple sequence root indices in the first subset of the plurality of resource blocks; and communicate, with the second wireless communication device, the reference signal based on a second sequence root index of the multiple sequence root indices in the second subset of the plurality of resource blocks, the second sequence root index being different than the first sequence root index. The uplink control channel multiplex configuration includes the phase-rotation mode; and the means for communicating the first uplink control channel signal is further configured to communicate, with the second wireless communication device, the reference signal based on a first phase rotation associated with the phase-rotation mode in the first subset of the plurality of resource blocks; and communicate, with the second wireless communication device, the reference signal based on a second phase-rotation associated with the phase-rotation mode in the second subset of the plurality of resource blocks, the second phase-rotation being different than the second phase-rotation. The means for communicating the first uplink control channel signal is further configured to communicate, with the second wireless communication device, a reference signal in a portion of the plurality of resource blocks. The means for communicating the first uplink control channel signal is further configured to communicate, with the second wireless communication device, a reference signal sequence including a length based on a number of tones in a first resource block of the plurality of resource blocks. The means for communicating the first uplink control channel signal is further configured to communicate, with the second wireless communication device, a reference signal sequence including a length based on a number of tones in the plurality of resource blocks. The means for communicating the first uplink control channel signal is further configured to communicate, with the second wireless communication device, the first uplink control channel signal in a portion of the plurality of resource blocks based on an uplink control information data size. The means for communicating the grant is further configured to receive, from the second wireless communication device, the grant including the uplink control channel multiplex configuration; and the means for communicating the first uplink control channel signal is further configured to transmit, from the second wireless communication device, the first uplink control channel signal based on the uplink control channel multiplex configuration. The means for communicating the grant is further configured to transmit, to the second wireless communication device, the grant including the uplink control channel multiplex configuration; and the means for communicating the first uplink control channel signal is further configured to receive, from the second wireless communication device, the first uplink control channel signal based on the uplink control channel multiplex configuration. The means for communicating the first uplink control channel signal is further configured to receive, from the second wireless communication device, the first uplink control channel signal; and the apparatus further includes means for receiving, from a third wireless communication device different from the second wireless communication device, a second uplink control channel signal in the plurality of resource blocks concurrent with the first uplink control channel signal. The first uplink control channel signal and the second uplink control channel signal include a same bandwidth. The first uplink control channel signal and the second uplink control channel signal include different bandwidths. The means for receiving the second uplink control channel signal is further configured to receive, from the third wireless communication device, the second uplink control channel signal in a portion of the plurality of resource blocks. The apparatus is a user equipment (UE), and where the second wireless communication device is a base station (BS). The apparatus is a base station (BS), and where the second wireless communication device is a user equipment (UE).

Further embodiments of the present disclosure include an apparatus including means for communicating, with a second wireless communication device, a grant indicating a resource allocation in a shared radio frequency band and a modulation format, the resource allocation including a frequency pattern. The apparatus also includes means for communicating, with the second wireless communication device, a reference signal configuration that is based on at least one of the frequency pattern or the modulation format. The apparatus also includes means for communicating, with the second wireless communication device, an uplink channel signal including at least one of uplink data or uplink control information and a reference signal using the resource allocation, the at least one of the uplink data or the uplink control information communicated based on the modulation format, and the reference signal communicated based on the reference signal configuration.

The apparatus may also include one or more of the following features. The apparatus may include where the reference signal configuration is based on the frequency pattern; the resource allocation including a set of resource blocks in the shared radio frequency band; and the means for communicating the uplink channel signal is further configured to communicate, with the second wireless communication device, the reference signal including a sequence with a length based on a number of tones in the set of resource blocks in response to a determination that the frequency pattern includes at least one of the set of resource blocks are contiguous in frequency; the set of resource blocks are non-uniformly spaced in the shared radio frequency band; or a first resource block and a second resource block of the set of resource blocks include different numbers of tones. The reference signal configuration is based on the frequency pattern; the resource allocation including a set of resource blocks spaced apart from each other in the shared radio frequency band; and the means for communicating the uplink channel signal is further configured to communicate, with the second wireless communication device, the reference signal based on a set of cyclic-shift values in response to a determination that the frequency pattern includes at least one of the set of resource blocks uniformly spaced in the shared radio frequency band. The reference signal configuration is based on the frequency pattern; the resource allocation including a set of resource blocks spaced apart from each other in the shared radio frequency band; and the means for communicating the uplink channel signal is further configured to communicate, with the second wireless communication device, the reference signal including a frequency density determined based on at least one of a number of tones in each resource block of the set of resource blocks; or a number of tones in the set of resource blocks in a subband of the shared radio frequency band. The reference signal configuration is based on the modulation format; and the means for communicating the uplink channel signal is further configured to communicate, with the second wireless communication device, the reference signal including a first sequence in response to a determination that the modulation format includes a modulation order higher than a threshold; or communicate, with the second wireless communication device, the reference signal including a second sequence based on a set of cyclic-shift values in response to a determination that the modulation format includes a modulation order below the threshold, the second sequence includes a shorter length than the first sequence.

Further embodiments of the present disclosure include a non-transitory computer-readable medium having program code recorded thereon. The non-transitory computer-readable medium includes code for causing a first wireless communication device to communicate, with a second wireless communication device, an allocation indicating a first frequency interlace of a set of frequency interlaces and a second frequency interlace of the set of frequency interlaces, where the second frequency interlace is offset from the first frequency interlace based on an set of one or more offsets. The non-transitory computer-readable medium also includes code for causing the first wireless communication device to communicate, with the second wireless communication device, an uplink control channel signal using the first frequency interlace and the second frequency interlace.

The non-transitory computer-readable medium may also include one or more of the following features. The non-transitory computer-readable medium may include where the code for causing the first wireless communication device to communicate the uplink control channel signal is further configured to communicate, with the second wireless communication device, at least one of a physical uplink control channel (PUCCH) format 2 signal or a PUCCH format 3 signal. Each frequency interlace in the set of frequency interlaces is identified by an index, and where the allocation includes a first index identifying the first frequency interlace from among the set of frequency interlaces and a second index identifying the second frequency interlace from among the set of frequency interlaces, and where an offset between the first index and the second index is based on the set of one or more offsets. The non-transitory computer-readable medium may include code for causing the first wireless communication device to determine the offset between the first index and the second index based on the set of one or more offsets. The code for causing the first wireless communication device to determine the offset is further configured to determine the offset further by applying a modulo n operation, where n corresponds to a number of frequency interlaces in a carrier bandwidth. The uplink control channel signal has a subcarrier spacing of 15 kHz or 30 kHz, and where the set of one or more offsets includes 1 or −1. The uplink control channel signal includes a subcarrier spacing of 15 kHz, and where the set of one or more offsets includes 1, −1, or 5. The set of one or more offsets includes 5. The first frequency interlace includes a first set of resource blocks spaced apart from each other in a frequency band, and where the second frequency interlace includes a second set of resource blocks spaced apart from each other in the frequency band and interleaved with the first set of resource blocks. The code for causing the first wireless communication device to communicate the uplink control channel signal is further configured to communicate, with the second wireless communication device, the uplink control channel signal using the first set of resource blocks and the second set of resource blocks, where a spacing between the used resource blocks in the frequency band is uniform.

Further embodiments of the present disclosure include a non-transitory computer-readable medium having program code recorded thereon. The non-transitory computer-readable medium includes code for causing a first wireless communication device to communicate, with a second wireless communication device, an uplink control channel multiplex configuration indicating a first cyclic shift value. The non-transitory computer-readable medium also includes code for causing the first wireless communication device to communicate, with the second wireless communication device, a first uplink control channel signal including a first reference signal using one or more frequency interlaces, the first reference signal being based on the first cyclic shift value.

The non-transitory computer-readable medium may also include one or more of the following features. The non-transitory computer-readable medium may include where the code for causing the first wireless communication device to communicate the first uplink control channel signal is configured to communicate, with the second wireless communication device, a physical uplink control channel (PUCCH) format 3 signal. The first cyclic shift value is based on at least one of a length of the first reference signal or a number of users using the one or more frequency interlaces. A difference between the first cyclic shift value and the second cyclic shift value is a multiple of a predetermined value, the predetermined value associated with at least one of a length of the first reference signal or a number of users using the one or more frequency interlaces. The code for causing the first wireless communication device to communicate the first uplink control channel signal is configured to communicate, with the second wireless communication device, the first uplink control channel signal further based on an orthogonal cover code; and the uplink control channel multiplex configuration includes an index for determining the orthogonal cover code and first cyclic shift value from a lookup table.

Further embodiments of the present disclosure include an apparatus including means for communicating, with a second wireless communication device, an allocation indicating a first frequency interlace of a set of frequency interlaces and a second frequency interlace of the set of frequency interlaces, where the second frequency interlace is offset from the first frequency interlace based on a set of one or more offsets. The apparatus also includes means for communicating, with the second wireless communication device, an uplink control channel signal using the first frequency interlace and the second frequency interlace.

The apparatus may also include one or more of the following features. The apparatus may include where the means for communicating the uplink control channel signal is further configured to communicate, with the second wireless communication device, at least one of a physical uplink control channel (PUCCH) format 2 signal or a PUCCH format 3 signal. Each frequency interlace in the set of frequency interlaces is identified by an index, and where the allocation includes a first index identifying the first frequency interlace from among the set of frequency interlaces and a second index identifying the second frequency interlace from among the set of frequency interlaces, and where an offset between the first index and the second index is based on the set of one or more offsets. The apparatus may include means for determining the offset between the first index and the second index based on the set of one or more offsets. The means for determining the offset is further configured to determine the offset further by applying a modulo n operation, where n corresponds to a number of frequency interlaces in a carrier bandwidth. The uplink control channel signal has a subcarrier spacing of 15 kHz or 30 kHz, and where the set of one or more offsets includes 1 or −1. The uplink control channel signal includes a subcarrier spacing of 15 kHz, and where the set of one or more offsets includes 1, −1, or 5. The set of one or more offsets includes 5. The first frequency interlace includes a first set of resource blocks spaced apart from each other in a frequency band, and where the second frequency interlace includes a second set of resource blocks spaced apart from each other in the frequency band and interleaved with the first set of resource blocks. The means for communicating the uplink control channel signal is further configured to communicate, with the second wireless communication device, the uplink control channel signal using the first set of resource blocks and the second set of resource blocks, where a spacing between the used resource blocks in the frequency band is uniform.

Further embodiments of the present disclosure include an apparatus including means for communicating, with a second wireless communication device, an uplink control channel multiplex configuration indicating a first cyclic shift value. The apparatus also includes means for communicating, with the second wireless communication device, a first uplink control channel signal including a first reference signal using one or more frequency interlaces, the first reference signal being based on the first cyclic shift value.

The apparatus may also include one or more of the following features. The apparatus may include where the means for communicating the first uplink control channel signal is configured to communicate, with the second wireless communication device, a physical uplink control channel (PUCCH) format 3 signal. The first cyclic shift value is based on at least one of a length of the first reference signal or a number of users using the one or more frequency interlaces. A difference between the first cyclic shift value and the second cyclic shift value is a multiple of a predetermined value, the predetermined value associated with at least one of a length of the first reference signal or a number of users using the one or more frequency interlaces. The means for communicating the first uplink control channel signal is configured to communicate, with the second wireless communication device, the first uplink control channel signal further based on an orthogonal cover code; and the uplink control channel multiplex configuration includes an index for determining the orthogonal cover code and first cyclic shift value from a lookup table.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
    obtaining, by a first wireless communication device, a physical uplink control channel (PUCCH) multiplex configuration, the PUCCH multiplex configuration including a orthogonal cover code (OCC) sequence of M values represented by w(m), where m varies from 1 to M;
    communicating, by the first wireless communication device with a second wireless communication device, a grant indicating a frequency interlace, wherein the frequency interlace comprises a plurality of resource blocks spaced from each other by at least one other resource block in a shared radio frequency band, wherein the PUCCH multiplex configuration indicates a configuration for multiplexing PUCCH signals in the frequency interlace;
    for each m, multiplying w(m) by x(n) for a plurality, N, of indices n to N to produce a multiplied sequence, where x(n) is associated with a sequence of N encoded format 3 data symbols;
    concatenating each multiplied sequence to generate a first PUCCH signal; and
    communicating, by the first wireless communication device with the second wireless communication device, the first PUCCH signal in one or more resource blocks of the frequency interlace based on the PUCCH multiplex configuration, wherein the first PUCCH signal comprises PUCCH format 3 data and wherein the PUCCH signal is based on:
        the OCC sequence represented by w(m);
        the sequence x(n); and
        a discrete Fourier transform (DFT).

2. The method of claim 1, wherein M is 1, 2, or 4.

3. The method of claim 1, further comprising:
    applying, by the first wireless communication device, the OCC sequence to the PUCCH format 3 data to generate a frequency spread signal; and
    applying the DFT to the frequency spread signal.

4. The method of claim 1, wherein the communicating the first PUCCH signal includes:
    communicating, by the first wireless communication device with the second wireless communication device, a reference signal using a subset of tones in each resource block of the plurality of resource blocks based on the PUCCH multiplex configuration.

5. The method of claim 4, wherein the communicating the first PUCCH signal includes:
    communicating, by the first wireless communication device with the second wireless communication device, a reference signal based on a first cyclic-shift value.

6. The method of claim 5, wherein the PUCCH multiplex configuration further includes the first cyclic-shift value.

7. The method of claim 5, wherein:
    the PUCCH multiplex configuration further includes a cyclic-shift index; and
    the method further comprises:
        determining, by the first wireless communication device, the first cyclic-shift value based on the cyclic-shift index and a length of the reference signal.

8. The method of claim 5, wherein the communicating the first PUCCH signal includes:
- communicating, by the first wireless communication device with the second wireless communication device, the reference signal based on the first cyclic-shift value in a first resource block of the plurality of resource blocks; and
- communicating, by the first wireless communication device with the second wireless communication device, the reference signal based on a second cyclic-shift value in a second resource block of the plurality of resource blocks, the first resource block being different than the second resource block, and the second cyclic-shift value being different than the first cyclic-shift value.

9. The method of claim 1, wherein:
the PUCCH multiplex configuration further includes a first frequency spreading code; and
the communicating the first PUCCH signal includes:
- communicating, by the first wireless communication device with the second wireless communication device, a reference signal based on the first frequency spreading code.

10. The method of claim 1, wherein:
the PUCCH multiplex configuration further includes a first phase-rotation and a second phase-rotation different from the first phase-rotation; and
the communicating the first PUCCH signal includes:
- communicating, by the first wireless communication device with the second wireless communication device, a reference signal based on the first phase-rotation in a first resource block of the plurality of resource blocks; and
- communicating, by the first wireless communication device with the second wireless communication device, the reference signal based on the second phase-rotation in a second resource block of the plurality of resource blocks, the first resource block being different than the second resource block.

11. The method of claim 1, wherein:
the PUCCH multiplex configuration further includes a first sequence root index and a second sequence root index different from the first sequence root index; and
the communicating the first PUCCH signal includes:
- communicating, by the first wireless communication device with the second wireless communication device, a reference signal based on the first sequence root index in a first resource block of the plurality of resource blocks; and
- communicating, by the first wireless communication device with the second wireless communication device, the reference signal based on the second sequence root index in a second resource block of the plurality of resource blocks, the first resource block being different than the second resource block.

12. The method of claim 1, wherein:
the PUCCH multiplex configuration includes at least one of a cyclic-shift mode including at least a first set of cyclic-shift values and a second set of cyclic-shift values different from the first set of cyclic-shift values, a phase-rotation mode including at least a first phase-rotation or a second phase-rotation different from the first phase-rotation, or multiple sequence root indices including at least a first sequence root index and a second sequence root index different from the first sequence root index; and the communicating the first PUCCH signal includes:
- communicating, by the first wireless communication device with the second wireless communication device, a reference signal in a first subset of the plurality of resource blocks based on at least one of the first set of cyclic-shift values, the first phase-rotation, or the first sequence root index; and
- communicating, by the first wireless communication device with the second wireless communication device, the reference signal in a second subset of the plurality of resource blocks based on at least one of the second set of cyclic-shift values, the second phase-rotation, or the second sequence root index, the second subset of the plurality of resource blocks and the first subset of the plurality of resource blocks being in different subbands of the shared radio frequency band.

13. The method of claim 1, wherein the communicating the first PUCCH signal includes:
- communicating, by the first wireless communication device with the second wireless communication device, a reference signal in a portion of the plurality of resource blocks.

14. The method of claim 1, wherein the communicating the first PUCCH signal includes:
- communicating, by the first wireless communication device with the second wireless communication device, a reference signal sequence including a length based on a number of tones in a first resource block of the plurality of resource blocks or a number of tones in the plurality of resource blocks.

15. The method of claim 1, wherein the communicating the first PUCCH signal includes:
- communicating, by the first wireless communication device with the second wireless communication device, the first PUCCH signal in a portion of the plurality of resource blocks based on an uplink control information data size.

16. The method of claim 1, wherein:
the first wireless communication device is a user equipment (UE) and the second wireless communication device is a base station (BS),
the communicating the grant includes:
- receiving, by the UE from the BS, the grant including the PUCCH multiplex configuration; and
the communicating the first PUCCH signal includes:
- transmitting, by the UE to the BS, the first PUCCH signal based on the PUCCH multiplex configuration.

17. The method of claim 1, wherein:
the first wireless communication device is a base station (BS) and the second wireless communication device is a user equipment (UE),
the communicating the grant includes:
- transmitting, by the BS to the UE, the grant including the PUCCH multiplex configuration; and
the communicating the first PUCCH signal includes:
- receiving, by the BS from the UE, the first PUCCH signal based on the PUCCH multiplex configuration.

18. The method of claim 17, further comprising:
- receiving, by the BS from another UE, a second PUCCH signal in the plurality of resource blocks concurrent with the first PUCCH signal.

19. The method of claim 18, wherein the receiving the second PUCCH signal includes:
- receiving, by the first wireless communication device from the another UE, the second PUCCH signal in a portion of the plurality of resource blocks.

20. An apparatus comprising:
a processor configured to:
obtain a physical uplink control channel (PUCCH) multiplex configuration, the PUCCH multiplex configuration including a orthogonal cover code (OCC) sequence of M values represented by w(m), where m varies from 1 to M;
for each m, multiply w(m) by x(n) for a plurality, N, of indices n to produce a multiplied sequence, where x(n) is associated with a sequence of N encoded format 3 data symbols;
concatenating each multiplied sequence to generate a first PUCCH signal; and
a transceiver configured to:
communicate, with a second wireless communication device, a grant indicating a frequency interlace, wherein the frequency interlace comprises a plurality of resource blocks in a shared radio frequency band, wherein the PUCCH multiplex configuration indicates a configuration for multiplexing PUCCH signals in the frequency interlace; and
communicate, with the second wireless communication device, the first PUCCH signal in one or more resource blocks of the frequency interlace based on the PUCCH multiplex configuration, wherein the first PUCCH signal comprises PUCCH format 3 data and wherein the PUCCH signal is based on:
the OCC sequence represented by w(m);
the sequence x(n); and
a discrete Fourier transform (DFT).

21. The apparatus of claim 20, wherein the processor is further configured to:
apply the OCC sequence to the PUCCH format 3 data to generate a frequency spread signal; and
apply the DFT to the frequency spread signal.

22. The apparatus of claim 20, wherein the transceiver configured to communicate the first PUCCH signal is further configured to:
communicate, with the second wireless communication device, a reference signal based on a first cyclic-shift value.

23. The apparatus of claim 22, wherein the PUCCH multiplex configuration further includes a first cyclic-shift value.

24. The apparatus of claim 22, wherein:
the PUCCH multiplex configuration further includes a cyclic-shift index; and
the processor is further configured to:
determine the first cyclic-shift value based on the cyclic-shift index and a length of the reference signal.

25. The apparatus of claim 20, wherein:
the apparatus is a base station (BS) and the second wireless communication device is a user equipment (UE);
the transceiver configured to communicate the grant is configured to:
transmit, to the UE, the grant including the PUCCH multiplex configuration;
the transceiver configured to communicate the first PUCCH signal is configured to:
receive, from the UE, the first PUCCH signal based on the PUCCH multiplex configuration; and
the transceiver is further configured to:
receive, from another UE, a second PUCCH signal in the plurality of resource blocks concurrent with the first PUCCH signal.

26. A method of wireless communication, comprising:
obtaining, by a first wireless communication device, a physical uplink control channel (PUCCH) multiplex configuration;
communicating, by the first wireless communication device with a second wireless communication device, a grant indicating a frequency interlace, wherein the frequency interlace comprises a plurality of resource blocks spaced from each other by at least one other resource block in a shared radio frequency band, wherein the PUCCH multiplex configuration indicates a configuration for multiplexing PUCCH signals in the frequency interlace; and
communicating, by the first wireless communication device with the second wireless communication device, a first PUCCH signal in one or more resource blocks of the frequency interlace based on the PUCCH multiplex configuration, wherein the communicating the first PUCCH signal comprises:
communicating a reference signal using a first subset of tones in a first resource block of the plurality of resource blocks based on a first cyclic-shift value; and
communicating the reference signal using a second subset of tones in a second resource block of the plurality of resource blocks based on a second cyclic-shift value different from the first cyclic-shift value.

27. The method of claim 26, wherein the communicating the first PUCCH signal includes:
communicating, by the first wireless communication device with the second wireless communication device, PUCCH format 2 data wherein at least one of the first subset of tones or the second subset of tones i includes contiguous tones or tones that are spaced apart from each other by at least one other tone in the respective resource block.

28. The method of claim 26, wherein:
the PUCCH multiplex configuration includes an index for determining an orthogonal cover code (OCC); and
the communicating the first PUCCH signal includes:
communicating, by the first wireless communication device with the second wireless communication device, PUCCH format 2 data in one or more resource blocks of the frequency interlace based on the OCC.

29. The method of claim 26, wherein:
the PUCCH multiplex configuration indicates an index of a frequency spreading code and a scrambling code; and
the communicating the first PUCCH signal includes:
communicating, by the first wireless communication device with the second wireless communication device, the first PUCCH signal in one or more resource blocks of the frequency interlace based on the frequency spreading code and the scrambling code.

30. The method of claim 29, wherein the communicating the first PUCCH signal comprises communicating the first PUCCH signal such that the frequency spreading code is applied before the scrambling code is applied to the first PUCCH signal.

31. An apparatus, comprising:
a processor configured to:
obtain a physical uplink control channel (PUCCH) multiplex configuration; and a transceiver configured to:
  communicate, with a wireless communication device, a grant indicating a frequency interlace, wherein the frequency interlace comprises a plurality of resource blocks spaced from each other by at least one other resource block in a shared radio frequency band, wherein the PUCCH multiplex configuration indicates a configuration for multiplexing PUCCH signals in the frequency interlace; and
  communicate, with the wireless communication device, a first PUCCH signal in one or more resource blocks of the frequency interlace based on the PUCCH multiplex configuration, wherein the transceiver configured to communicate the first PUCCH signal comprises the transceiver configured to:
    communicate a reference signal using a first subset of tones in a first resource block of the plurality of resource blocks based on a first cyclic-shift value; and
    communicate the reference signal using a second subset of tones in a second resource block of the plurality of resource blocks based on a second cyclic-shift value different from the first cyclic-shift value.

32. The apparatus of claim 31, wherein:
the PUCCH multiplex configuration includes a frequency spreading code; and
the transceiver configured to communicate the first PUCCH signal comprises the transceiver configured to:
  communicate, with the second wireless communication device, PUCCH format 2 data in one or more resource blocks of the frequency interlace based on the frequency spreading code.

33. The apparatus of claim 31, wherein:
the PUCCH multiplex configuration indicates a frequency spreading code and a scrambling code; and
the transceiver is configured to communicate the first PUCCH signal in one or more resource blocks of the frequency interlace based on the frequency spreading code and the scrambling code.

34. The apparatus of claim 33, wherein the transceiver is configured to communicate the first PUCCH signal such that the frequency spreading code is applied before the scrambling code is applied to the first PUCCH signal.

* * * * *